Figure 1:
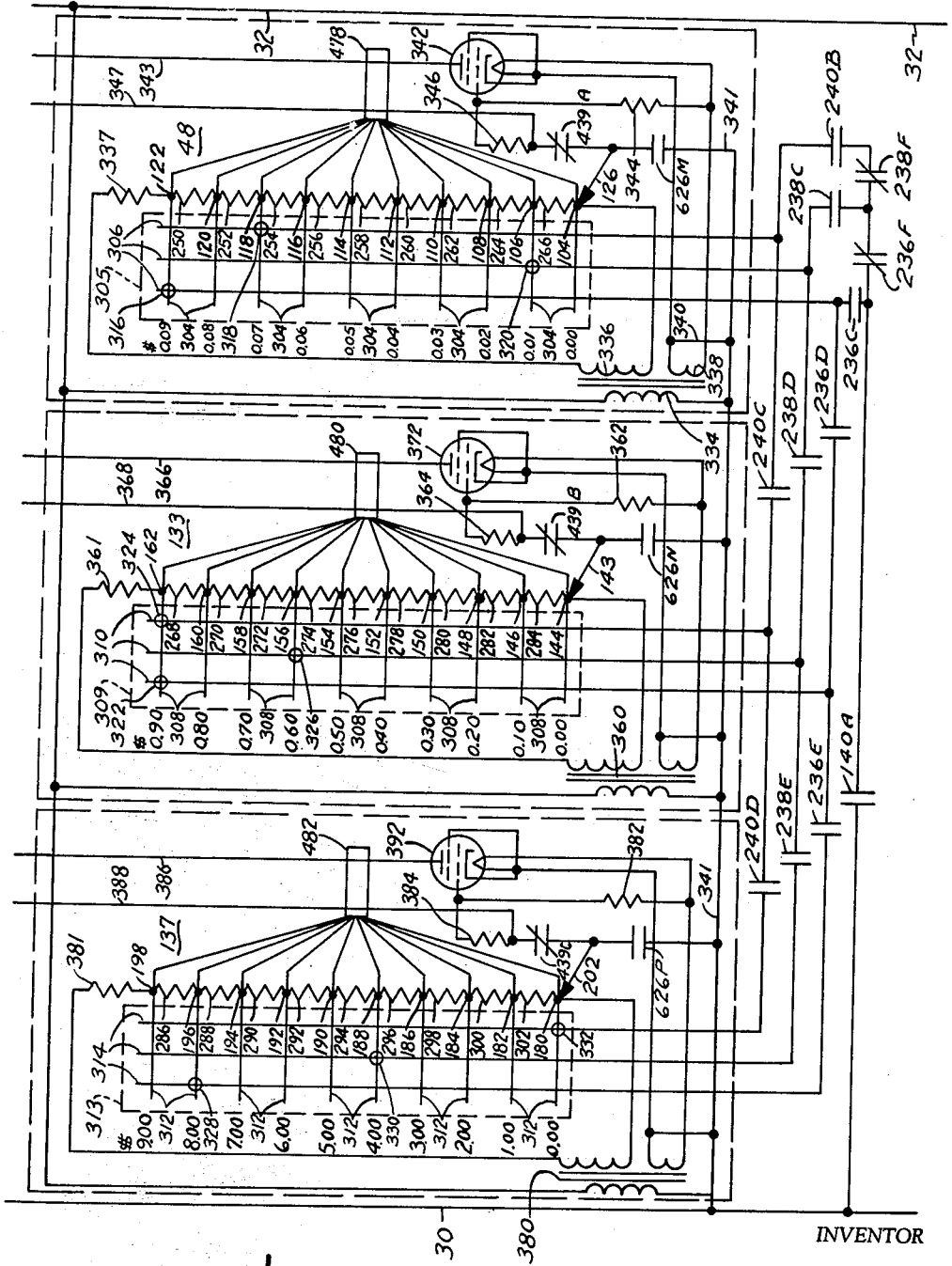

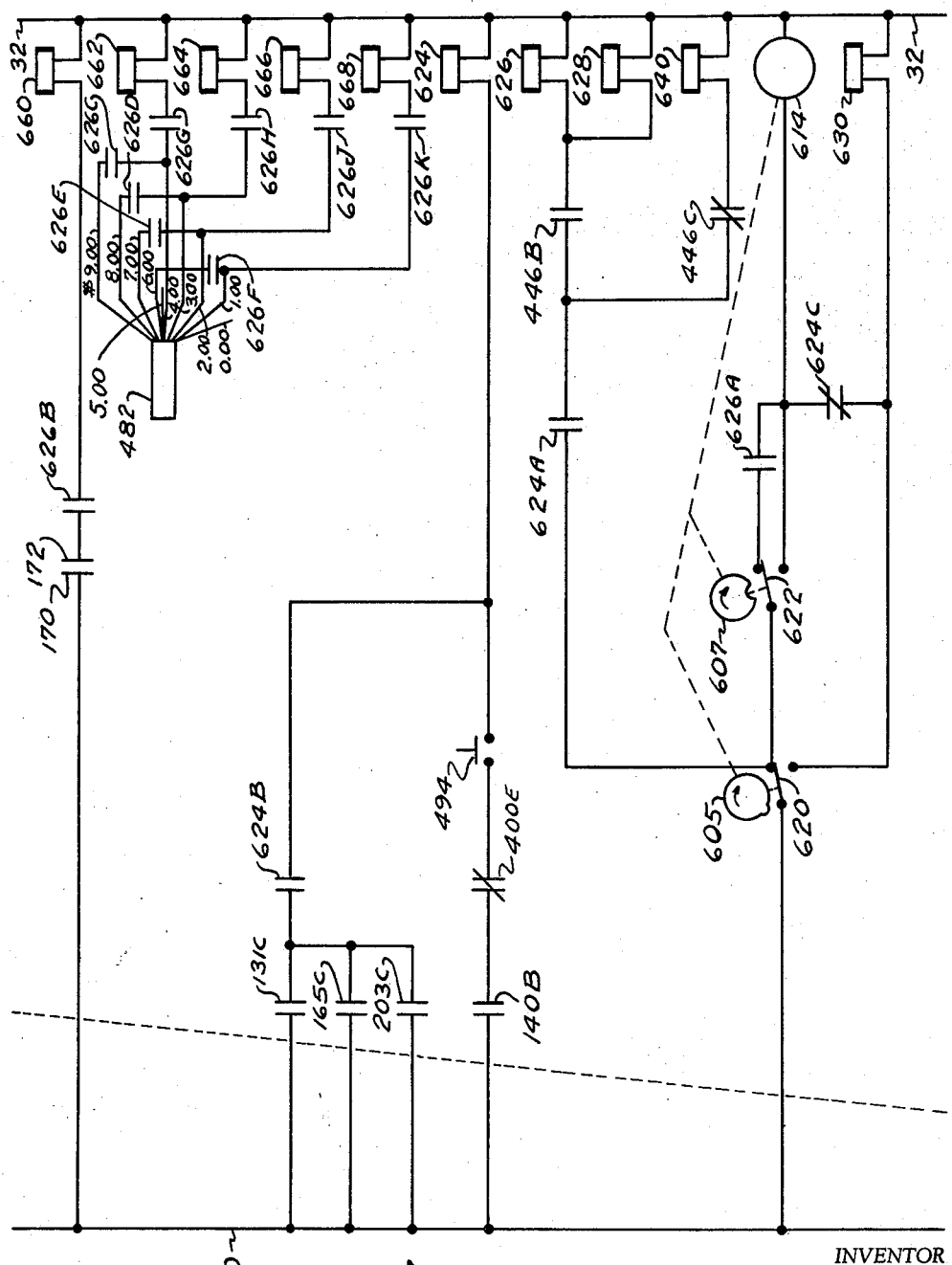

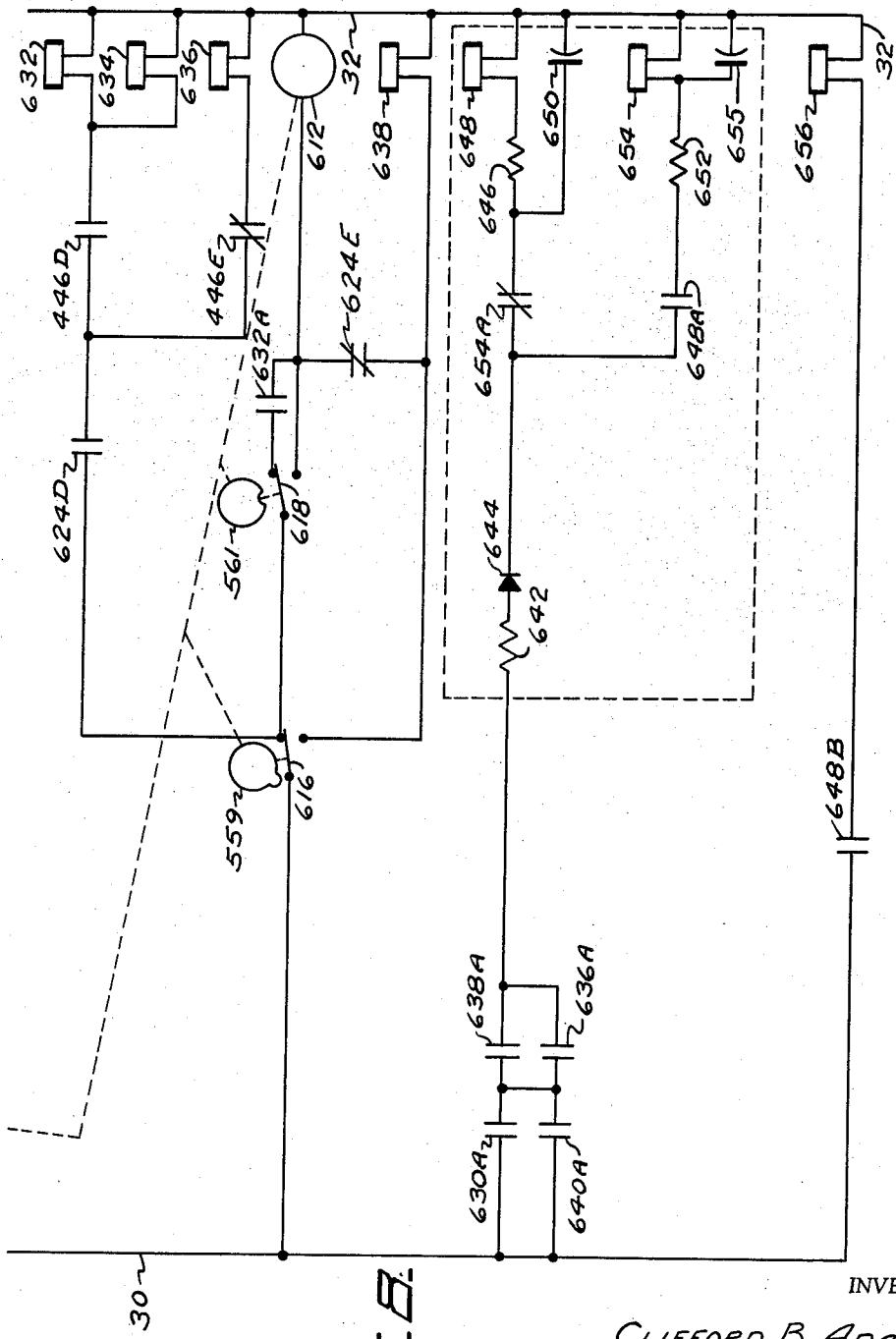

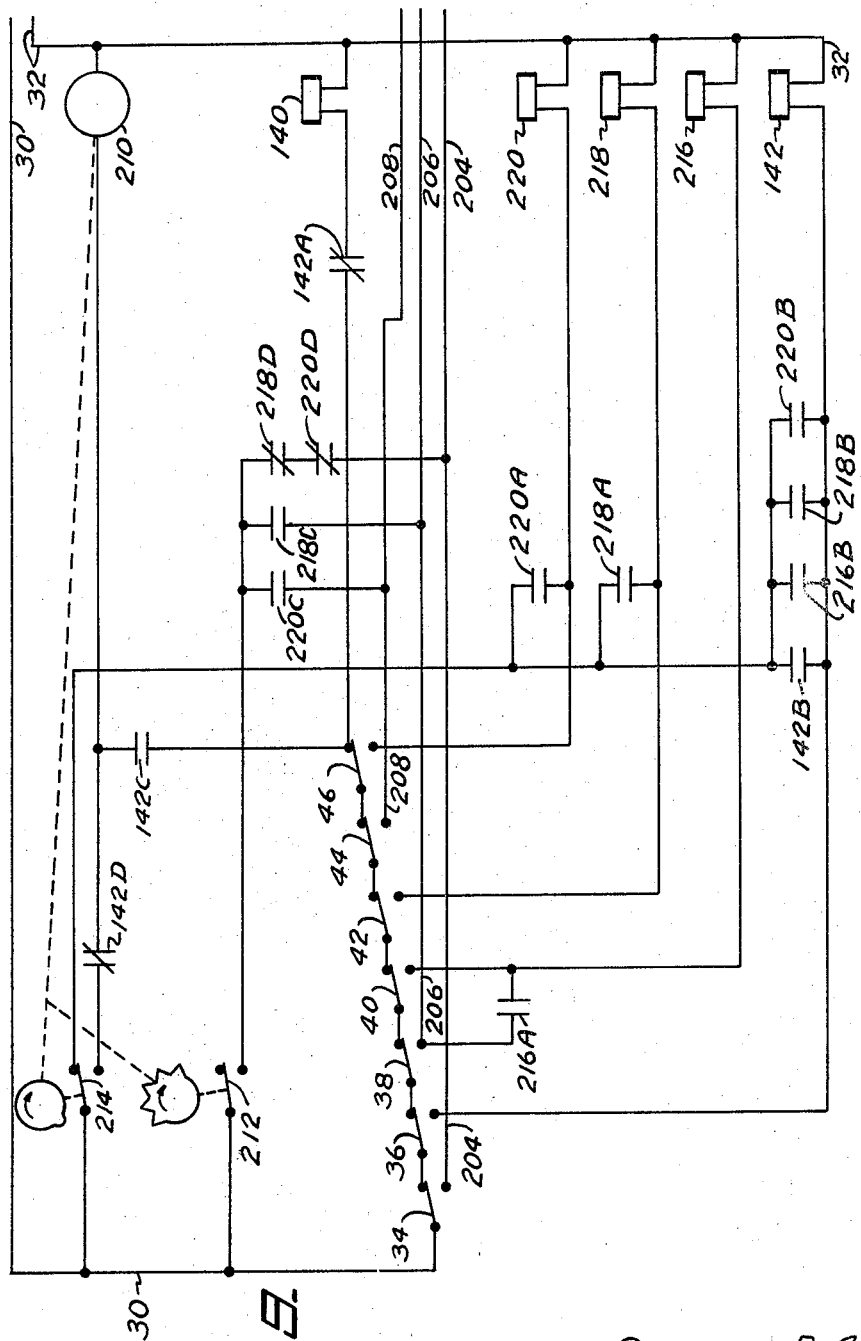

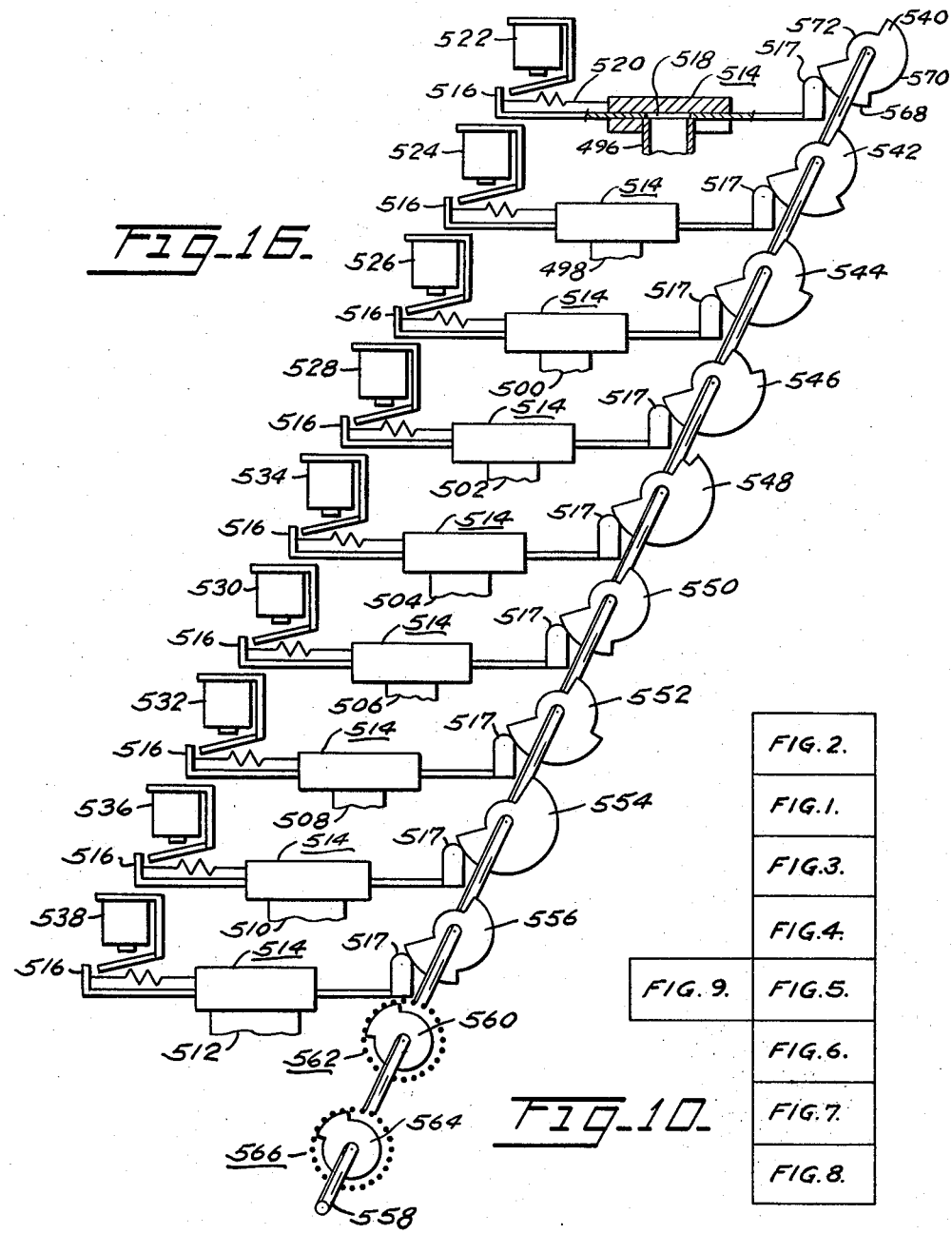

June 1, 1965 C. B. ADAMS 3,186,531
MONEY-ACTUATING DEVICES
Filed Oct. 26, 1960 13 Sheets-Sheet 11
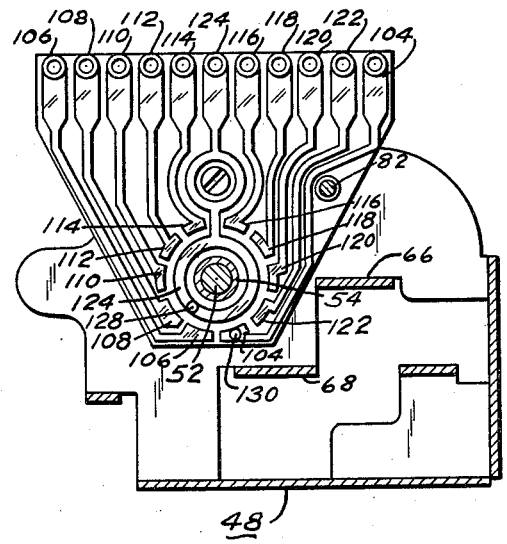
FIG_14_
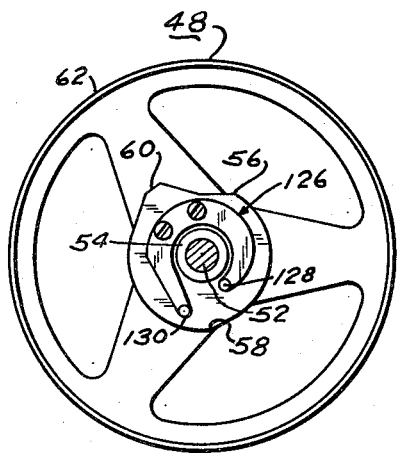
FIG_15_
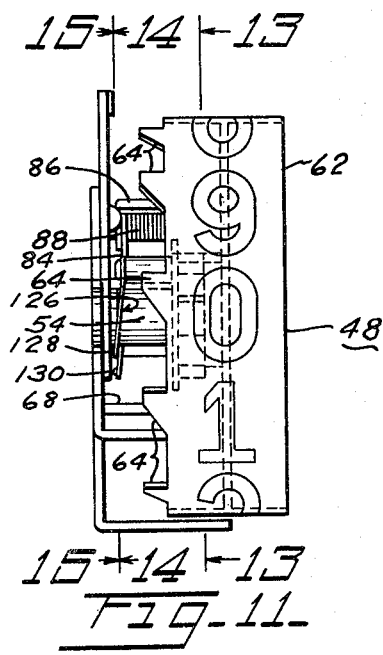
FIG_11_
INVENTOR.
CLIFFORD B. ADAMS
BY
Rey Eilus
ATTORNEY June 1, 1965   C. B. ADAMS   3,186,531
MONEY-ACTUATING DEVICES
Filed Oct. 26, 1960   13 Sheets-Sheet 12
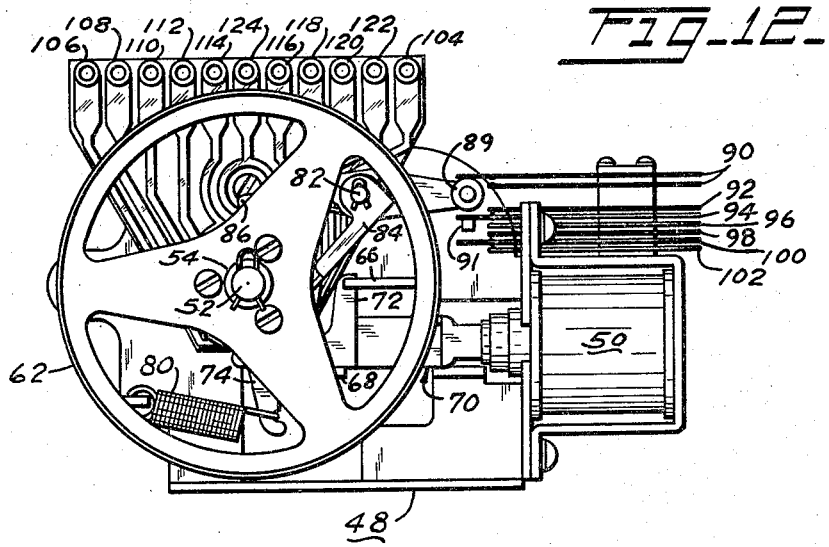
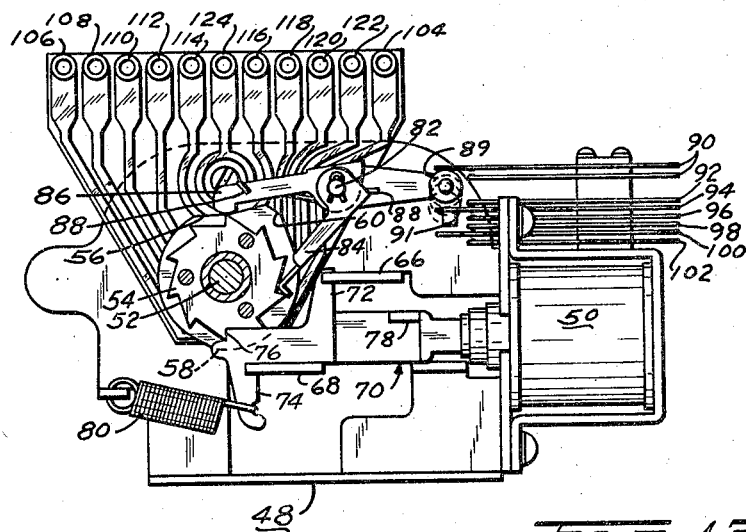
INVENTOR
CLIFFORD B. ADAMS
BY
ATTORNEY

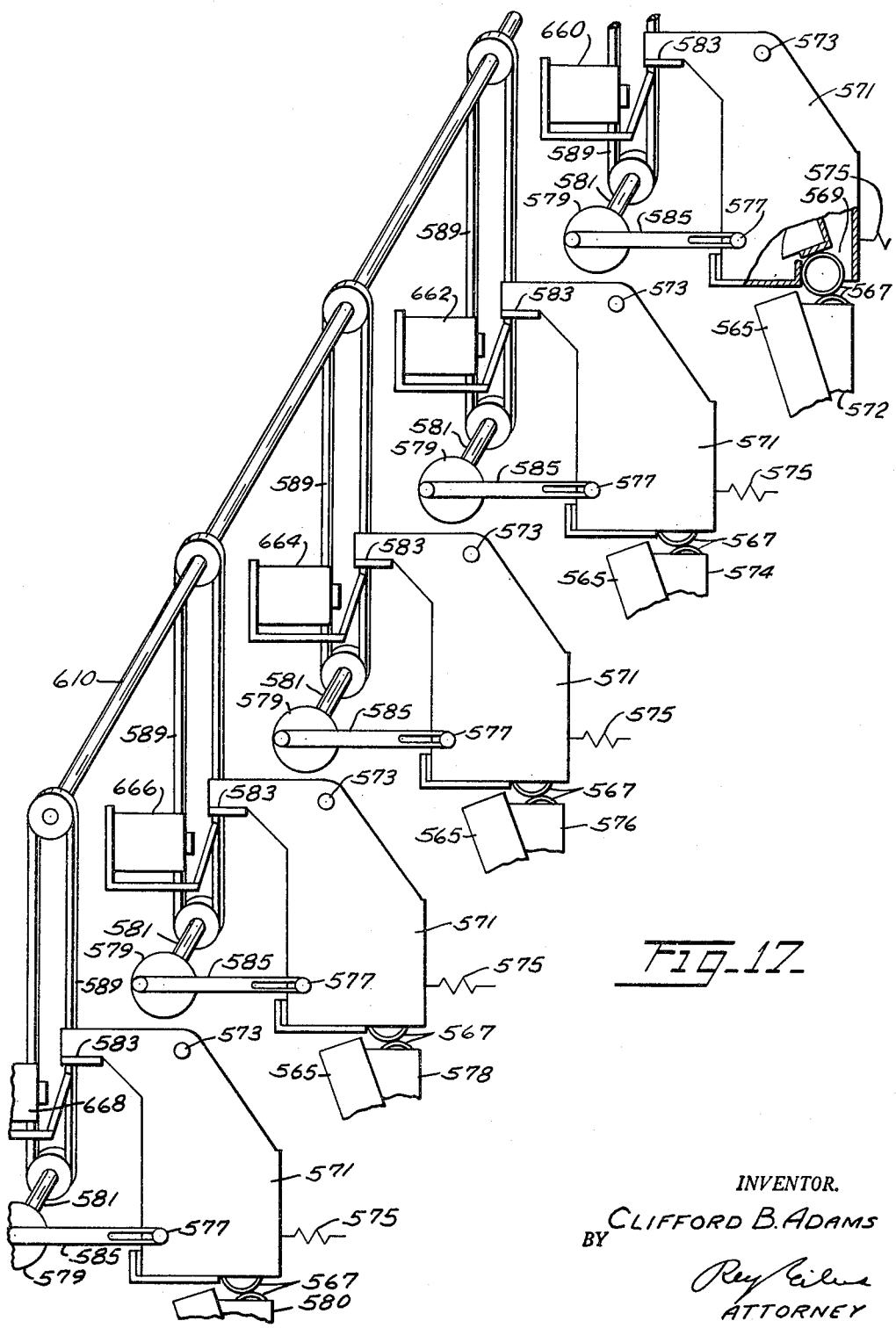

United States Patent Office 3,186,531
Patented June 1, 1965

3,186,531
MONEY-ACTUATING DEVICES
Clifford B. Adams, Bellefontaine Neighbors, Mo., assignor to National Rejectors, Inc., St. Louis, Mo., a corporation of Missouri
Filed Oct. 26, 1960, Ser. No. 65,030
50 Claims. (Cl. 194—10)

This invention relates to improvements in money-actuated devices. More particularly, this invention relates to improvements in money-actuated devices that can dispense products and that can give change.

It is therefore an object of the present invention to provide an improved money-acuated device that can dispense products and that can give change.

It would be desirable to have a money-actuated device which could accept money in the form of pennies, nickels, dimes, quarters, half dollars, one dollar bills and five dollar bills, which could credit the patron with the acceptance of such money, which could thereafter permit the patron to select one or more products, which could then vend the selected products if the total value of the money inserted by the patron equalled or exceeded the total of the sales prices of those products, and which could then give the correct amount of change to the patron in the form of pennies, nickels, dimes, quarters, half dollars, one dollar bills, two dollar bills, or five dollar bills. Such a money actuated device would greatly extend the areas where automatic merchandising could be used. The present invention provides such a money-actuated device; and it is therefore an object of the present invention to provide a money-actuated device which accepts money in the form of pennies, nickels, dimes, quarters, half dollars, one dollar bills and five dollar bills, which credits the patron with the acceptance of such money, which vends the selected products if the total value of the money inserted by the patron equals or exceeds the total of the sales prices of those products, and which gives the correct amount of change to the patron in the form of pennies, nickels, dimes, quarters, half dollars, one dollar bills, two dollar bills, or five dollar bills.

The money-actuated device provided by the present invention can provide may, individually-different sales prices. Specifically, that device can provide nine hundred and ninety-nine individually-different sales prices. Further, the money-actuated device of the present invention can be set to provide the same or individually-different sales prices for the various products to be vended by that device. As a result, the device provided by the present invention is extremely versatile and makes it possible to vend many different products of widely-differing value. It is therefore an object of the present invention to provide a money-actuated device which can provide nine hundred and ninety-nine individually-different sales prices and that can provide the same or individually-different sales prices for the various products to be vended by that device.

The money-actuated device provided by the present invention does not require a patron to insert the coins or bills in any predetermined sequence. Instead, that device can accept coins and bills which are inserted in random sequences; and it will accurately credit the patron with the values of all of those coins and bills. Further, the total value credited to a patron can be applied toward the purchase price of any of the products to be vended by that device.

The money-actuated device provided by the present invention will not only give the patron the correct amount of change but it will use a minimum number of coins and bills in doing so. For example, if the value of the change exceeded nine dollars and seventy-five cents, a five dollar bill, two two dollar bills, a half dollar, a quarter and other lesser coins could be used to make that change. If the value of the change exceeded four dollars but was less than five dollars, two two dollar bills plus coins would be used to make the change. In each case where change is to be given to the patron, a five dollar bill would be used instead of two two dollar bills plus a one dollar bill, a half dollar would be used instead of two quarters, a quarter would be used instead of two dimes plus a nickel, and a dime would be used instead of two nickels. In brief, the money-actuated device of the present invention will use the minimum number of bills and coins that could be used in making change. It is therefore an object of the present invention to provide a money-actuated device which uses the minimum number of bills and coins in making change.

The money-actuated device provided by the present invention does not limit a patron to just one selection. Instead, that device makes it possible for a patron to make as many selections as he wishes, provided the value of the money credited to him equals or exceeds the total of the sales prices of the various products selected. After the various desired products have been vended, the patron can then obtain change which exactly equals the difference between the total of the credits and the total of the sales prices of the vended products. It is therefore an object of the present invention to provide a money-actuated device that permits a patron to make one or more selections and that will then give the patron change which exactly equals the difference between the total of the credits and the total of the sales prices of the vended products or product.

The money-actuated device provided by the present invention will permit a patron to insert money, to make one or more selections, and then, if desired, to insert more money and to make one or more further selections. Regardless of how many insertions of money that are made, and regardless of how many desired products that are vended, the money-actuated device provided by the present invention will always keep track of the residual credit and will only vend further products if the residual credit equals or exceeds the sales prices of the desired products. Further, regardless of how many insertions of money that are made, and regardless of how many desired products that are vended, the money-actuated device provided by the present invention will give the patron change which exactly equals the difference between the total of the credits and the total of the sales prices of the vended products.

The bills and coins, which the money-actuated device provided by the present invention gives the patron as change, will pass to a cup-like coin receptacle which is accessible from the exterior of that device. As a result, the patron can readily collect those bills and coins. It would be desirable to give the patron all of the bills and all of the coins, used in making change, at the same time; because he could then collect them all at one time. If those bills and coins were to be given to the patron at different times during the cycle of the money-actuated device, the patron might attempt to collect his change before all of it had been given. That patron could, if he were impatient or otherwise in a hurry, walk away and fail to collect all of his change. Also, that patron's hand could be struck by coins or bills that were being given as change during the last portion of the cycle of the money-actuated device as that patron was trying to collect the bills and coins that had been given as change during an earlier part of the cycle of that device. Either of these results would be objectionable and should be avoided. The money-actuated device provided by the present invention avoids these objectionable results by giving all of the bills and all of the coins, which are used to make change, to the patron at the same time. It is therefore an object of the present invention to provide a money-actuated device that gives the patron, at one time, all of the bills and coins used in making change.

To collect his change, a patron does not need to do anything more than press a payout switch. Once that switch has been pressed, the money-actuated device provided by the present invention will automatically determine whether change is to be given to the patron; and if change is to be given, that device will automatically determine exactly how much change is to be given to the patron. Further, that device will automatically determine what bills and what coins should be used in making up that change; and then that device will automatically give that change to the patron.

The money-actuated device provided by the present invention will give a patron change if that patron selects and receives a product which has a sales price that is less than the value of the money inserted by that patron. That money-actuated device will also return a patron's own money if that patron decides not to make a selection. In either case, the patron need only press the payout switch; and the money-actuated device will then automatically return the patron's own money if a selection has not been made and will automatically give change if a selection has been made and the product has been received. It is therefore an object of the present invention to provide a money-actuated device wherein the pressing of the payout switch will automatically return a patron's own money to him if a selection has not been made but will automatically give that patron change if a selection has been made and the selected product has been vended.

The money-actuated device provided by the present invention does not require the patron to pull levers, push rods or otherwise supply motive power. All the patron need do is insert the money in the appropriate places, press a selection switch to secure the desired product, and then press the payout switch to obtain his change. In the event a patron changes her mind and decides not to make a selection, she can get her money back by merely pressing the payout switch. To make all of this possible, the money-actuated device provided by the present invention must be electrically powered; and yet, one problem that is associated with electrically-powered, money-actuated devices is that if a fuse blows or an electrical storm causes a current interruption, a patron may lose some of the credits due him. The present invention obviates this problem by using stepping switches that fixedly remain in position until they are advanced by energizations of the coils thereof. Further, the present invention obviates this problem by providing a mechanical latching relay which establishes a mechanical "memory" of whether a selection has not yet been made or a selection and vend have been made. As a result, current interruptions can only result in temporary delays and can not lead to the loss of credits due the patron. It is therefore an object of the present invention to provide an electrically-powered, money-actuated device which utilizes stepping switches that fixedly remain in position until they are advanced by energizations of the coils thereof and which utilizes a mechanical latching relay that establishes a mechanical "memory" of whether a selection has not been made or a selection and vend have been made.

Whenever money is inserted in the money-actuated device provided by the present invention, the selection circuits are disabled and the payout circuits are disabled. This is desirable, because it will protect the patron against the loss of credits corresponding to the inserted money, which could occur if those circuits were permitted to operate while money was being inserted. It is therefore an object of the present invention to provide a coin-actuated device which accepts coins of different values and credits the patron with the values of those coins, and which disables the selection circuits and the payout circuits whenever money is being inserted.

The money-actuated device provided by the present invention has a vending circuit and has a deducting circuit. The vending circuit leads to the bending of the desired product, and the deducting circuit leads to the deduction of the sales price of that product from the credits due the patron to provide a residual credit due the patron. The operations of those two circuits are initiated simultaneously, to reduce the length of the overall cycle of the money-actuated device; and yet those two circuits must be isolated from each other to keep one of them from re-starting the other at the conclusion of the cycle of operation of that other circuit. The present invention makes it possible to initiate the operations of the vending circuit and of the deduction circuit simultaneously and yet keep either of those circuits from re-starting the other when that other has completed its cycle of operation.

It would be undesirable to permit the money-actuated device provided by the present invention to continue to operate in the event the vending relay of the vending circuit or the credit relay were to become stuck. The present invention prevents further operation of the money-actuated device in the event the vending relay or the credit relay became stuck; and it does so by transferring the running circuit of the deductor motor to serially-connected, normally-closed contacts on the vending relay and on the credit relay. If those relays have become stuck, and thus have not permitted those contacts to re-close, the deductor motor will come to rest and will not complete its cycle. As long as that deductor motor does not complete its cycle, further bills or coins can not be accepted and further selections can not be made. However, if those relays subsequently restore those contacts, the deductor motor can complete its cycle and thereby ready the money-actuated device for further operation.

The present invention utilizes electromagnets and cams in the paying out of the bills and coins as change, and those cams are mounted on motor-driven shafts. It would be undesirable to permit either of those shafts to make more than one revolution during a cycle of operation of the money-actuated device. The present invention keeps each of those shafts from making more than one revolution during a cycle of operation of the money-actuated device by equipping those shafts with cycle control switches that, prior to the completions of the revolutions of those shafts, de-energize the motors which drive those shafts, and that also prevent re-energization of those motors unless the starting circuits of those motors have re-opened. In this way, the present invention makes certain that neither of those cam-operated shafts will make more than one revolution during a cycle of operation of the money-actuated device.

The money-actuated device of the present invention uses three stepping switches, and those stepping switches participate in most of the phases of operation of that device. For example, those switches participate in the registering of credits when money is inserted, they participate in the sensing for the presence of sufficient credit to equal or exceed the sales price of the selected product, they participate in the deducting of the sales price from the credit due the patron, and they participate in the giving of change. By participating in so many phases of the operation of the money-actuated device, those stepping switches reduce the total number of components needed. Further, and more importantly, by participating in so many phases of the operation of the money-actuated device, those stepping relays avoid the loss of credits that could occur if several groups of switches or relays were used and one or more of those groups got out of register with the others. Moreover, by having those stepping switches participate in so many phases of the operation of the money-actuated device, the present invention prevents losses to patrons or to the operator of the money-actuated device in the event of current interruptions, because those stepping switches will provide mechanical "memories" of the status of the various phases of operation of that money-actuated device. It is therefore an object of the present invention to provide a money-actuated device which has three stepping switches that participate in the registering of credits when money is inserted, that participate in the sensing for the presence of sufficient credit to equal or exceed the sales price of the selected product, that participate in the deducting of the sales price from the credit due the patron, and that participate in the giving of change.

The three stepping switches in the money-operated device of the present invention record and display credits on a decimal system basis. For example, one of those stepping switches records and displays credits in the range of one through nine cents; and that stepping switch can be appropriately referred to as a unit registration stepping switch. A second of those stepping switches records and displays ten, twenty, thirty, forty, fifty, sixty, seventy, eighty and ninety cent credits; and that second stepping switch can be appropriately referred to as a tens registration stepping switch. The third of those stepping switches records and displays one hundred, two hundred, three hundred, four hundred, five hundred, six hundred, seven hundred, eight hundred and nine hundred cent credits, one through nine dollars; and that third stepping switch can be appropriately referred to as a hundreds registration stepping switch.

The wipers of the three stepping switches used in the money-actuated device of the present invention are uni-directional in their movements. To enable those stepping switches to provide the required deduction of credit after a product has been vended, and still enable the wipers of those stepping switches to move uni-directionally, the present invention applies pulses, to the coils of those stepping switches, which are the ten complements of the three digits of the sales price, as modified by the "carry forward" involved in the computation of those tens complements. For example, if the sales price were one dollar and thirty seven cents, and if the patron had inserted a five dollar bill, the present invention would apply a direct tens complement of three pulses to the unit registration stepping switch, would apply a modified tens complement of six pulses to the tens registration stepping switch, and would apply a modified tens complement of eight pulses to the hundreds registration stepping switch. As a result, the dials of those stepping switches would correctly display, and the wipers of those stepping switches would correctly record, a residual credit of three dollars and sixty three cents. It is therefore an object of the present invention to enable the three stepping switches of a money-actuated device to provide the required deduction of credit after a product has been vended and still enable the wipers of those stepping switches to move uni-directionally by applying pulses to the coils of those stepping switches, which are the ten complements of the three digits of the sales price, as modified by the "carry forward" involved in the computation of those tens complements.

The money-actuated device provided by the present invention has three relays that are energized whenever the three digits of the sales price exactly equal the three digits of the credit due the patron; and those relays can be appropriately referred to as exact relays. Further, that device has three relays which are energized whenever the three digits of the sales price are smaller than the three digits of the credit due the patron; and those relays can be appropriately referred to as over relays. The exact relays and the over relays coact to determine if the credit due the patron equals or exceeds the sales price of the desired product, and those relays also coact to modify the tens complements which can be required to enable the stepping relays to record and display the residual credit after a product has been vended. In the money-actuated device provided by the present invention, an exact relay and an over relay is provided for each of the three stepping switches. It is therefore an object of the present invention to provide an exact relay and an over relay for each of the three stepping switches of a money-actuated device.

The money-actuated device provided by the present invention senses for the presence of sufficient credit to equal or exceed the sales price of the desired product immediately upon the pressing of a selection switch. That sensing is done without any movement of mechanical or electro-mechanical components such as stepping switches, motors, or the like. As a result, that sensing is substantially static in nature; and it is performed immediately, with no wear of components, and with no loss of registration of components. It is therefore an object of the present invention to provide a money-actuated device wherein the sensing of available credit is done each time a selection is made, is done immediately, is done without any movement of mechanical or electro-mechanical components.

The money-actuated device provided by the present invention credits a patron with the value of the inserted money with a minimum number of components. For example, that device provides a penny-operated circuit that directly energizes the coil of the unit registration stepping switch, provides a dime-operated circuit that directly energizes the coil of the tens registration stepping switch, and provides a dollar-operated circuit that directly energizes the coil of the hundreds registration stepping switch. Also, that device provides a five-pulse generator that responds to the insertion of a nickel, a half dollar or a five dollar bill to apply five pulses, respectively, to the penny-operated circuit, to the dime-operated circuit, or to the dollar-operated circuit. When a quarter is inserted, it directly supplies two pulses to the dime-operated circuit and causes the five-pulse generator to apply five pulses, to the penny-operated circuit. In this way, the present invention uses a penny-operated circuit, a dime-operated circuit and a dollar-operated circuit plus a five-pulse generator to credit patrons with the insertion of pennies, nickels, dimes, quarters, half dollars, one dollar bills and five dollar bills.

The money-actuated device provided by the present invention also uses a minimum number of components in energizing the electromagnets which help effect the giving of change. For example, that device connects contacts, calling for the giving out of from one through four pennies or dollars, directly to the electromagnets that help give pennies and dollars as change; and that device also connects contacts, calling for the giving out of from six through nine pennies or dollars, to the first said contacts via contacts on the unit registration and hundreds registration stepping switches. Those contacts on the unit registration and hundreds registration stepping switches will be open whenever the wipers of those switches are in their zero through four positions but will be closed whenever those wipers are in their five through nine positions. As a result, the electromagnets that help give pennies and dollars as change will respond only to the contacts calling for the giving out of from one through four pennies or dollars as long as the wipers of the unit registration and hundreds registration stepping switches are in their zero through four positions but the electromagnets that help give pennies and dollars as change will automatically respond to the contacts calling for the giving out of from six through nine pennies or dollars as soon as the wipers of the unit registration and hundreds registration stepping switches move into their five through nine positions.

Other and further objects and advantages of the present invention should become apparent from an examination of the drawing and accompanying description.

In the drawing and accompanying description, a preferred embodiment of the present invention is shown and and described but it is to be understood that the drawing and accompanying description are for the purpose of illustration only and do not limit the invention and that the invention will be defined by the appended claims.

Figure 2:
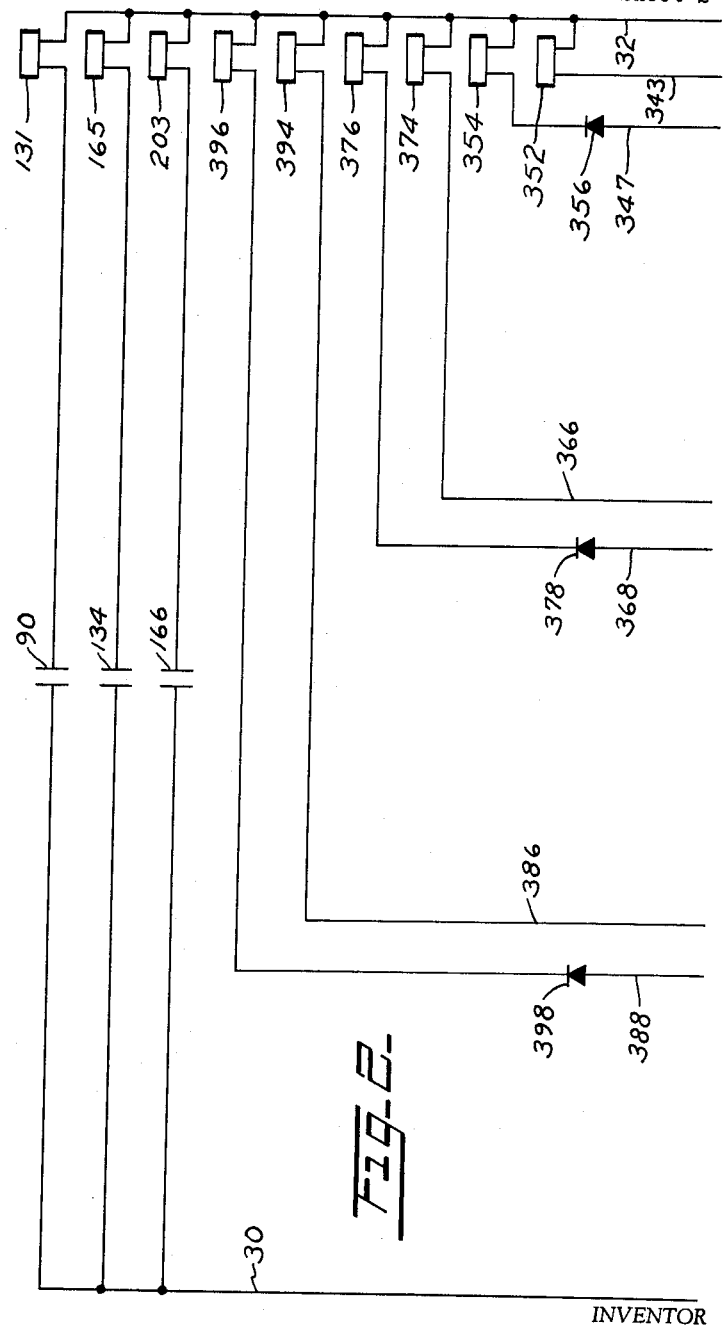
Figure 3:
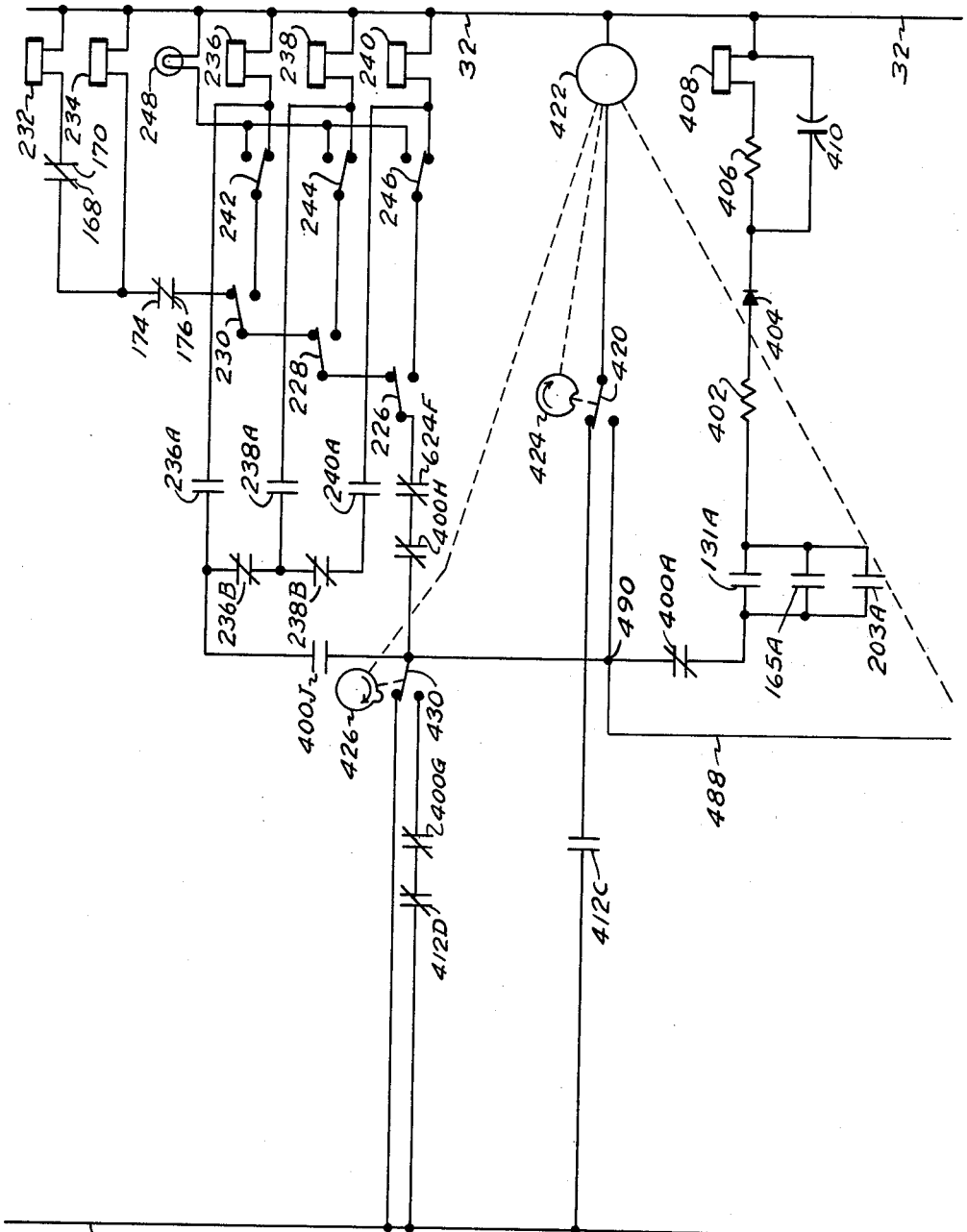
Figure 4:
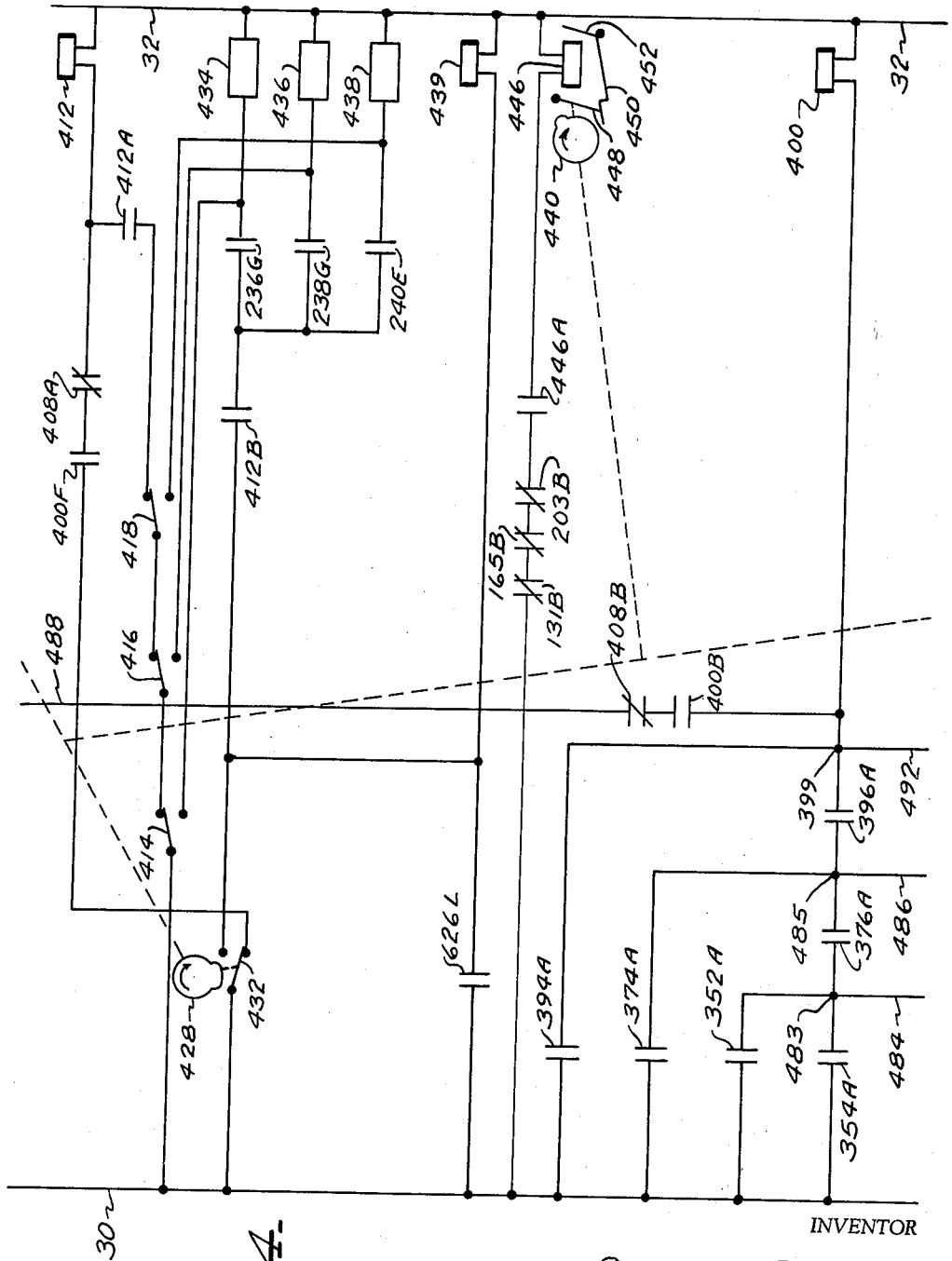
Figure 5:
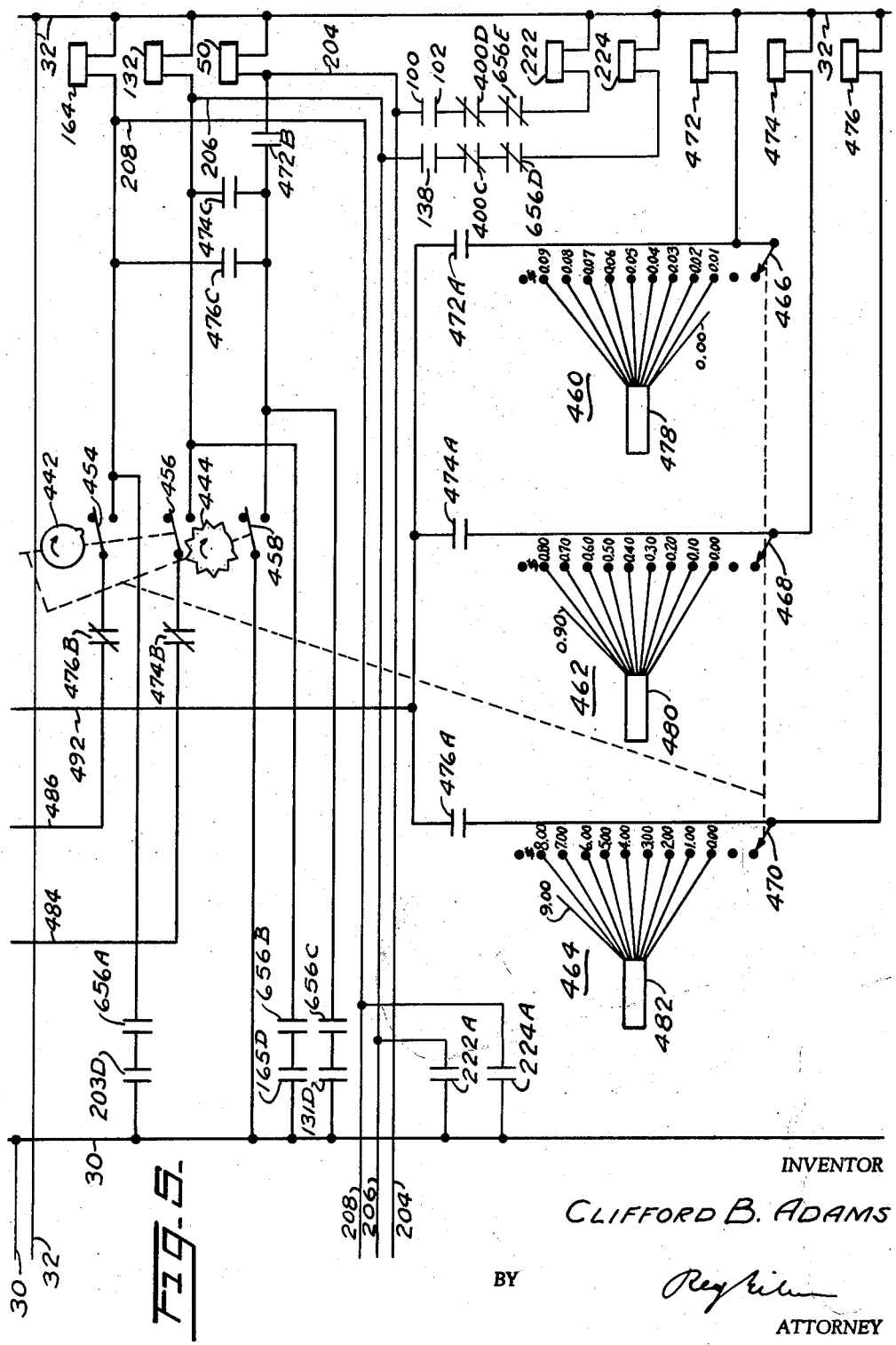
Figure 6:
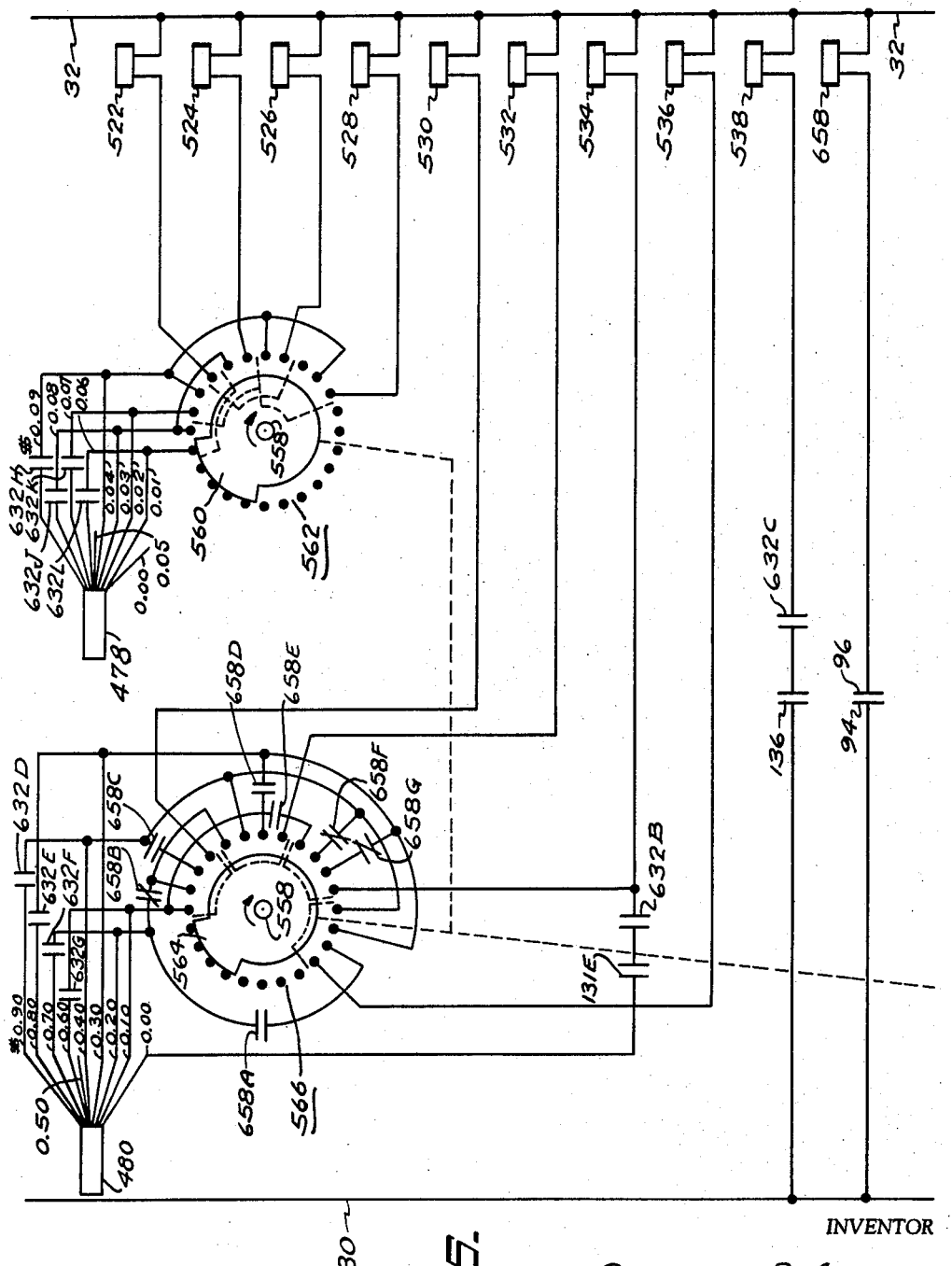

In the drawing,

FIG. 1 is a schematic view of the unit registration, the tens registration and the hundreds registration stepping switches, and adjacent components used in the money-actuating device provided by the present invention, FIG. 2 is a schematic diagram showing the exact relays and the over relays and some of the contacts on the stepping switches of FIG. 1, FIG. 3 is a schematic view showing the selection switches, the selection relays and the deductor motor used in the money-actuated device of the present invention, FIG. 4 is a schematic showing of the vend relay, the vending motors, the mechanical latching relay, the credit relay, and other components of the money-actuated device provided by the present invention, FIG. 5 is a schematic showing of the deductor switches used in the money-actuated device of the present invention, FIG. 6 is a schematic showing of two rotary switches that participate in the paying out of coins, and it also shows other components used in the money-actuated device of the present invention, FIG. 7 is a schematic showing of the electromagnets which participate in the giving out of bills, and it also shows the motor which is used in the giving out of bills.

FIG. 8 is a schematic showing of the motor which is used in the paying out of coins, and it also shows a pulsing circuit used in the money-actuating device provided by the present invention, FIG. 9 is a schematic showing of the coin-actuated switches and of the five-pulse used in the money-actuated device of the present invention, FIG. 10 is a diagrammatic view showing the manner in which the sheets on which FIGS. 1 through 9 appear should be grouped to show the proper interrelation of FIGS. 1–9, FIG. 11 is a front elevational view of one of the three stepping switches shown in FIG. 1, FIG. 12 is a side elevational view of the stepping switch shown in FIG. 11.

FIG. 13 is a sectional view through the stepping switch of FIG. 11, and it is taken along the plane indicated by the line 13—13 in FIG. 11, FIG. 14 is another sectional view through the stepping switch of FIG. 11, and it is taken along the plane indicated by the line 14—14 of FIG. 11, FIG. 15 is another sectional view through the stepping switch of FIG. 11, and it is taken along the plane indicated by the line 15—15 in FIG. 11, FIG. 16 is a schematic view, in perspective, showing the payout reservoirs, the payout slides, the electromagnets, and the cams used in giving coins as change, and it also shows the shaft which supports those cams and the wipers of two rotary selector switches, and FIG. 17 is a schematic view, in perspective, showing the payout reservoirs, the bill ejectors, the electromagnets, and the cams used in giving bills as change, and it also shows the shafts that drive those cams.

The money-actuated device provided by the present invention has a number of overall circuits; and each of those overall circuits has a number of sub-circuits and components. Those overall circuits are described hereinafter in appropriately identified sections of this description; and the sub-circuits and components of each overall circuit are described in the section which describes that overall circuit. Those overall circuits are: Money Registering Circuit, Product Selection Circuit, Value Sensing Circuit, Vend Relay Circuit, Product Vending Circuit, Credit Deduction Circuit, Change Payout Circuits, and Homing Circuit.

The overall circuits have some sub-circuits and components common; and, as a result, some of the overall circuits have the components thereof shown in several different views of the drawing. For convenience and clarity, a chart has been provided at the end of this description which indicates where each electrical component appears in the drawing. Two conductors 30 and 32 appear in all of FIGS. 1–9; and those conductors will be suitably connected to a source of alternating current. The conductor 32 will be connected to the grounded side of the alternating current source and the conductor 30 will be connected to the "hot" side of that source. Those conductors supply the current needed to operate the money-actuated device of the present invention.

*Money registering circuit*

As indicated particularly by FIG. 9, the Money Registering Circuit includes a number of money-actuated switches. One of those switches is denoted by the numerals 34, and it will be actuated by pennies. That switch is a single pole, double throw switch, and the movable contact of that switch is connected to the conductor 30. The numeral 36 denotes a single pole, double throw switch that will be actuated by nickels. The movable contact of the switch 36 is connected to the upper fixed contact of the switch 34. The numeral 38 denotes a single pole, double throw switch that will be actuated by dimes. The movable contact of that switch is connected to the upper fixed contact of the switch 36. The numeral 40 denotes a single pole, double throw switch that will be actuated by quarters. The movable contact of that switch is connected to the upper fixed contact of the switch 38. The numeral 42 denotes a single pole, double throw switch that will be actuated by half dollars. The movable contact of that switch is connected to the upper fixed contact of the switch 40. The actuators of the switches 34, 36, 38, 40 and 42 will, respectively, extend into the paths of pennies, nickels, dimes, quarters and half dollars which are inserted in the money-actuated device of the present invention. Those various coins will pass through one or more slug rejectors before they engage the actuators of those switches; and the said slug rejector or slug rejectors will reject any slugs or spurious coins. The actuator for the dime-actuated switch 38 will be arranged so a quarter, as well as a dime, can engage and move that actuator.

The numeral 44 denotes a single pole, double throw switch; and the movable contact of that switch is connected to the upper fixed contact of the switch 42. The switch 44 is adjacent a relay that is part of a currency detector for one dollar bills. That currency detector could be of the type shown and described in Smith et al. application Ser. No. 849,066 for Currency Detectors which was filed Oct. 27, 1959; and that currency detector will respond to the insertion of an authentic one dollar bill to cause the movable contact of switch 44 to move down into engagement with its lower fixed contact and then permit that movable contact to return to its normal upper position.

The numeral 46 denotes a single pole, double throw switch; and the movable contact of that switch is connected to the upper fixed contact of the switch 44. The switch 46 is adjacent a relay that is part of a currency detector for five dollar bills. That currency detector could be of the type shown and described in the said Smith et al. application; and that currency detector will respond to the insertion of an authentic five dollar bill to cause the movable contact of switch 46 to move down into engagement with its lower fixed contact and then permit that movable contact to return to its normal upper position.

As indicated particularly by FIG. 9, the movable contacts of the switches 34, 36, 38, 40, 42, 44, and 46 are normally in their upper positions; and in those positions those movable contacts complete a circuit via conductor 30, switches 34, 36, 38, 40, 42, 44 and 46, relay contacts 142A, money registering relay coil 140 and conductor 32. The money registering relay coil 140 operates a pair of contacts 140A in FIG. 1 and a pair of contacts 140B in FIG. 7; and those contacts are open whenever the relay coil 140 is de-energized. However, whenever that relay coil is energized those contacts will be held closed.

The money registering circuit also includes three rotary stepping switches 48, 133 and 137; and those switches are shown schematically in FIG. 1. Those rotary stepping switches are identical; and hence only one of them, namely switch 48, will be described in detail, as by FIGS. 11–15. The rotary stepping switch 48 has a coil 50. A pivot 52 is spaced to the left of the coil 50 in FIG. 12, and a ratchet wheel 54 is rotatably mounted on that pivot. That ratchet wheel has ten equally-spaced teeth, and it also has a cam rise 56, a cam rise 58, and a cam rise 60. As indicated particularly by FIG. 13, the cam rise 56 is closest to the pivot, the cam rise 58 is further from that pivot, and the cam rise 60 is the most distant from that pivot. A cylindrical dial 62, which has the numerals zero through nine formed on its face, has the hub thereof telescoped over the hub of the ratchet wheel 54. Suitable fasteners, shown as machine screws, extend through the web of the cylindrical dial 62 and seat in threaded sockets in the hub of the ratchet wheel 54 to lock that dial and that wheel for conjoint rotation. The dial 62 has a number of indexing stops 64 which project axially outwardly from the left-hand edge of the face of that dial, so that dial is viewed in FIG. 11.

The rotary stepping switch 48 has a horizontally-directed, slotted guide plate 66 disposed at about the level of the axis of the pivot 52, and it also has a horizontally-directed, slotted guide plate 68 disposed below the level of the axis of that pivot. The numeral 70 denotes a plunger which has the right-hand portion thereof reciprocably mounted within the coil 50 and which has ears 72 and 74 that extend into the slots of the slotted guide plates 66 and 68, respectively. The engagement of those ears with those slots will hold the plunger 70 for movement that is generally parallel to the axis of the coil 50 while permitting slight vertical movement of the left-hand end of that plunger. The left-hand end of the plunger 70 has a notch 76 therein which enables that plunger to engage the teeth of the ratchet wheel 54 and to force that ratchet wheel to rotate in the clockwise direction in FIG. 13. The plunger 70 also has a horizontally-directed surface 78 adjacent the right-hand end thereof; and that surface can accommodate and hold the indexing stops 64 on the dial 62. A helical extension spring 80 has the left-hand end thereof suitably secured to a projection on the frame of the rotary stepping switch 48, and it has the right-hand end thereof seated in a notch adjacent the lower end of the ear 74 on the plunger 70. As a result, that spring biases the plunger 70 to the left in FIG. 13, but that spring can yield to permit that plunger to move to the right whenever the coil 50 is energized.

The rotary stepping switches 48, 133 and 137 are of the type that are cocked whenever the coils thereof are energized and that advance the dials, the ratchet wheels and the wipers thereof only after those coils have subsequently become de-energized. Specifically, whenever the coil 50 is energized, the plunger 70 will be pulled to the right and the notch 76 in the left-hand end of that plunger will be moved to the right of the next counter-clockwise tooth on the ratchet wheel 54; and the spring 80 will pull that notch up into engagement with the rear face of that tooth. Such movement of the plunger 70 will not advance the dial 62, the ratchet wheel 54 or the wiper 126 of the switch 48. Not until the coil 50 is subsequently de-energized, and the helical extension spring 80 pulls the plunger 70 back to its normal position, will the dial 62, the ratchet wheel 54, and the wiper 126 be rotated; and as the spring 80 retracts the plunger 70, the dial 62, the ratchet wheel 54 and the wiper 126 will be rotated thirty six degrees in the clockwise direction. Successive energizations and de-energizations of the coil 50 will successively step the dial 62, the ratchet wheel 54 and the wiper 126 in the clockwise direction.

The numeral 82 denotes a pivot which is disposed to the right, and above the level, of the pivot 52. A pawl 84 is rotatably mounted on that pivot, and the lower end of that pawl is adapted to engage the teeth of the ratchet wheel 54. The lower end of the pawl 84 is formed so it will readily permit the ratchet wheel 54 to rotate in the clockwise direction but will prevent rotation of that ratchet wheel in the counter-clockwise direction. A cam follower 86 also is rotatably mounted on the pivot 82; and the left-hand end of that cam follower rests on the periphery of the ratchet wheel 54 and will be successively engaged by the cam rises 56, 58 and 60 as that ratchet wheel and the dial 62 are stepped in the clockwise direction. A spring 88 is wound around the pivot 82, and one end thereof is hooked over the upper edge of the cam follower 86 while the other end thereof engages the right-hand end of the pawl 84. As a result, that spring biases the left-hand end of the cam follower 86 downwardly toward the periphery of the ratchet wheel 54 while also biasing the left-hand end of the pawl 84 toward the teeth of that ratchet wheel.

The right-hand end of the cam follower 86 carries a disc 89 of insulating material, and that disc moves downwardly and upwardly, respectively, as the cam rises 56, 58 and 60 engage, and then move out of engagement with, the left-hand end of the cam follower 86. The normal position of the disc 89 is shown by FIG. 13; and, in that position, that disc holds a pair of contacts 90 apart. As the first cam rise 56 engages the left-hand end of the cam follower 86, the disc 89 will move down far enough to permit the contacts 90 to close. Subsequently, as the second cam rise 58 engages the left-hand end of the cam follower 86, the disc 89 will move down far enough to engage a short length of insulating rod 91 carried by a movable contact 94 and move that contact down out of engagement with a fixed contact 92 and into engagement with a fixed contact 96. Later, as the third cam rise 60 engages the left-hand end of the cam follower 86, the disc 89 will move down far enough to cause the rod 91 to engage a movable contact 100 and move that contact out of engagement with a fixed contact 98 and into engagement with a fixed contact 102.

The dial 62 of the stepping switch 48 is mounted adjacent a window in a panel of the money-actuated device; and, in the normal position of that dial, the numeral zero will be displayed in that window. At the time the first cam rise 56 permits the contacts 90 to close, the numeral one on the dial 62 will be moving into register with the window in the panel. At the time the second cam rise 58 causes the contact 94 to move out of engagement with the contact 92 and into engagement with the contact 96, the numeral five on the dial 62 will be moving into register with the window in the panel. At the time the third cam rise 60 causes the contact 100 to move out of engagement with contact 98 and into engagement with contact 102, the numeral nine will be moving into register with the opening in the panel. As the numeral zero on the dial 62 moves into register with the window in the panel, the disc 89 on the cam follower 86 will move up far enough to re-open the contacts 90, to move the contact 94 into engagement with the contact 102, and to move the contact 100 into engagement with the contact 98. This means that the contacts 90 will be open when the numeral zero is displayed but will be closed whenever any of the numerals one through nine is displayed. Also, it means that the contacts 92 and 94 will be in engagement and the contacts 94 and 96 will be out of engagement whenever any of the numerals zero through four is displayed, but the contacts 92 and 94 will be out of engagement and the contacts 94 and 96 will be in engagement whenever any of the numerals five through nine is displayed. In addition, it means that the contacts 98 and 100 will be in engagement and the contacts 100 and 102 will be out of engagement whenever any of the numerals zero through eight is displayed, but that contacts 98 and 100 will be out of engagement and that the contacts 100 and 102 will be in engagement whenever the numeral nine is displayed.

The rotary stepping switch 48 has circumferentially-spaced, fixed contacts 104, 106, 108, 110, 112, 114, 116, 118, 120 and 122; and those contacts correspond, respectively, to the zero and one through nine positions of the dial 62. The rotary stepping switch 48 also has a common contact 124; and the wiper 126 has an inner contact 128 which always engages the common contact 124. That wiper also has an outer contact 130 which normally engages the contact 104 and successively engages the contacts 106, 108, 110, 112, 114, 116, 118, 120 and 122.

The rotary stepping switch 48 is for unit registration. Specifically, that rotary stepping switch is used to register credits from zero through nine cents.

The numeral 131 denotes a relay coil which is shown in FIG. 2; and the right-hand terminal of that coil is connected to conductor 32. The left-hand terminal of that coil is connectible to the conductor 30 by the contacts 90. That relay coil operates a normally-open pair of contacts 131A in FIG. 3, a normally-closed pair of contacts 131B in FIG. 4, a normally-open pair of contacts 131C in FIG. 7, a normally-open pair of contacts 131D in FIG. 5, and a normally-open pair of contacts 131E in FIG. 6. The contacts 131A, 131C, 131D and 131E are open only at the zero position of the dial 62, and the contacts 131B are closed only at the zero position of the dial 62.

A second rotary stepping switch 133 is for tens registration. Specifically, that rotary stepping switch is used to register credits of ten cents, twenty cents, thirty cents, forty cents, fifty cents, sixty cents, seventy cents, eighty cents and ninety cents. That switch has a coil 132; and it also has contacts 134 which are open only when the zero on the dial of that switch is displayed. The switch 133 has contacts 136 which are closed whenever any of the numerals five through nine of the dial of that switch is displayed and which will be open whenever any of the numerals zero through four of that dial is displayed. That switch also has contacts 138 which are open whenever any of the numerals zero through eight on the dial of that switch is displayed, and that are closed only when the numeral nine is displayed. The switch 133 has circumferentially-spaced, fixed contacts 144, 146, 148, 150, 152, 154, 156, 158, 160 and 162. Those contacts correspond, respectively, to the display of the numerals zero and one through nine on the dial of the switch 133. The wiper of the switch 133 is denoted by the numeral 143.

The numeral 165 denotes a relay coil which is shown in FIG. 2. The right-hand terminal of that coil is connected to the conductor 32, and the left-hand terminal of that coil is connectable to the conductor 30 by the contacts 134. That relay coil operates a pair of normally-open contacts 165A in FIG. 3, a pair of normally-closed contacts 165B in FIG. 4, a pair of normally-open contacts 165C in FIG. 7, and a pair of normally-open contacts 165D in FIG. 5. The contacts 165A, 165C and 165D will be open only when the dial of switch 133 displays the numeral zero; and the contacts 165B will be closed only when the dial of that switch displays the numeral zero.

The rotary stepping switch 137 is for hundreds registration. Specifically, that rotary switch is used to register credits of one hundred cents, two hundred cents, three hundred cents, four hundred cents, five hundred cents, six hundred cents, seven hundred cents, eight hundred cents, and nine hundred cents. The switch 137 has a coil 164; and that switch also has contacts 166 which are open only when the zero on the dial of that switch is displayed. The switch 137 has fixed contacts 168 and 172 and a movable contact 170; and the contacts 168 and 170 are shown in FIG. 3 while the contacts 170 and 172 are shown in FIG. 7. The switch 137 has contacts 174 and 176 which are shown in FIG. 3. The contacts 168 and 170 will be closed whenever any of the numerals zero through four on the dial of switch 137 is displayed whereas the contacts 170 and 172 will be open whenever any of those numerals is displayed. The contacts 168 and 170 will be open whenever any of the numerals five through nine on the dial of switch 137 is displayed, whereas the contacts 170 and 172 will be closed whenever any of those numerals is displayed. The contacts 174 and 176 will be closed whenever any of the numerals zero through eight on the dial of switch 137 is displayed but will be open whenever the numeral 9 is displayed.

The switch 137 has circumferentially-spaced, fixed contacts 180, 182, 184, 186, 188, 190, 192, 194, 196 and 198. Those contacts correspond, respectively, to the display of the numerals zero and one through nine on the dial of the switch 137. The wiper of that switch is denoted by the numeral 202.

The numeral 203 denotes a relay coil which is shown in FIG. 2. The right-hand terminal of that coil is connected to the conductor 32, and the left-hand terminal of that coil is connectable to the conductor 30 by the contacts 166. That relay coil operates a pair of normally-open contacts 203A in FIG. 3, a pair of normally-closed contacts 203B in FIG. 4, a pair of normally-open contacts 203C in FIG. 7, and a pair of normally-open contacts 203D in FIG. 5. The contacts 203A, 203C and 203D will be open only when the numeral zero on the dial of switch 137 is displayed, and the contacts 203B will be closed only when the numeral zero on that dial is displayed.

The openings, through which the numerals on the dials of the rotary stepping switches 48, 133 and 137 are displayed, are dimensioned so that just one numeral of each dial can be seen at any one time. Normally, the zeros of those three dials will be visible, but those dials can be advanced to display any one of nine hundred and ninety-nine permutations of numbers. The dial of the switch 137 will be disposed to the left of the dial for the switch 133, and the dial of the switch 48 will be disposed to the right of the dial for the switch 133.

The right-hand terminal of the coil 50 of the switch 48 is connected to the conductor 32, and the left-hand terminal of that coil is connected to the lower fixed contact of the switch 34 by a conductor 204. The right-hand terminal of the coil 132 is connected to the conductor 32, and the left-hand terminal of that coil is connected to the lower fixed contact of the switch 38 by a conductor 206. The right-hand terminal of the coil 164 is connected to the conductor 32, and the left-hand terminal of that coil is connected to the lower fixed contact of the switch 44 by the conductor 208.

The money registering circuit also includes a five cents relay coil 142 which is shown in FIG. 9. That relay coil has a pair of normally-closed contacts 142A in FIG. 9, a pair of normally-open contacts 142B in FIG. 9, a pair of normally-open contacts 142C in FIG. 9, and a pair of normally-closed contacts 142D in FIG. 9. The right-hand terminal of the coil 142 is directly connected to the conductor 32, and the left-hand terminal of that coil is connected to the lower fixed contact of the switch 36. The normally-open contacts 142B are intermediate the left-hand terminal of the five cents relay coil 142 and the upper fixed contact of a cam-operated switch 214 in FIG. 9. The movable contact of that cam-operated switch is directly connected to the conductor 30. The lower fixed contact of that switch is connected to the left-hand terminal of a motor 210 by the normally-closed contacts 142D of the five cents relay coil 142. The right-hand terminal of that motor is directly connected to the conductor 32. That motor drives a single-lobe cam which normally permits the movable contact and the upper fixed contact of the switch 214 to be in engagement; and that cam will, once during each revolution of the output shaft of the motor 210, shift the movable contact of switch 214 down into engagement with the lower fixed contact of that switch.

The motor 210 also drives a five-lobe cam which is adjacent a cam-operated switch 212. That switch is normally open, as shown by FIG. 9, but it will be closed five times by the five-lobe cam during each revolution of the output shaft of the motor 210.

The numeral 216 denotes the twenty five cents relay coil of the money registering circuit, and that coil has the right-hand terminal thereof directly connected to the conductor 32. The left-hand terminal of that relay coil is connected to the lower fixed contact of the switch 40. That relay coil operates a pair of normally-open contacts 216A in FIG. 9 which are connected intermediate the lower fixed contacts of the switches 38 and 40. That relay coil also operates normally-open contacts 216B in FIG. 9 which are connected in parallel with the normally-open contacts 142B. Thus, the contacts 216B are connected intermediate the left-hand terminal of the five cents relay coil 142 and the upper fixed contact of the cam-operated switch 214.

The numeral 218 denotes the fifty cents relay coil of the money registering circuit; and that relay is shown in FIG. 9. That coil has the right-hand terminal thereof connected directly to the conductor 32, and the left-hand terminal of that coil is connected to the lower fixed contact of the switch 42. That relay coil operates a pair of normally-open contacts 218A which are connected intermediate the left-hand terminal of the coil 218 and the upper fixed contact of the cam-operated switch 214. That relay coil also operates a pair of normally-open contacts 218B which are connected intermediate the left-hand terminal of the five cents relay coil 142 and the upper fixed contact of the cam-operated switch 214. The relay coil 218 additionally operates a pair of normally-open contacts 218C connected intermediate the fixed contact of the cam-operated switch 212 and the conductor 206; and that coil also operates a pair of normally-closed contacts 218D connected to the fixed contact of the cam-operated switch 212.

The numeral 220 denotes the five dollar relay coil of the money registering circuit, and the right-hand terminal of that coil is connected to the conductor 32 in FIG. 9. The left-hand terminal of that relay coil is connected to the lower fixed contact of the switch 46. That relay coil operates a pair of normally-open contacts 220A in FIG. 9 which are intermediate the left-hand terminal of that coil and the upper fixed contact of the cam-operated switch 214. The coil 220 also operates a pair of normally-open contacts 220B in FIG. 9 which are intermediate the left-hand terminal of the five cents relay coil 142 and the upper fixed contact of the cam-operated switch 214. In addition, the relay coil 220 operates a pair of normally-open contacts 220C intermediate the cam-operated switch 212 and the conductor 208 in FIG. 9 and a pair of normally-closed contacts 220D intermediate the conductor 204 and the normally-closed relay contacts 218D in FIG. 9.

The money registering circuit also includes a transfer relay coil 222, and the right-hand terminal of that coil is connected to the conductor 32 in FIG. 5. The left-hand terminal of that relay coil is normally isolated from the conductor 204 by the normally-open contacts 100 and 102 on the rotary stepping switch 48. The relay coil 222 operates a pair of normally-open contacts 222A which are connected intermediate the conductors 206 and 30, at the left-hand side of FIG. 5.

The numeral 224 denotes another transfer relay coil which has the right-hand terminal thereof connected to the conductor 32 in FIG. 5. The left-hand terminal of that coil is normally isolated from the conductor 206 by the normally-open contacts 138 on rotary stepping switch 133. The relay coil 224 operates a pair of normally-open contacts 224A which are intermediate the conductors 208 and 30 at the left-hand side of FIG. 5.

The numeral 232 denotes a bill-rejecting relay coil; and the right-hand terminal of that coil is directly connected to the conductor 32 in FIG. 3. Whenever that coil is energized it will permit the currency detector for five dollar bills to accept authentic five dollar bills, but whenever that coil is de-energized it will prevent acceptance of five dollar bills. The numeral 234 denotes a money-rejecting relay coil; and the right-hand terminal of that coil is connected to the conductor 32 in FIG. 3. Whenever that coil is energized it will permit pennies, nickels, dimes, quarters, half dollars and one dollar bills to be accepted; and it will, whenever both it and the bill-rejecting relay coil 232 are energized, permit five dollar bills to be accepted. However, whenever the coil 234 is de-energized, it will disable the currency detector for one dollar bills and will also cause coin-rejecting pins to reject pennies, nickels, dimes, quarters and half dollars, as by entering the slug rejectors for those coins.

*Product selection circuit*

Referring to FIG. 3, the numeral 226 denotes a single pole, double throw selection switch that will be accessible at the exterior of the money-actuated device. The movable contact of that switch will normally be in its upper position. The numeral 228 denotes a single pole, double throw selection switch that also will be accessible at the exterior of the money-actuated device; and the movable contact of that switch will normally be in its upper position. The movable contact of the switch 228 is directly connected to the upper fixed contact of the switch 226. The numeral 230 denotes a single pole, double throw selection switch that will be accessible at the exterior of the money-actuated device; and the movable contact of that switch will normally be in its upper position. The movable contact of the switch 230 is directly connected to the upper fixed contact of the switch 228.

Whenever the various circuits, sub-circuits and components of the money-actuated device are at rest, the switches 226, 228 and 230 complete a circuit via conductor 30, cam-operated switch 430, relay contacts 400H and 624F, switches 226, 228 and 230, contacts 174 and 176, contacts 168 and 170, relay coil 232, and conductor 32. Also, those switches will complete a circuit via conductor 30, cam-operated switch 430, relay contacts 400H and 624F, switches 226, 228 and 230, contacts 174 and 176, relay coil 234, and conductor 32. However, the actuation of any of the selection switches 226, 228 and 230 will interrupt both of those circuits, and will thereby de-energize both of the relay coils 232 and 234.

The numeral 236 denotes a selection relay coil, and the right-hand terminal of that coil is connected to the conductor 32 in FIG. 3. The left-hand terminal of that coil is connected to the lower contact of an empty switch 242; and the movable contact of that empty switch is connected to the lower fixed contact of the selection switch 230. The left-hand terminal of the selection relay coil 236 is also connected to a pair of normally-open contacts 236A operated by that coil. The selection relay coil 236 also operates a pair of normally-closed contacts 236B in FIG. 3, a pair of normally-open contacts 236C in FIG. 1, a pair of normally-open contacts 236D in FIG. 1, a pair of normally-open contacts 236E in FIG. 1, a pair of normally-closed contacts 236F in FIG. 1, and a pair of normally-open contacts 236G in FIG. 4.

The numeral 238 denotes another selection relay coil, and the right-hand terminal of that coil is connected to the conductor 32 in FIG. 3. The left-hand terminal of that coil is connected to the lower fixed contact of an empty switch 244; and the movable contact of that empty switch is connected to the lower fixed contact of the selection switch 228. The left-hand terminal of the relay coil 238 also is connected to a pair of normally-open contacts 238A operated by that coil. The coil 238 also operates a pair of normally-closed contacts 238B in FIG. 3, a pair of normally-open contacts 238C in FIG. 1, a pair of normally-open contacts 238D in FIG. 1, a pair of normally-open contacts 238E in FIG. 1, a pair of normally-closed contacts 238F in FIG. 1, and a pair of normally-open contacts 238G in FIG. 4.

The numeral 240 denotes a selection relay coil, and the right-hand terminal of the coil is connected to the conductor 32 in FIG. 3. The left-hand terminal of the coil 240 is connected to the lower fixed contact of an empty switch 246. The removable contact of that empty switch is connected to the lower fixed contact of the selection switch 226. The left-hand terminal of the coil 240 also is connected to a pair of normally open contacts 240A operated by that coil. The relay coil 240 also operates a pair of normally-open contacts 240B in FIG. 1, a pair of normally-open contacts 240C in FIG. 1, a pair of normally-open contacts 240D in FIG. 1, and a pair of normally-open contacts 240E in FIG. 4.

The movable contact of the empty switch 242 in FIG. 3 will move to its upper position only if the supply of the product associated with that empty switch becomes exhausted. Similarly, the empty switches 244 and 246 will have the movable contacts thereof moved to their upper positions only if the supplies of the particular products associated with those switches become exhausted. The movement of the movable contact of any of the empty switches 242, 244 and 246 to its upper position will preset a circuit through the "Make Other Selection" lamp 248 and the appropriate selection switch 236, 228 or 230.

*Value sensing circuit*

Referring to FIG. 1, the numerals 250, 252, 254, 256, 258, 260, 262, 264 and 266 denote resistors of substantially equal ohmic value. Those resistors are connected intermediate the circumferentially-spaced, fixed contacts 122, 120, 118, 116, 114, 112, 110, 108, 106 and 104 of the switch 48. Horizontally-directed bus bars 304 are also connected to those circumferentially-spaced, fixed contacts; and those bus bars are part of a price setter 305. Vertically-directed bus bars 306 also are part of the price setter 305, and those bus bars are normally isolated from the bus bars 304. However, price-setting pins or screws 316, 318 and 320 can be used to connect the bus bars 306 to selected bus bars 304. The lower end of the left-hand bus bar 306 extends to the junction between relay contacts 236C and 236D, the lower end of the middle bus bar 306 extends to the junction between relay contacts 238C and 238D, and the lower end of the right-hand bus bar 306 extends to the junction between the relay contacts 240B and 240C. The lowermost bus bar 304 corresponds to zero cents and the uppermost bus bar 304 corresponds to nine cents; and the intervening bus bars 304 correspond to one, two, three, four, five, six, seven and eight cents.

The numerals 268, 270, 272, 274, 276, 278, 280, 282 and 284 denote resistors of substantially equal ohmic value. Those resistors are connected intermediate the circumferentially-spaced, fixed contacts 162, 160, 158, 156, 154, 152, 150, 148, 146 and 144 of the switch 133. Horizontally-directed bus bars 308 are also connected to those circumferentially-spaced, fixed contacts; and those bus bars are part of a price setter 309. Vertically-directed bus bars 310 also are part of the price setter 309, and those bus bars are normally isolated from the bus bars 308. Price-setting pins or screws 322, 324 and 326 can be used to connect the bus bars 310 to selected bus bars 308. The lower end of the left-hand bus bar 310 extends to the junction between contacts 236E and 236D, the lower end of the middle bus bar 310 extends to the junction between contacts 238E and 238D, and the lower end of the right-hand bus bar 310 extends to the junction between contacts 240D and 240C. The lowermost bus bar 308 corresponds to zero cents and the uppermost bus bar 308 corresponds to ninety cents; and the intervening bus bars 308 correspond to ten, twenty, thirty, forty, fifty, sixty, seventy and eighty cents.

The numerals 286, 288, 290, 292, 294, 296, 298, 300 and 302 denote resistors of substantially equal ohmic value. Those resistors are connected intermediate the circumferentially-spaced, fixed contacts 198, 196, 194, 192, 190, 188, 186, 184, 182 and 180 of the switch 137. Horizontally-directed bus bars 312 are also connected to those circumferentially-spaced, fixed contacts; and those bus bars are part of a price setter 313. Vertically-directed bus bars 314 also are part of the price setter 313, and those bus bars are normally isolated from the bus bars 312. Price-setting pins or screws 328, 330 and 332 can be used to connect the bus bars 314 to selected bus bars 312. The lower end of the left-hand bus bar 314 extends to the contacts 236E, the lower end of the middle bus bar 314 extends to the contacts 238E, and the lower end of the right-hand bus bar 314 extends to the contacts 240D. The lowermost bus bar 312 represents zero dollars, the uppermost bus bar 312 represents nine dollars, and the intervening bus bars 312 represent one, two, three, four, five, six, seven and eight dollars.

The price-setting pins 328, 322 and 316 set the sales price of the product that will be vended when the selection switch 230 is actuated, and that sales price will be eight dollars and ninety nine cents. However, that sales price could be any one of nine hundred and ninety nine sales prices between zero and nine dollars and ninety nine cents.

The price-setting pins 330, 326 and 320 set the sales price of the product that will be vended when the selection switch 228 is actuated, and that sales price will be four dollars and sixty one cents. However, that sales price could be any one of nine hundred and ninety nine sales prices between zero and nine dollars and ninety nine cents.

The price-setting pins 332, 324 and 318 set the sales price of the product that will be vended when the selection switch 226 is actuated, and that sales price will be ninety seven cents. However, that sales price could be any one of nine hundred and ninety nine sales prices between zero and nine dollars and ninety nine cents.

In the drawing, only three selection switches have been shown, but there is no functional limit to the number of selection switches that can be provided. The only limit to the number of selection switches that will be provided will be the number of products which it is desirable to vend from one money-actuated device. To add further selection switches, it is only necessary to have the relay coil 240 operate a pair of normally-closed contacts, comparable to the contacts 236B and 238B, and then to supply additional selection switches, additional selection relay coils and contacts, additional empty switches, additional vertically-directed bus bars for the price setters 313, 309 and 305, and price-setting pins for those additional bus bars.

The numeral 334 denotes the primary winding of a transformer which is connected to the conductors 30 and 32 in FIG. 1, and that transformer has a filament winding 338 and a high voltage winding 336. The secondary winding 336 has the lower terminal thereof connected to the contact 104 of switch 48 and thus to the bottom terminal of the resistor 266. The upper terminal of that secondary winding is connected to the contact 122 of switch 48 and thus to the upper terminal of the resistor 250 by a resistor 337. The resistor 337 coacts with the resistors 250, 252, 254, 256, 258, 260, 262, 264 and 266 to constitute a voltage divider. The windings 336 and 338 are wound so the lower terminal of winding 338 will be negative-going whenever the upper terminal of the winding 336 is positive-going.

The numeral 342 denotes a gas tube, such as a thyratron; and that tube has the cathode and suppressor grid thereof connected to the filament thereof. That cathode is connected to the conductor 30 by a conductor 340 and by a conductor 341. The plate of the tube 342 is connected to the conductor 32 by a conductor 343 and by the coil 352 of an "over" relay. As a result, whenever the tube 342 fires, the coil 352 will be energized.

The filament winding 338 is connected to the filament of the tube 342. The upper terminal of the winding 338 is directly connected to the cathode of that tube, and the lower terminal of that winding is connected to the control grid of that tube by a resistor 344. As a result, the voltage across the filament winding 338 will appear across the control grid and cathode of the tube 342. The voltage at the control grid of tube 342 will be negative whenever the voltage at the plate of that tube is positive, and therefore that tube will normally be non-conductive.

The control grid of the tube 342 is connected to the price setter 305 by resistor 346, contacts 439A and wiper 126; and the cathode of that tube can be connected to that price setter by any one of the following paths: conductors 340, 341 and 30 and contacts 140A and 236C, or conductors 340, 341 and 30 and contacts 140A, 236F and 238C, or conductors 340, 341 and 30 and contacts 140A, 236F, 238F and 240B. Whenever any one of the said three paths is completed by the closing of the normally-open contacts therein, the price setter 305 will be connected between the control grid and the cathode of the tube 342; and the voltage drops across the various resistors 250, 252, 254, 256, 258, 260, 262, 264 and 266 will then, depending upon the position of the wiper 126, make the bias supplied by the filament winding 338 more negative, make the bias supplied by that winding less negative, or have no substantial effect upon the bias supplied by that winding. For example, if the contacts 140A, 236F, and 238C were closed at a time when the wiper 126 was in the position shown by FIG. 1, the voltage drop across the resistor 266 would make the grid of the tube 342 more negative; that resistor being connected between the control grid and cathode of the tube 342 via resistor 346, contacts 439A, wiper 126, resistor 266, the second lowermost bus bar 304, price-setting pin 320, middle bus bar 306, contacts 238C, 236F and 140A, and conductors 30, 341 and 340. However, if the contacts 140A, 236F and 238C were closed at a time when the wiper 126 was in engagement with the contact 108, the voltage drop across the resistor 264 would make the grid of the tube 342 less negative and would render that tube conductive; that resistor being connected between the control grid and cathode of the tube 342 via resistor 346, contacts 439A, wiper 126, resistor 264, the second lowermost bus bar 304, price-setting pin 320, middle bus bar 306, contacts 238C, 236F and 140A, and conductors 30, 341 and 340. On the other hand, if the contacts 140A, 236F and 238C were closed at a time when the wiper 126 was in engagement with the contact 106, none of the resistors 250, 252, 254, 256, 258, 260, 262, 264 or 266 would be connected between the control grid and cathode of the tube 342; and at such time, the resistor 346 would be connected in parallel with the series-connected resistor 344 and filament winding 338 and would slightly decrease the negative bias for the grid of the tube 342. However, that bias would still be sufficiently negative to keep that tube non-conductive.

In the illustrations given above, the voltage drop across just one resistor above the second lowermost bus bar 320 and the voltage drop across just one resistor below that bus bar were considered. However, the setting of the wiper 126 may be such as to connect several resistors between the control grid and the cathode of the tube 342. The connecting of several resistors, rather than just one resistor, between the control grid and cathode of the tube 342 will merely make the bias considerably more negative or considerably less negative and the overall result will be the same, because the voltage drop across any one of the resistors 250, 252, 254, 256, 258, 260, 262, 264 and 266 will be great enough, when properly applied, to render the tube 342 conductive.

The junction between the resistor 346 and the contacts 439A is connected to the conductor 32 by a conductor 347, a diode 356 and the coil 354 of an "exact" relay. That junction can be connected to the conductor 30 by contacts 439A, wiper 126, the price setter 305 and any one of the following groups of contacts: 236C and 140A, or 238C, 236F, and 140A, or 240B, 238F, 236F and 140A. As a result, whenever all of the contacts of any of those groups of contacts are closed, current will flow through the relay coil 354. If the wiper 126 is directly in engagement with the bus bar 304 through which the current is flowing, substantially the entire voltage across the conductors 30 and 32 will be applied across diode 356 and coil 354; and that coil will be energized. However, if the wiper is connected, to the bus bar 304 through which the current is flowing, through the medium of one or more of the resistors 250, 252, 254, 256, 258, 260, 262, 264 and 266, the greatest part of the voltage across the conductors 30 and 32 will be dropped across that resistor or resistors, and the voltage across the coil 354 will be too small to energize that coil.

From the foregoing, it should be apparent that if a suitable combination of the contacts 140A, 236C, 236F, 238C, 238F and 240F connect the conductor 30 to a bus bar 304 which is below the bus bar to which the wiper 126 is directly connected, the tube 432 will remain non-conductive and the coils 352 and 354 will not be energized. However, if that combination of contacts connects the conductor 30 to the bus bar 304 to which the wiper 126 is directly connected, the tube 432 will remain non-conductive and the relay coil 352 will not be energized, but the coil 354 will be energized. Further if that combination of contacts connects the conductor 30 to a bus bar 304 which is above the bus bar 304 to which the wiper 126 is directly connected, the coil 354 will not be energized but the tube 342 will become conductive and will energize the coil 352.

Whenever the wiper 126 is directly connected to a bus bar 304 which is above or below the bus bar 304 that is directly connected to the conductor 30, the serially-connected resistor 344 aand filament winding 338 will be connected in parallel with the resistor 346 and with the resistor or resistors intermediate the said two bus bars 304. At such time, the resistor 344 will keep the low impedance filament winding 338 from shorting out the voltage developed across the said resistor or resistors between those bus bars.

The diode 356 is provided to keep current, that could otherwise flow through the relay coil 354 during those periods when the wiper 126 is moving and is momentarily out of engagement with all of the fixed contacts of the switch 48, from bucking the negative bias on the grid of the tube 342. Without that diode, current could, on each half-cycle of the alternating current, flow from conductor 32 through the relay coil 354, conductor 347, resistor 346, resistor 344, and conductors 340 and 341 to the conductor 30; and the current on alternate half-cycles could buckle the negative bias on the grid of tube 342. With that diode, there is substantially no current flow on those alternate half-cycles and hence there is substantially no bucking of the negative bias.

Whenever the wiper 126 is directly connected to that bus bar 304 which is directly connected to the conductor 30, by an appropriate combination of the contacts 140A, 236C, 236F, 238C, 238F and 240B, that wiper will be connected in series with the resistor 346; and the two of them will be connected in parallel with the serially-connected resistor 344 and filament winding 338. At such time, the resistor 346 will keep the wiper 126 from shorting the control grid to the cathode of the tube 432; and this is desirable because any shorting of that control grid and cathode would permit that tube to become conductive prematurely.

Gas tubes 372 and 392 are, respectively, associated with the stepping switches 133 and 137. A transformer 360 supplies the current for the filament of the tube 372 and also supplies the voltage for the voltage divider which is constituted by the resistors 361, 268, 270, 272, 274, 276, 278, 280, 282 and 284. A resistor 362 is connected intermediate the grid and the cathode of the tube 372, and a resistor 364 is connected to the wiper 143 of the switch 133 by contacts 439B. A transformer 380 supplies the current for the filament of the tube 392 and also supplies the voltage for the voltage divider which is constituted by the resistors 381, 286, 288, 290, 292, 294, 296, 298, 300 and 302. A resistor 382 is connected intermediate the grid and the cathode of the tube 392, and a resistor 384 is connected to the wiper 202 of the switch 137 by contacts 439C.

The plate of the tube 372 is connected to the coil 374 of an "over" relay by a conductor 366. The lower terminal of the resistor 364 is connected to the coil 376 of an "exact" relay by a conductor 368 and a diode 378. The plate of the tube 392 is connected to the coil 394 of an "over" relay by a conductor 386. The lower terminal of the resistor 384 is connected to the coil 396 of an "exact" relay by a conductor 388 and a diode 398.

The filament windings of the transformers 360 and 380 are connected to the grids and cathodes of the tubes 372 and 392, respectively, in such a way as to enable those windings to apply negative-going voltages to the grids of those tubes whenever positive-going voltages are applied to the plates of those tubes. As a result, the tubes 372 and 392 are normally non-conductive. However, if the wipers 143 and 202 were to be connected to the conductor 30 at a time when those wipers were above the levels of the bus bars 308 and 312 connected to the conductor 30, the voltage drops across the resistors intermediate those wipers and those bus bars would render the tubes 372 and 392 conductive. Thereupon the coils 374 and 394 of the "over" relays would be energized. At that time the coils 376 and 396 of the "exact" relays would also be connected intermediate the conductors 30 and 32, but the voltages that would be dropped across the resistors which are intermediate those wipers and those bus bars would reduce the voltages across those coils to such an extent that those relays could not be energized. As a result, only the "over" relays would be energized.

If the wipers 143 and 202 were to be connected to the conductor 30 at a time when those wipers were directly in engagement with the bus bars 308 and 312 connected to the conductor 30 the full voltage across the conductors 30 and 32 would be applied to the coils 376 and 396; and the "exact" relays would be energized. At that time, none of the resistors associated with the stepping switches 133 and 137 would be connected intermediate the grids and cathodes of the tubes 372 and 392, and hence those tubes would remain non-conductive. As a result, only the "exact" relays would be energized.

If the wipers 143 and 202 were to be connected to the conductor 30 at a time when those wipers were below the levels of the bus bars 308 and 312 connected to the conductor 30, the voltage drops across the resistors intermediate those wipers and those bus bars would make the grids of the tubes 372 and 392 even more negative; and those tubes would remain non-conductive. At that time, the coils 376 and 396 of the "exact" relays would also be connected intermediate the conductors 30 and 32, but the voltages that would be dropped across the resistors which are intermediate those wipers and those bus bars would reduce the voltages across those coils to such an extent that those relays could not be energized. As a result, neither the "exact" nor the "over" relays would be energized.

The diode 378 is similar to the diode 356, and it prevents the flow of current through the resistors 364 and 362 on alternate half-cycles of the alternating current. The diode 398 is similar to the diode 356, and it prevents the flow of current through the resistors 384 and 382 on alternate half-cycles of the alternating current. As a result, the diodes 378 and 398 prevent premature firing of the tubes 372 and 392.

The resistors 364 and 384 are similar to, and perform the functions of, the resistor 346. Also, the resistors 362 and 382 are similar to, and perform the functions of, the resistor 344.

Vend relay circuit

The coils 352, 354, 374, 376, 394 and 396 operate contacts; and all of those contacts are shown in FIG. 4. Specifically, the coil 352 operates a pair of normally-open contacts 352A, the coil 354 operates a pair of normally-open contacts 354A, the coil 374 operates a pair of normally-open contacts 374A, the coil 376 operates a pair of normally-open contacts 376A, the coil 394 operates a pair of normally-open contacts 394A, and the coil 396 operates a pair of normally-open contacts 396A. The relay contacts 352A parallel the relay contacts 354A, the relay contacts 374A parallel the serially-connected relay contacts 354A and 376A or the serially-connected relay contacts 352A and 376A, and the relay contacts 394A parallel the serially-connected contacts 354A, 376A and 396A or the serially-connected contacts 352A, 376A and 396A or the serially-connected contacts 374A and 396A. This means that if the relay 394 is energized, the coil 400 of the credit relay will be energized irrespective of the energization or lack of energization of the coils 352, 354, 374, 376 and 396. If the coil 394 is not energized but the coils 374 and 396 are energized, the coil 400 will be energized. If neither the coils 374 nor 394 are energized but the coil 396 is energized, the coil 400 of the credit relay will be energized if the coil 376 and either of the coils 352 or 354 are energized. This means that various combinations of "exact" or "over" credits will be able to energize the coil 400 of the credit relay.

The relay coil 400 operates a large number of contacts. For example, that coil operates normally-closed contacts 400A, 400G and 400H in FIG. 3, operates normally-open contacts 400B and 400F in FIG. 4, operates normally-closed contacts 400C and 400D in FIG. 5, operates normally-closed contacts 400E in FIG. 7, and operates normally-open contacts 400J in FIG. 3. When the coil 400 is energized, the various contacts will change their positions—the normally-closed contacts opening and the normally-open contacts closing.

The relay contacts 400A are connected to the conductor 30 by a cam-operated switch 430 and a junction 490, and they are also connected to the left-hand contacts of the pairs of contacts 131A, 165A and 203A. The right-hand contacts of those pairs of contacts are connected to the conductor 32 by a resistor 402, a diode 404, a resistor 406 and a relay coil 408. A capacitor 410 is connected in parallel with the resistor 406 and the coil 408, and that capacitor will coact with the resistor 406 to keep the coil 408 energized for a finite period of time after the circuit of that coil is interrupted. The resistor 402 acts as a surge resistor to protect the diode 404.

The relay contacts 400B are connected to the left-hand terminal of the coil 400; and they are also connected to the conductor 30 via relay contacts 408B, conductor 488, junction 490 and a cam-operated switch 430. As a result, the contacts 400B can establish a holding circuit for the coil 400.

The relay contacts 400F are connected to the conductor 30 by a cam-operated switch 432, and they are connected to the left-hand terminal of the coil 412 of the vend relay by normally-closed relay contacts 408A. As a result, the energization of the coil 408 and the consequent closing of the contacts 408A will energize the coil 412.

The relay coil 412 operates a pair of normally-open contacts 412A in FIG. 4, operates a pair of normally-open contacts 412B in FIG. 4, operates a pair of normally-open contacts 412C in FIG. 3, and operates a pair of normally-closed contacts 412D in FIG. 3.

The relay contacts 412A are connected to the left-hand terminal of the vend relay coil 412, and they are also connected to the conductor 30 by the movable and upper fixed contacts of delivery switches 414, 416 and 418. Those switches will be mounted adjacent the chutes or passages through which the selected products will pass as those products are vended by the money-actuated device; and as those products pass those switches, they will successively force the movable contacts of those switches down into engagement with the lower fixed contacts of those switches and then permit those movable contacts to move back up into engagement with the upper fixed contacts of those switches. Those movable contacts are normally in their upper positions; and hence the contacts 412A can serve as holding contacts for the coil 412.

The lower fixed contact of the delivery switch 414 is connected to the left-hand terminal of a source of motive power 434; and the right-hand terminal of that source of motive power is connected to the conductor 32. The lower fixed contact of the delivery switch 416 is connected to the left-hand terminal of a source of motive power 436; and the right-hand terminal of that source of motive power is connected to the conductor 32. The lower fixed contact of the delivery switch 418 is connected to the left-hand terminal of a source of motive power 438; and the right-hand terminal of that source of motive power is connected to the conductor 32. The sources of motive power 434, 436 and 438 may be motors, solenoids, relays, or the like; and they will respond to the energization thereof to cause the dispensing of the various desired products. The benefit of having the lower fixed contacts of the delivery switches 414, 416 and 418 connected, respectively, to the sources of motive power 434, 436 and 438 is that those switches will hold those sources of power energized from the time the products move the movable contacts of those switches down until those products have moved completely beyond the movable contacts of those switches.

The relay contacts 412C are connected to the conductor 30, and they are also connected to the left-hand terminal of a deductor motor 422 by the movable and upper fixed contacts of a cam-operated switch 420. The right-hand terminal of that motor is connected to the conductor 32, and hence closing of the relay contacts 412C will energize the deductor motor 422. The shaft of that motor drives a single notch cam 424 which can shift the movable contact of the switch 420, drives a single lobe cam 426 which can shift the movable contact of the switch 430, and drives a single lobe cam 428 which can shift the movable contact of the switch 432. As shown by FIGS. 3 and 4, the lobe on the cam 428 is wider than the lobe on the cam 426.

The shaft of the deductor motor 422 also drives a single lobe cam 440 in FIG. 4, drives a single lobe cam 442 and a nine lobe cam 444 in FIG. 5, and drives the wipers 466, 468 and 470, respectively, of three rotary selector switches 460, 462 and 464. The cam 424 normally permits the movable contact of the switch 420 to be in engagement with the upper fixed contact of that switch, but it will respond to rotation of the shaft of motor 422 to shift that movable contact down to its lower position. The cam 426 normally permits the movable contact of switch 430 to be in engagement with the upper fixed contact of that switch, but it will respond to rotation of the shaft of motor 422 to shift that movable contact down to is lower position. The cam 428 normally holds the movable contact of the switch 432 down in engagement with the lower fixed contact of that switch, but it will respond to rotation of the shaft of motor 422 to permit that movable contact to move up to its upper position.

The cam 442 normally permits a switch 454 and a switch 456 to be open, but it will respond to rotation of the shaft of motor 422 to close those switches. The cam 444 normally permits a switch 458 to be open, but it will respond to rotation of the shaft of motor 422 to close that switch nine times during a single revolution of that shaft. The wipers 466, 468 and 470 are normally below, and out of engagement with, the zero contacts of the rotary selector switches 460, 462 and 464, respectively; but those wipers will respond to rotation of the shaft of motor 422 to engage all of the contacts of those switches.

*Product vending circuit*

The movable contact and the upper fixed contact of switch 432 will close after the shaft of the motor 422 starts rotating; and such closure will complete a circuit to one of the sources of motive power 434, 436 and 438 if relay contacts 412B are closed and if one of the pairs of relay contacts 236G, 238G or 240E is closed. The energization of one of the sources of motive power 434, 436 and 438 will lead to the dispensing of the desired product. As that product reaches the delivery switch adjacent the chute through which that product must pass, that product will force the movable contact of that switch to move down into engagement with the lower fixed contact of that switch. Such movement will close a circuit which will hold that one source of motive power energized until the desired product has been moved beyond the delivery switch.

*Credit deduction circuit*

The upper fixed contact of the cam-operated switch 432 is connected to the left-hand terminal of the coil 439 of a wiper relay. The right-hand terminal of that coil is connected directly to the conductor 32; and hence the shifting of the movable contact of switch 432 up into engagement with the upper fixed contact of that switch will energize the coil 439 as well as energize one of the sources of motive power 434, 436 and 438.

The armature 448 of a mechanical latching relay is mounted adjacent the single lobe cam 440; and that cam will respond to rotation of the shaft of motor 422 to move that armature into position where it will be held by the latch 450 of that relay. Once that armature has been moved into position where it can be held by the latch 450, that armature will remain there until the coil 446 of that relay attracts the armature 452 on the latch 450 and moves that latch far enough to free the armature 448.

A pair of normally-open contacts 446A in FIG. 4 will be closed whenever the cam 440 moves the armature 448 into position where it can be held by the latch 450. Similarly, the normally-open contacts 446B in FIG. 7 will be closed, the normally-closed contacts 446C in FIG. 7 will be opened, the normally-open contacts 446D will be closed, and the normally-closed contacts 446E will be opened when the cam 440 moves the armature 448 into position where it can be held by the latch 450. The closing of the contacts 446A will not energize the coil 446 immediately, because the contacts 131B or 165B or 203B will be open. However, the contacts 446A will respond to the re-closing of the contacts 131B, 165B and 203B to energize the coil 446; and thereupon the latch 450 will move and free the armature 448. At such time, the contacts 446A, 446B, 446C, 446D and 446E will return to the positions shown by the drawing. The fact that the armature 448 is mechanically held by the latch 450 is desirable because it keeps current interruptions from affecting the position of that armature.

Each of the rotary selector switches 460, 462 and 464 has twelve fixed contacts; but the uppermost and the two lowermost contacts of those switches are not used. The wiper 466 is connected to the left-hand terminal of the coil 472 of a one-cent pulse relay, and the right-hand terminal of that coil is connected to the conductor 32. The wiper 468 is connected to the left-hand terminal of the coil 474 of a ten-cent pulse relay, and the right-hand terminal of that coil is connected to the conductor 32. The wiper 470 is connected to the left-hand terminal of the coil 476 of a one-dollar pulse relay, and the right-hand terminal of that coil is connected to the conductor 32. The coil 472 operates a pair of normally-open contacts 472A and a pair of normally-open contacts 472B in FIG. 5. The coil 474 operates a pair of normally-open contacts 474A, operates a pair of normally-closed contacts 474B and operates a pair of normally-open contacts 474C; and all of those contacts are in FIG. 5. The coil 476 operates a pair of normally-open contacts 476A, operates a pair of normally-closed contacts 476B, operates a pair of normally-open contacts 476C; and all of those contacts are in FIG. 5. The contacts 472A, 474A and 476A can be closed to connect the wipers 466, 468 and 470, respectively, to the junction 399.

The switches 48, 133 and 137 rotate uni-directionally, and hence the deduction of credits which must occur after a product has been vended can not be effected by rotating the wipers 126, 143 and 202 in the reverse direction. Instead, that deduction of credits must be effected by advancing the wipers 126, 143 and 202 still further in the normal direction.

The rotary stepping switch 48 has ten fixed contacts; and if one of those fixed contacts is disposed rearwardly of the wiper 126 a distance equal to two, three or four advancements of that wiper, that one contact will simultaneously be disposed forwardly of that wiper a distance equal to eight, seven or six advancements, respectively, of that wiper. As a result, if the wiper 126 is to be moved into engagement with a contact which is disposed rearwardly of the initial position of that wiper a distance equal to two, three or four advancements of that wiper, that wiper can be moved into engagement with that contact by moving that wiper in the normal, forward direction a distance equal to eight, seven or six advancements, respectively, of that wiper. Those eight, seven and six forward advancements are the differences, respectively, between the numeral ten and the numerals two, three and four which represent the spaces between the initial position and the desired position of that wiper; and hence those eight, seven and six advancements are the tens-complements of the spaces between the initial and the desired positions of that wiper.

The rotary stepping switch 133 also has ten fixed contacts; and therefore, if that switch could be considered without regard to the switches 48 and 137, the wiper of that switch could be moved into engagement with a rearwardly-disposed fixed contact by advancing that wiper a distance equal to the tens-complement of that fixed contact. Similarly, the rotary stepping switch 137 has ten fixed contacts; and if that switch could be considered without regard to the switches 48 and 133, the wiper of that switch could be moved into engagement with a rearwardly-disposed fixed contact by advancing that wiper a distance equal to the tens-complement of that fixed contact. However, the switch 137 can not be considered without regard to the switches 48 and 133, and the switch 133 can not be considered without regard to the switch 48 because of possible "borrowings" from the credit digits corresponding to the wipers 202 and 143. As a result, a compensation must be provided for possible "borrowings" from the credit digits corresponding to the wipers 202 and 143.

The present invention compensates for possible "borrowings" from the credit digits corresponding to the wipers 202 and 143 by advancing the wipers 202 and 143 the nines-complements rather than the tens-complements of the first and middle digits of the sales price and by providing additional and compensating advancements of those wipers where those "borrowings" do not occur. For example, whenever the last digit of the credit equals or is larger than the last digit of the sales price, there will be no "borrowing" from the credit digit corresponding to the wiper 143; and hence an additional advancement will be provided for that wiper to convert the nines-complement to the tens-complement. However, whenever the last digit of the credit is smaller than the last digit of the sales price, there will be a "borrowing" from the credit digit corresponding to the wiper 143; and an additional advancement will not be needed, because the nines-complement will directly compensate for the said "borrowing."

Similarly, whenever the middle digit of the credit is larger than the middle digit of the sales price, or whenever the middle digit of the credit equals the middle digit of the sales price and the last digit of the credit equals or is larger than the last digit of the sales price, there will be no "borrowing" from the credit digit corresponding to the wiper 202; and hence an additional advancement will be provided for the wiper 202 to convert the nines-complement to the tens-complement. However, if the middle digit of the credit is smaller than the middle digit of the sales price, there will be a "borrowing" from the credit digit corresponding to the wiper 202. Also, if the middle digit of the credit is equal to the middle digit of the sales price but the last digit of the credit is less than the last digit of the sales price, there will be a "borrowing" from the credit digit corresponding to the wiper 202. In either of these last events, additional advancements of the wiper 202 will not be needed, because the nines-complements will directly compensate for the said "borrowing."

In the following equations, the above relations are set forth in abbreviated form; and in those equations A, B and C are, respectively, the first, middle and last digits of the credit. D, E and F are, respectively, the first, middle and last digits of the sales price; and X, Y and Z are the advancements which must be provided, respectively, for the wipers 202, 143 and 126:

$$X = 9 - D + (1 \text{ if } B > E \text{ or if } B = E \text{ and } C \geqq F)$$
$$Y = 9 - E + (1 \text{ if } C \geqq F)$$
$$Z = 10 - F$$

If it is assumed that the patron has been credited with five dollars, and if it is further assumed that the sales price is one dollar and thirty five cents, the value of A will be five, the values of B and C will be zero, the value of D will be one, the value of E will be three, and the value of F will be five. The value of X will then be determined as follows:

$$X = 9 - 1 = 8$$

because B is not greater than E, and because B does not equal E. The value of Y will then be determined as follows:

$$Y = 9 - 3 = 6$$

because C is neither equal to nor greater than F. The value of Z will then be determined as follows:

$$Z = 10 - 5 = 5$$

This means that eight advancements must be provided for the wiper 202, six advancements for the wiper 143, and five advancements for the wiper 126. When those wipers receive those numbers of advancements, the wiper 202 will engage the contact 186, the wiper 143 will engage the contact 156, and the wiper 126 will engage the contact 114; and those wipers will thus establish a residual credit of three dollars and sixty five cents. At this time, the dials of the switches 137, 133 and 48 will display the numerals three, six and five, respectively.

If it is assumed that the patron has been credited with five dollars and sixty cents, and if it is further assumed that the sales price is one dollar and thirty five cents, the value of X will be determined as follows:

$$X = 9 - 1 + 1 = 9$$

because B is greater than E. Y will be determined as follows:

$$Y = 9 - 3 = 6$$

because C is neither equal to nor greater than F. Z will be determined as follows:

$$Z = 10 - 5 = 5$$

This means that nine advancements will be provided for the wiper 202, six advancements will be provided for the wiper 143, and five advancements will be provided for the wiper 126. When those wipers receive those numbers of advancements, the wiper 202 will engage contact 188, the wiper 143 will engage contact 148, and the wiper 126 will engage the contact 114; and those wipers will thus establish a residual credit of four dollars and twenty five cents. At this time the dials of the switches 137, 133 and 48 will display the numerals four, two and five, respectively.

If it is assumed that the patron has been credited with five dollars and thirty eight cents, and it is further assumed that the sales price is one dollar and thirty five cents, the value of X will be determined as follows:

$$X = 9 - 1 + 1 = 9$$

because B is equal to E and C is greater than F. Y will be determined as follows:

$$Y = 9 - 3 + 1 = 7$$

because C is greater than E. Z will be determined as follows:

$$Z = 10 - 5 = 5$$

This means that nine advancements will be provided for the wiper 202, seven advancements will be provided for the wiper 143, and five advancements will be provided for the wiper 126. When those wipers receive those numbers of advancements, the wiper 202 will engage contact 188, the wiper 143 will engage contact 144, and the wiper 126 will engage the contact 110; and those wipers will thus establish a residual credit of four dollars and three cents. At this time the dials of the switches 137, 133 and 48 will display the numerals four, zero and three, respectively.

Other examples could be given, but these three examples are sufficient to show that whenever a "borrowing" from the middle digit of the credit occurs, an advancement equal to the nines-complement rather than the tens-complement of the middle digit of the sales price is provided for the wiper 143. However, if there is no "borrowing" from the middle digit of the credit, an advancement equal to the tens-complement of the middle digit of the sales price will be provided for the wiper 143. Further, if a "borrowing" from the first digit of the credit occurs, an advancement equal to the nines-complement rather than the tens-complement of the sales price is provided for the wiper 202; but if there is no "borrowing" from the first digit of the credit, an advancement equal to the tens-complement of the sales price will be provided for the wiper 202.

The money-actuated device provided by the present invention uses the contacts of the "over" relays 352 and 374 plus the contacts of the "exact" relays 354 and 376 to determine when the advancements provided for the wipers 202 and 143, respectively, should equal the tens-complements or the nines-complements of the first and middle digits of the sales price. Specifically, if the "over" relay coil 374 closes the contacts 374A, and thereby shows that B is greater than E, a circuit will be pre-set via conductor 30, contacts 374A, junction 485, conductor 486, contacts 476B, cam-operated switch 454, relay coil 164, and conductor 32. When the deductor motor 422 subsequently rotates the cam 442 and closes the switch 454, the coil 164 will become energized and thereby provide the additional advancements for the wiper 202 which is needed to make the total advance of that wiper equal to the tens-complement rather than the nines-complement of the first digit of the sales price.

If the "exact" relay coil 376 closes the contacts 376A and either the "over" relay coil 352 closes the contacts 352A or the "exact" relay coil 354 closes the contacts 354A, and thereby shows that B equals E and that C equals or is larger than F, the circuit to the relay coil 164 will be pre-set via conductor 30, either contacts 352A or contacts 354A, contacts 376A, junction 485, conductor 486, contacts 476B, cam-operated switch 454, relay coil 164 and conductor 32. When the deductor motor 422 subsequently rotates the cam 442 and closes the switch 454, the coil 164 will become energized and thereby provide the additional advancement for the wiper 202 which is needed to make the total advance of that wiper equal to the tens-complement rather than the nines-complement of the first digit of the sales price.

If either the "over" relay coil 352 closes the contacts 352A or the "exact" relay coil 354 closes the contacts 354A, and thereby shows that C is larger than or equal to F, a circuit will be pre-set via conductor 30, either contacts 352A or 354A, junction 483, conductor 484, contacts 474B, cam-operated switch 456, relay coil 132, and conductor 32. When the deductor motor subsequently rotates cam 442 to close cam-operated switch 456, the coil 132 will become energized and thereby provide the additional advancement for the wiper 143 which is needed to make the total advance of that wiper equal to the tens-complement rather than the nines-complement of the middle digit of the sales price.

The money-operated device provided by the present invention is thus enabled, in a straight-forward and certain manner, to provide the required additional advancements for the wipers 202 and 143. In this way, that money-operated device fully and precisely compensates for any "borrowings" from the first and middle digits of the initial credit during the deduction of the sales price from that credit.

At the time the cam-operated switch 456 energizes the relay coil 132, the transfer relay coil 224 should be isolated from that switch. If that relay coil were not so isolated, the closing of the switch 456 would energize that relay coil and cause that coil to provide an undesired advancement of the wiper 202, as by closing its contacts 224A and thereby connecting the relay coil 164 to the conductor 30.

As indicated above, the closing of the various contacts of the "over" relays 352 and 374 and of the "exact" relays 354 and 376 can pre-set circuits to the coils 164 and 132; but those circuits will not be completed until the cam 442 closes the switches 454 and 456. That cam, however, will close those switches almost immediately after the output shaft of the deductor motor 422 starts rotating. As a result, the additional advancements, if any, for the wipers 202 and 143 will be provided during the early part of the cycle of the output shaft of the deductor motor 422. The remaining advancements, if any, for the wipers 202 and 143 and the advancements, if any, for the wiper 126 will be provided during the rest of the cycle of that output shaft.

Specifically if, in the first of the above equations, $9-D$ is greater than zero, one or more further advancements will have to be provided for the wiper 202. Similarly if, in the second and third of those equations, $9-E$ and $10-F$ are greater than zero, further advancements will have to be provided for the wipers 143 and 126. Those various advancements will be provided by the coils 164, 132 and 50, by the cam-operated switch 458, by the rotary selector switches 464, 462 and 460, and by the rotary stepping switches 137, 133 and 48. More particularly, as the output shaft of the deductor motor 422 rotates the cam 444 it will also rotate the wipers 470, 468 and 466 of the rotary selector switches 464, 462 and 460. The cam 444 will be mounted on the shaft of the motor 422 so it will close and re-open the switch 458 at times when the wipers 470, 468 and 466 are intermediate adjacent fixed contacts on those various selector switches. Further, that cam is mounted on that shaft so it does not close and re-opens the switch 458, for the first time during a cycle of that shaft, until after the wipers 470, 468 and 466 have moved out of engagement with the third lowermost contacts of the switches 464, 462 and 460, respectively.

As the wipers 470, 468 and 466 moved into engagement with the third lowermost contacts of the switches 464, 462 and 460, respectively, they connected the relay coils 476, 474 and 472 to the fixed contacts 180, 144 and 106, respectively, of the stepping switches 137, 133 and 48.

If any of those fixed contacts were, at that time, connected to the conductor 30 by appropriate combinations of the contacts 140A, 236C, 236D and 236E or 140A, 236F, 238C, 238D and 238E or 140A, 236F, 238F, 240B, 240C and 240D, one or more of the relay coils 476, 474 and 472 would be energized. For purposes of illustration, it will be assumed that the contacts 140A, 236F, 238C 238D and 238E are closed; and it will also be assumed that the patron has inserted a five dollar bill. This means that the wiper 202 will initially be in engagement with the fixed contact 190 of switch 137 and that the wipers 143 and 126 will initially be in engagement with the fixed contacts 144 and 104, respectively, of the switches 133 and 48. As a result, when the wiper 466 moved into engagement with the third lowermost contact of the switch 460, the relay coil 472 became energized via conductor 30, contacts 140A, 236F, 238C, middle bus bar 306, price-setting pin 320, the second lowermost bus bar 304, fixed contact 106, cable 478, the third lowermost contact of switch 460, wiper 466, relay coil 472 and conductor 32. The resulting energization of that coil enabled that coil to close its contacts 472A in FIG. 5 and thereby establish a holding circuit for the coil 472 via conductor 30, cam-operated switch 430 in FIG. 3, junction 490, conductor 488, contacts 408B and 400B, junction 399, conductor 492, contacts 472A, relay coil 472 and conductor 32. That holding circuit will keep the coil 472 energized after the wiper 466 moves upwardly out of engagement with the third lowermost contact of the switch 460.

The energization of the relay coil 472 also enabled that coil to close its contacts 472B adjacent the coil 50 of the switch 48; and those contacts will remain closed because of the holding circuit for the coil 472. As the wiper 466 moves out of engagement with the third lowermost contact of switch 460, and before that wiper can engage the fourth lowermost contact of that switch, the cam 444 will close and re-open the switch 458. That closing of that switch will complete a circuit via conductor 30, switch 458, contacts 472B, coil 50 and conductor 32; and the resulting energization of that coil will cock the stepping switch 48. The re-opening of the switch 458 will enable the spring 80 of that switch to move the plunger 70 to extended position and thereby provide the required advancement of the wiper 126 from fixed contact 104 to fixed contact 106.

As the cam 444 permits the switch 458 to re-open, the wipers 470, 468 and 466 will move into engagement with the fourth lowermost contacts of the switches 464, 462 and 460, respectively; and at such time the relay coils 472, 474 and 476 will be connected to the fixed contacts 108, 146 and 182, respectively, of the switches 48, 133 and 137. The relay coil 472 will remain energized because of its holding circuit, and the relay coils 474 and 476 will remain de-energized because the price-setting pins 326 and 330 are not in engagement with the second lowermost bus bars 308 and 312. This means that as the wipers 466, 468 and 470 move up out of engagement with the fourth lowermost contacts and the cam 444 re-closes the switch 458, only the stepping switch 48 will be cocked. As the cam 444 permits the switch 458 to re-open, the spring 80 will provide a second advancement of the wiper 126—that wiper moving up into engagement with the contact 108.

Similarly, as the wipers 466, 468 and 470 move into engagement with the fifth and sixth lowermost contacts of the switches 460, 462 and 464, respectively, the relay coil 476 will be successively connected to the contacts 184 and 186, the relay coil 474 will be successively connected to the contacts 148 and 150, and the relay coil 472 will be successively connected to the contacts 110 and 112. Because the price-setting pins 330 and 326 are not in engagement with the third lowermost and fourth lowermost bus bars 312 and 308, respectively, the relay coils 476 and 474 will remain de-energized. The relay coil 472 will, however, remain energized because of its holding circuit. This means that the third and fourth re-closings and re-openings of the switch 458 will cause the coil 50 to provide the third and fourth advancements of the wiper 126 but will not provide any advancements of the wipers 143 and 202. Those advancements will cause the wiper 126 to engage the contact 110 and then move into engagement with the contact 112.

As the wipers 470, 468 and 466 engage the seventh lowermost contacts of the selector switches 464, 462 and 460, respectively, a circuit will be completed via conductor 30, contacts 140A, 236F, 238C, 238D and 238E, middle bus bar 314, price-setting pin 330, the fifth lowermost bus bar 312, contact 188, cable 482, the seventh lowermost contact of switch 464, wiper 470, relay coil 476 and conductor 32. The resulting energization of that relay coil will enable that coil to close its contacts 476A in FIG. 5 and thereby establish a holding circuit via conductor 30, cam operated switch 430 in FIG. 3, junction 490, conductor 488, contacts 408B and 400B, junction 399, conductor 492, contacts 476A, relay coil 476 and conductor 32. That holding circuit will keep that relay coil energized after the wiper 470 moves up out of engagement with the seventh lowermost contact of the switch 464.

The energization of the relay coil 476 also enabled that coil to close its contacts 476C adjacent the left-hand terminal of the coil 164 of the stepping switch 137. As a result, when the cam 444 re-closes and re-opens the switch 458, after the wipers 470, 468 and 466 move up out of engagement with the seventh lowermost contacts but before they move up into engagement with the eighth lowermost contacts, the switch 458 will energize and then de-energize both of the coils 50 and 164. Such energizations and de-energizations will provide the fifth advancement for the wiper 126 and the first advancement for the wiper 202. That first advancement will cause the wiper 202 to move into engagement with the fixed contact 192 of switch 137, and that fifth advancement will cause the wiper 126 to move into engagement with the contact 114.

As the wipers 470, 468 and 466 move into and out of engagement with the eighth lowermost contacts of switches 464, 462 and 460, respectively, the relay coil 474 will remain de-energized, and the relay coils 476 and 472 will remain energized because of their holding circuits. As the cam 444 then re-closes and re-opens the switch 458, the coils 164 and 50 will provide the second and sixth advancements, respectively, of the wipers 202 and 126—those wipers moving, respectively, into engagement with the contacts 194 and 116.

As the wipers 470, 468 and 466 move into engagement with the ninth lowermost contacts of switches 464, 462 and 460, respectively, a circuit will be completed via conductor 30, contacts 140A, 236F, 238C and 238D, middle bus bar 310, price-setting pin 326, the seventh lowermost bus bar 308, contact 156, cable 480, the ninth lowermost contact of selector switch 462, wiper 468, relay coil 474 and conductor 32. The resulting energization of that relay coil will enable that coil to close its contacts 474A and thereby establish a holding circuit via conductor 30, switch 430 in FIG. 3, junction 490, conductor 488, contacts 408B and 400B, junction 399, conductor 492, contacts 474A, relay coil 474 and conductor 32. That holding circuit will keep that coil energized after the wiper 468 moves up out of engagement with the ninth lowermost contact of the switch 462.

The energization of the relay coil 474 also enabled that coil to close its contacts 474C adjacent the left-hand terminal of the coil 132 of the stepping switch 133. As a result, when the cam 444 re-closes and re-opens the switch 458, after the wipers 470, 468 and 466 move up out of engagement with the ninth lowermost contacts of switches 464, 462 and 460, respectively, but before those wipers can engage the tenth lowermost contact of that switch, the switch 458 will energize and then de-energize all of the coils 50, 132 and 164. Such energizations and de-energizations will provide the seventh, the first and the third advancements, respectively, of the wipers 126, 143 and 202—the wiper 202 moving into engagement with the contact 196, the wiper 143 moving into engagement with the contact 146, and the wiper 126 moving into engagement with the contact 118.

As the wipers 470, 468 and 466 successively move into and out of engagement with the tenth, eleventh and twelfth contacts of the switches 464, 462 and 460, the relay coils 476, 474 and 472 will remain energized because of their holding circuits. As the cam 444 re-closes and re-opens the switch 458 for the eighth and ninth times, that switch will provide the eighth and ninth, the second and third, and the fourth and fifth advancements, respectively, of the wipers 126, 143 and 204. The eighth advancement of the wiper 126 will place that wiper in engagement with the fixed contact 120 and the ninth advancement of that wiper will place it in engagement with the contact 122. The second advancement of the wiper 143 will place that wiper in engagement with the fixed contact 148 and the third advancement of that wiper will place that wiper in engagement with the fixed contact 150. The fourth advancement of the wiper 202 will place that wiper in engagement with the fixed contact 198 and the fifth advancement of that wiper will place that wiper in engagement with the fixed contact 180. At such time the wipers 202, 143 and 126 will provide a residual credit of thirty nine cents; and that is the exact difference between the five dollar credit and the four dollar and sixty one cent sales price established by the price-setting pins 330, 326 and 320.

As the shaft of the deductor motor 422 reaches the end of its cycle, the wipers 470, 468 and 466 of the switches 464, 462 and 460 will be moved back into engagement with the lowermost contacts of those switches, and the switch 458 will be permitted to remain open. The wipers 202, 143 and 126 will remain in engagement, respectively, with the fixed contacts 180, 150 and 122; thereby maintaining the correct residual credit.

It will be noted that the third lowermost through the eleventh lowermost contacts of the switch 460 are connected to the uppermost nine contacts of the switch 48; whereas the third lowermost through the eleventh lowermost contacts of the switch 462 are connected to the lowermost nine contacts of the switch 133 and the third lowermost through the eleventh lowermost contacts of the switch 464 are connected to the lowermost nine contacts of the switch 137. The connecting of the third lowermost through the eleventh lowermost contacts of switch 460 to the nine uppermost contacts of the switch 48 is desirable, because it isolates the contact 104 from the relay coil 472. As a result, if the last digit of the sales price is zero, the wiper 126 of the switch 48 will not be able to complete a circuit to the relay coil 472 and will thus not be able to advance. Consequently, the wiper 126 will remain stationary; and this is necessary because the last digit of the credit will remain unchanged where the last digit of the sales price is zero.

The connecting of the third lowermost through the eleventh lowermost contacts of the switches 464 and 462 to the lowermost contacts, respectively, of the switches 137 and 133 is desirable because it automatically provides the nines-complements of the first and middle digits of the sales price. If the tens-complement of either or both of those digits of the sales price is needed, the requisite additional advancements will be provided by the closing of the contacts of the appropriate "over" and "exact" relays and by the closing and re-opening of the switches 454 and 456 at the beginning of the cycle of the shaft of the motor 422.

The motor 422 was energized by the closing of the contacts 412C of the vend relay 412; but that motor quickly acted through the cam 424 and the switch 420 to establish a running circuit via conductor 30, cam-operated switch 430, junction 490, cam-operated switch 420, motor 422 and conductor 32. That running circuit will keep that motor energized until the cam 426 shifts the movable contact of the switch 430 down into engagement with its lower fixed contact. If the contacts 412D and 400G are closed at that time, the motor 422 will remain energized until the shaft of that motor reaches the end of its cycle and causes the cam 424 to permit the movable contact of switch 420 to return to its raised position. However, if either of the contacts 412D or 400G is still open when the movable contact of switch 430 is moved downwardly, the motor 422 will become de-energized and will remain de-energized until both of those sets of contacts 412D and 400G are closed.

If, instead of the contacts 140A, 236F, 238C, 238D and 238E being closed, the contacts 140A, 236F, 238F, 240B, 240C and 240D had been closed, and if the patron had inserted a five dollar bill, the wipers 202, 143 and 126 would be provided, respectively, with nine, zero and three advancements. The wiper 202 would initially be in engagement with the contact 190 and would start its advance on the first re-opening of the cam-operated switch 458, the wiper 143 would initially be in engagement with the contact 144 and that wiper would not be advanced at all, and the wiper 126 would initially be in engagement with the contact 104 and would start its advance on the seventh re-opening of the switch 458. These various advancements would place the wiper 202 in engagement with the contact 188, would leave the wiper 143 in engagement with the contact 144, and would place the wiper 126 in engagement with the contact 110. As a result, those wipers would establish a residual credit of four dollars and three cents—the exact difference between the five dollar credit and the sales price of ninety seven cents.

If, instead of the contacts 140A, 136F, 238C, 238D and 238E being closed, the contacts 140A, 236C, 236D and 236E had been closed, and if the patron had inserted a five dollar bill plus four one dollar bills, the wipers 202, 143 and 126 would be provided, respectively, with one, zero and one advancements. The wiper 202 would initially be in engagement with the contact 198 and would start its advance on the ninth re-opening of the contacts 458, the wiper 143 would initially be in engagement with the contact 144 and would not be advanced at all, and the wiper 126 would initially be in engagement with the contact 104 and would start its advance on the ninth re-opening of the switch 458. The wiper 202 will move into engagement with the contact 180, the wiper 143 will remain in its engagement with the contact 144, and the wiper 126 will move into engagement with the contact 106. At such time, the wipers 202, 143 and 126 will provide a residual credit of one cent; and that is the exact difference between the credit of nine dollars and the sales price of eight dollars and ninety nine cents.

Shortly after the deductor motor 422 was energized, but not until after the switches 454 and 456 were closed and re-opened, the cam 428 on the shaft of that motor permitted the movable contact of the switch 432 to move up into engagement with the upper fixed contact of that switch. That movement completed a circuit for the appropriate source of motive power 434, 436 or 438, and it also completed a circuit for the coil of the wiper relay 349. The resulting energization of that coil effected the opening of the contacts 439A, 439B and 439C in FIG. 1. The opening of those contacts breaks the circuits to the various "over" relay coils 352, 374 and 394 and to the "exact" relay coils 354, 376 and 396; and hence those coils will become de-energized and will remain de-energized through the rest of the cycle of the shaft of the motor 422. Such de-energization is desirable because it obviates recurrent and needless energizations and de-energizations of those relay coils as the wipers 126, 143 and 202 are advanced relative to the various bus bars 304, 308 and 312. The opening of the contacts 439A, 439B and 439C can not lead to the "firing" of the tubes 342, 372 and 392, with consequent energization of the "over" relay coils 352, 374 and 394, because the filament transformers will effectively bias those tubes beyond cut-off.

The opening of the contacts 439A, 439B and 439C will de-energize the coils of the "over" and "exact" relays but will not lead to the de-energization of the coil 400 of the credit relay. After the coil 400 was energized, by the closing of an appropriate combination of the contacts 352A, 354A, 374A, 376A, 394A and 396A, that coil closed the contacts 400B and thereby established a holding circuit for itself. The re-opening of the said combination of contacts 352A, 354A, 374A, 376A, 394A and 396A, upon the de-energization of the coils of the "over" and "exact" relays will not interrupt that holding circuit and will thus not de-energize the coil 400 of the credit relay.

Summing up, in the deduction of the sales price from the credit established on the switches 137, 133 and 48, an appropriate combination of the contacts 352A, 354A, 374A, 376A, 394A and 396A will energize the coil 400 of the credit relay; and the consequent closing of the contacts 400F will energize the coil 412 of the vend relay while the opening of contacts 400C will isolate the coil 224 from the switch 456. Contacts 412C will then close and start the motor 422; and thereafter the cam 442 will close and re-open the switches 454 and 456. If additional advancements of wipers 202 and 143 are needed, to compensate for a lack of "borrowing" from the first and middle digits of the credit, the closing and re-opening of the cam-operated switches 454 and 456 will provide those advancements by energizing the coils 164 and 132. Shortly thereafter the movable contact of the switch 432 will move to its upper position and energize the coil 439 of the wiper relay so the "over" and "exact" relay coils will be isolated from the wipers of the switches 137, 133 and 48. Subsequently, the wipers of the rotary selector switches will engage the various fixed contacts of those switches and the cam 444 will open and close the switch 458. By the time the shaft of the motor 422 has completed one revolution, the value of the sales price will have been deducted and the wipers of the switches 137, 133 and 48 will be establishing the residual credit.

If that residual credit exceeds the sales price of another product desired by the patron, the patron can press the selection switch corresponding to that product; and the value sensing circuit will again sense for the presence of the requisite amount of credit on the switches 137, 133 and 48, the vend relay circuit will again become operative, the product vending circuit will again become energized, and the credit deduction circuit will once again be energized. At the end of this further actuation of the credit deduction circuit, the wipers of the switches 137, 133 and 48 will establish a second, and smaller, residual credit.

The patron can continue to make selections as long as the credit balance in his favor exceeds the value of the desired products. Furthermore, the patron can insert additional money if the credit balance in his favor does not match or exceed the value of the desired product. When the additional money is inserted, the wipers of the switches 137, 133 and 48 can advance and establish a higher credit balance for the patron.

*Change pay out circuits*

Referring to FIG. 7, the numeral 494 denotes a pay out switch that is accessible from the exterior of the money-actuated device and that is in a convenient location. If, after having inserted money, a patron decides not to make a selection, she can close the pay out switch 494 and get her money back. Further, if a patron has any credit balance in her favor after having made one or more selections, she need only close the pay out switch 494 to collect the required change. That change can be made up of coins and bills.

The coins which can be used in making up the required change are held in nine storage tubes; and those tubes are shown in FIG. 16 and are denoted by the numerals 496, 498, 500, 502, 504, 506, 508, 510 and 512. Those storage tubes are of the type shown in Erickson et al. application Ser. No. 35,504 for Coin Separators which was filed June 13, 1960; and those storage tubes are similar to each other. The tubes 496, 498, 500 and 502 are identical, and they will hold pennies. The storage tube 504 will hold nickels and will thus be larger in diameter than any of the tubes 496, 498, 500 and 502. The tubes 506 and 508 will hold dimes and will thus be smaller in diameter than any of the tubes 496, 498, 500 and 502. The tube 510 will hold quarters and will thus be larger in diameter than the tube 504. The tube 512 will hold half dollars and will thus be the largest of all the nine storage tubes.

The storage tubes 496, 498, 500, 502, 504, 506, 508, 510 and 512 are releasably secured to the housings of coin-ejecting assemblies; and those various coin-ejecting assemblies are denoted by the numeral 514. Except for variations in size that are due to the differences in the sizes of the coins to be paid out, the nine coin-ejecting assemblies are identical; and hence only one of those assemblies need be described in detail.

The coin-ejecting assembly which is associated with the storage tube 496 has a housing into which the upper end of that tube will extend; and that housing will reciprocably support a coin-ejecting slide 516. That slide has an upstanding abutment at the left-hand end thereof, and it has an upstanding ear 517 at the right-hand end thereof. An opening 518 is formed in the slide 516, and that opening will receive a coin whenever that opening is moved into register with the storage tube 496. That opening will respond to right-hand movement of that slide to move the coin to a coin-discharging area where the coin can fall into a chute and be conducted to a coin cup accessible from the exterior of the money-actuated device.

A helical extension spring 520 extends between the upstanding abutment of the left-hand end of the slide 516 and the housing for the coin-ejecting assembly, and that spring biases the slide 516 for movement to the right in FIG. 16. However, that spring can yield to permit that slide to be moved to the left. A cam 540 is mounted adjacent the ear 517 at the right-hand end of the slide 516, and that cam will normally hold the opening 518 in that slide in register with the storage tube 496. An electromagnet 522 is mounted adjacent the upstanding abutment at the left-hand end of the slide 516, and the armature of that electromagnet normally lies in the path of that abutment. However, that armature will not normally be engaged by the abutment of the slide 516; and that armature can respond to the energization of the electromagnet 522 to move up out of the path of that abutment.

The electromagnets for the other eight coin-ejecting assemblies 514 are denoted by the numerals 524, 526, 528, 530, 532, 534, 536 and 538. The armatures of those electromagnets are normally in extended position, and thus normally lie in the paths of the upstanding abutments at the left-hand ends of the coin-ejecting slides 516. However, those abutments do not normally engage those armatures because the ears 517 are normally engaged by cams 542, 544, 546, 548, 550, 552, 554 and 556. Those cams are all mounted on the same shaft 558, and that shaft also supports the wiper 560 of the rotary selector switch 562 and the wiper 564 of a rotary switch 566. That shaft is driven by a motor 612.

Each of the nine cams has a high dwell that normally engages the ear 517 of the adjacent slide 516 and thus holds the abutment at the lefthand end of that slide out of engagement with the armature of the adjacent electromagnet; and the high dwell of the cam 540 is denoted by the numeral 568. The high dwells of the nine cams differ in angular extent but they all normally engage the ears 517 of the adjacent sides 516. All of the cams other than the cam 554 have intermediate dwells, and the intermediate dwell of the cam 540 is denoted by the numeral 570. That dwell can permit the ear on the coin-ejecting slide 516 to move far enough to the right to engage the left-hand end of the armature of the electromagnet 522 if that armature is in extended position, or to move under that armature if that armature is in its upper position. Each of the cams has a coin-ejecting dwell, and the coin-ejecting dwell of the cam 540 is denoted by the numeral 572. The coin-ejecting dwells have a radii which are small enough to permit the ears 517 of the adjacent slides to move far enough in the right-hand direction to move the uppermost coins in the storage tubes beyond the right-hand edges of those storage tubes. Such coins will then fall downwardly toward a chute which will conduct those coins to the coin cup; and the patron can then collect those coins.

The storage tubes and the coin-ejecting assemblies are shown diagrammatically, and they will preferably be made in accordance with the principles and teachings disclosed and described in the said Erickson et al. application. The coins in the various storage tubes will be urged upwardly toward the upper ends of those tubes by helical compression springs within those tubes; and when the cams rotate to coin-ejecting position, the helical extension springs 520 will move the coin-ejecting slides 516 to coin-ejecting position if the adjacent electromagnets are energized. With this arrangement, any desired number of slides 516 from zero to nine can be released to coin-ejecting position by appropriate energization or de-energization of the electromagnets for those slides.

Currency storage tubes 572, 574, 576, 578, and 580 also are provided. Those tubes will accommodate small cylindrical containers in which one dollar bills, two dollar bills, five dollar bills, and the combinations of one dollar bills and two dollar bills are rolled up and held. Those currency storage tubes will preferably be made in accordance with the principles and teachings of the said Erickson et al. application; and ejectors will be associated with each of those currency storage tubes.

The five currency storage tubes 572, 574, 576, 578 and 580 are identical, and the currency discharging assemblies associated with those currency storage tubes also are identical; and, consequently, just one currency storage tube and just one currency-discharging assembly need be described in detail. The currency storage tube 572 is rectangular in cross section and it has a pivoted closure 565 for the normally-open upper end thereof. That closure will normally close the upper end of that tube and thereby keep the spring associated with that tube from pushing all of the containers 567 out of the upper end of that tube.

When the currency storage tube 572 is mounted within the money-actuated device, the closure 565 will be held away from the upper end of that storage tube; and the uppermost container 567 will move up into a recess 569 in a currency-ejector 571. That ejector is rotatably suspended from a pivot 573, and it can move the recess 569 into and out of register with the upper end of the tube 572. A helical extension spring 575 biases the currency-ejector to a forward position where the recess 569 can free the container 567 and let it fall downwardly toward the coin cup where it can be collected by the patron. However, a slotted connecting rod 585 coacts with a pin 577 on the ejector 571 and with a crank 579 mounted on a shaft 581 to normally hold that ejector against movement toward that forward position. Further, the armature of an electromagnet 660 normally lies in the path of an ear 583 on the currency-ejector 571. Not until the electromagnet 660 is energized and the crank 579 is rotated can the currency ejector 571 move it to its forward position and permit the recess 569 to release the container 567 therein. The shaft 581 and the crank 579 will be suitably rotated by a driving shaft 610 which is connected to the shaft 581 by pulleys and a belt 589.

The shaft 610 is elongated and it is connected to each of the short shafts 581 by pulleys and by belts 589. As a result, rotation of the shaft 610 will cause each of the shafts 581 to rotate and thereby rotate the cranks 579 on those shafts. If the various electromagnets 660, 662, 664, 666 and 668 are energized, the springs 575 will rotate the currency-ejectors forwardly to their forward positions, as the cranks 579 rotate far enough to permit such rotation, and thereby permit the recesses therein to free the containers 567 held therein. However, if one or more of those electromagnets is not energized, the armature of the said one or more electromagnets will intercept and hold the ear or ears 583 on the adjacent currency ejector or currency ejectors 571. The cranks 579 will continue to rotate, but the slots in the ends of the connecting rods 585 will permit those cranks to continue to rotate without breaking those connecting rods or those cranks. The electromagnet 660 will be energized when a five dollar bill is to be given out, the electromagnet 662 will be energized when two two dollar bills are to be given out, the electromagnet 664 will be energized when a two dollar bill and a one dollar bill are to be given out, the electromagnet 666 will be energized when a two dollar bill is to be given out, and the electromagnet 668 will be energized when a one dollar bill is to be given out.

The shaft 610 rotates all of the shafts 581 via the belts 589, and that shaft also rotates cams 605 and 607. Those cams are mounted on that shaft and they are adjacent the cam-operated switches 620 and 622, respectively. The shaft 610 is driven by a motor 614.

The numeral 624 denotes the coil of the money pay out relay, and that coil is shown in FIG. 7. The right-hand terminal of that coil is connected to the conductor 32, and the left-hand terminal of that coil is connectable to the conductor 30 by pay out switch 494, contacts 400E and contacts 140B. The energization of the money pay out relay coil 624 will close the normally-open contacts 624A and 624B in FIG. 7, will open the normally-closed contacts 624C in FIG. 7, will close the normally-open contacts 624D in FIG. 8, will open the normally-closed contacts 624E in FIG. 8, and will open the normally-closed contacts 624F in FIG. 3. The contacts 624B will establish a holding circuit for the money pay out coil 624 via any of the contacts 131C, 165C or 203C, contacts 624B, coil 624 and conductor 32. The closing of the contacts 624A in FIG. 7 will energize the coil 626 of the bill pay out relay and will also energize the coil 628 of the bill cash box solenoid; and the closing of the contacts 624D in FIG. 8 will energize the coil 632 of the coin pay out relay and will also energize the coil 634 of the coin cash box solenoid.

The energization of the coil of the bill cash box solenoid will energize the motor and solenoid of a device that can temporarily hold bills and then deliver those bills back to the patron or to the bill cash box, all as disclosed in Ellis et al. application Ser. No. 35,123 for Currency Detectors which was filed June 13, 1960. The energization of that motor will start the temporarily held bills moving toward a diverter, and the energization of the solenoid will cause that diverter to assume a position where it can divert the bills into a cash box.

The energization of the coil 634 of the coin cash box solenoid will enable the bottom of a receptacle for coins to tilt in such a way as to cause the coins held within that receptacle to pass to the cash coin box. Such a receptacle and the solenoids therefor are disclosed in Erickson application Ser. No. 16,514 for Coin Separators which was filed March 21, 1960.

The energization of the coil 632 of the coin pay out relay will close the normally-open contacts 632A in FIG. 8 and will close the normally-open contacts 632B, 632C, 632D, 632E, 632F, 632G, 632H, 632J, 632K and 632L in FIG. 6. The energization of the coil 626 of the bill pay out relay will close the normally-open contacts 626A, 626B, 626C, 626D, 626E, 626F, 626G, 626H, 626J, 626K in FIG. 7, will close the normally-open contacts 626L in FIG. 4, and will close the normally-open contacts 626M, 626N and 626P in FIG. 1.

The closing of the contacts 626L will energize the coil 439 of the wiper relay and will cause that coil to again re-open the contacts 439A, 439B and 439C, thereby again isolating the "over" and "exact" relays. The closing of the contacts 626M, 626N and 626P will directly connect the wipers 202, 143 and 126 to the conductor 30. The closing of the contacts 626C and 626G will directly connect the left-hand terminal of electromagnet 662 to the contacts 198 and 188 of the switch 137; and if the wiper 202 is in engagement with either of those contacts the armature of the electromagnet 662 will be raised. The closing of the contacts 626D and 626H will directly connect the left-hand terminal of electromagnet 664 to the contacts 196 and 186 of the switch 137; and if the wiper 202 is in engagement with either of those contacts the armature of the electromagnet 664 will be raised. The closing of the contacts 626E and 626J will directly connect the left-hand terminal of electromagnet 666 to the contacts 194 and 184 of the switch 137; and if the wiper 202 is in engagement with either of those contacts the armature of the electromagnet 666 will be raised. The closing of the contacts 626F and 626K will directly connect the left-hand terminal of electromagnet 668 to the contacts 192 and 182 of the switch 137; and if the wiper 202 is in engagement with either of those contacts the armature of the electromagnet 668 will be raised. This means that if the wiper 202 is in engagement with contacts 182 or 192 a dollar bill will be paid out from the currency storage tube 580 during the subsequent rotation of the shaft 610; if that wiper is in engagement with contacts 184 or 194 a two dollar bill will be paid out from the currency storage tube 578 during the subsequent rotation of the shaft; if that wiper is in engagement with contacts 186 or 196 a two dollar bill and a one dollar bill will be paid out from the currency storage tube 576 during the subsequent rotation of the shaft; and if that wiper is in engagement with contacts 188 or 198 two two dollar bills will be paid out from the currency storage tube 574 during the subsequent rotation of the shaft 610. Further, if the wiper 202 is in engagement with any of the contacts 190, 192, 194, 196 or 198, the electromagnet 660 will be energized via conductor 30, contacts 170 and 172, contacts 626B, electromagnet 660 and conductor 32, and a five dollar bill will be paid out during the subsequent rotation of the shaft 610. That rotation will be initiated by the closing of the contacts 626A—such closing serving to complete a circuit via conductor 30, switch 620, switch 622, contacts 626A, motor 614 and conductor 32.

The closing of the contacts 632H directly connected the contact 122 of switch 48 to certain fixed contacts on the rotary selector switch 562—the contact 112 being permanently connected to those contacts. The closing of the contacts 632J directly connected the contact 120 of switch 48 to certain fixed contacts on the rotary selector switch 562—the contact 110 being permanently connected to those contacts. The closing of the contacts 632K directly connected the contact 118 of switch 48 to a certain fixed contact on switch 562—the contact 108 being permanently connected to that contact. The contacts 632L directly connected the contact 116 of switch 48 to a certain fixed contact on the rotary selector switch 562—the contact 106 being permanently connected to that contact.

The closing of the contacts 632D directly connected the contact 162 of switch 133 to certain fixed contacts on the rotary selector switch 566—the contact 152 being permanently connected to those contacts. The closing of the contacts 632E directly connected the contact 160 of switch 133 to a certain fixed contact on the rotary selector switch 566—the contact 150 being permanently connected to that contact. The closing of the contacts 632G directly connected the contact 156 of switch 133 to a certain fixed contact on the rotary selector switch 566—the contact 146 being permanently connected to that contact.

The closing of the contacts 632D, 632E, 632F and 632G could also connect the contacts 162, 160, 158 and 156 to other contacts on the rotary selector switch 566, and the contacts 152, 150, 148 and 146 could be connected to other contacts on the rotary selector switch 566 if the relay coil 658 was energized. That relay coil will be de-energized whenever the wiper 143 is in engagement with any of the contacts 144, 146, 148, 150 and 152, but it will automatically become energized as soon as that wiper moves into engagement with any of the contacts 154, 156, 158, 160 and 162. The energization of that relay coil will open the contacts 658B, 658F and 658G and will close the contacts 658A, 658C, 658D and 658E. The closing of contacts 658C will additionally connect the contacts 162 and 152 to a further contact on the selector switch 566, the closing of the contacts 658D will additionally connect the contacts 160 and 150 to another contact on the selector switch 566, and the closing of the contacts 658E will additionally connect the contacts 156 and 146 to an additional contact on the selector switch 566.

The closing of the contacts 632C will, depending upon the status of the contacts 136 and thus the position of the wiper 143, either energize the electromagnet 538 or permit that electromagnet to remain de-energized. Also, the closing of the contacts 632B will, depending on the status of the contacts 131E and thus on the position of the wiper 126, and also upon the position of the wiper 143, energize the electromagnet 534.

The closing of the contacts 632 completed a circuit via conductor 30, cam-operated switch 616, cam-operated switch 618, contacts 632A, motor 612 and conductor 32. The resulting energization of the motor caused the cam 561 to shift the movable contact of the switch 618 down to its lower position and thus establish a running circuit for that motor.

As the shaft of that motor rotates, it will rotate the cams 540, 542, 544, 546, 548, 550, 552, 554 and 556 and will also rotate the wipers 560 and 564, respectively, of the selector switches 562 and 566. Further, that shaft will rotate the cams 559 and 561 thereon.

In its normal position, as shown by FIG. 16 and by solid lines in FIG. 6, the wiper 560 is in electrical engagement with the contact 106 of the switch 48; but that wiper is not in engagement with any of the terminals of the electromagnets 522, 524, 526 and 528. Not until the shaft 558 has rotated the wiper 560 a total of sixty degrees, and thus into the first dotted-line position in FIG. 6, will that wiper engage a contact on switch 562 that is connected to the left-hand terminal of an electromagnet. At such time, the wiper 560 will place the electromagnet 522 in electrical engagement with the following contacts of switch 48: 106, 108, 110, 112, 116, 118, 120 and 122. This means that if the wiper 126 is in engagement with any of those eight contacts, a circuit will be completed via conductor 30, conductor 341 in FIG. 1, contacts 626M, wiper 126 the particular contact engaged by the wiper 126, the cable 478, the appropriate contact of selector switch 562, wiper 560, electromagnet 522 and conductor 32. The resulting energization of the electromagnet 522 will retract the armature of that electromagnet. That energization of the electromagnet 522 will not lead to the immediate paying out of a penny from the tube 496 because the high dwell 568 on the cam 540 will be holding the coin-ejecting slide 516 in its normal position. However that retraction of that armature will be followed almost immediately by the movement of the intermediate dwell 570 of the cam 540 into register with the ear 517 on that slide; and thereupon the spring 520 will move that slide to the right. Such movement will move the abutment at the left-hand end of that slide into position under the armature of the electromagnet 522; and hence the subsequent de-energization of that electromagnet will be unable to let the armature of that electromagnet fall down far enough to lie in the path of that abutment and thereby block the subsequent movement of that slide to coin-ejecting position.

As the shaft 558 continues to rotate, the wiper 560 will successively move to and through the remaining three dotted-line positions shown in FIG. 6. In the first of those three remaining dotted-line positions the leading edge of the wiper 560 will engage the contact which is connected to the left-hand terminal of the electromagnet 524; and, at that time, that wiper will connect that left-hand terminal to the contacts 108, 110, 112, 118, 120 and 122 of the switch 48. As a result, if the wiper 126 is in engagement with any of those six contacts of the switch 48, the electromagnet 524 will be energized and will raise its armature. Immediately thereafter, the cam 542 will place its intermediate dwell in register with the ear 517 on the slide 516 associated with the coin storage tube 498; and hence if the wiper 126 had been in engagement with any of the contacts 108, 110, 112, 118, 120 and 122, that slide would be able to move to the right to place the abutment at the left-hand end thereof under the armature of the electromagnet 524, and thereby keep the subsequent de-energization of that electromagnet from blocking the subsequent movement of that slide to coin-ejecting position.

Rotation of the wiper 562 into the second-last of its dotted-line positions will place its leading edge in engagement with that contact of the switch 562 which is connected to the left-hand terminal of the electromagnet 526. At such time, that wiper will connect that electromagnet to contacts 110, 112, 120 and 122 of switch 48. If the wiper 126 is in engagement with any of those four contacts, the electromagnet 526 will be energized and will raise its armature. Immediately thereafter, the cam 544 will place its intermediate dwell in register with the ear 517 on the slide 516 associated with the coin storage tube 500; and hence if the wiper 126 had been in engagement with any of the contacts 110, 112, 120 and 122, that slide would be able to move to the right to place the abutment at the left-hand end thereof under the armature of the electromagnet 524, and thereby keep the subsequent de-energization of that electromagnet from blocking the subsequent movement of that slide to coin-ejecting position.

As the wiper 560 moves into its last dotted-line position, the leading edge thereof will be in engagement with the contact which is connected to the left-hand terminal of the electromagnet 528. As such time, that wiper will connect that electromagnet to the contacts 112 and 122 of switch 48. If the wiper 126 is in engagement with either of those contacts, the electromagnet 528 will be energized and will raise its armature. Immediately thereafter, the cam 546 will place its intermediate dwell in register with the ear 517 on the slide 516 associated with the coin storage tube 502; and hence if the wiper 126 had been in engagement with any of the contacts 112 and 122, that slide would be able to move to the right to place the abutment at the left-hand end thereof under the armature of the electromagnet 524, and thereby keep the subsequent de-energization of that electromagnet from blocking the subsequent movement of that slide to coin-ejecting position.

As indicated particularly by FIG. 16, the high dwells on the cams 540, 542, 544 and 546 are of progressively longer angular extents. As a result, the high dwells on those cams are able to hold the slides 516, associated with those cams, out of engagement with the armatures of the electromagnets 522, 524, 526 and 528 until after the wiper 560 has moved into engagement with the contacts connected to those electromagnets. Further, the progressively longer angular extents of the high dwells on the cams 540, 542, 544 and 546 make it possible for the intermediate dwells of those cams to be presented to the ears 517 on the slides 516 associated with the coin storage tubes 496, 498, 500 and 502 almost immediately after the wiper 560 has moved into engagement with the contacts connected to those electromagnets.

Summing up, if the wiper 126 had been in engagement with either the contact 112 or the contact 122, the slide 516 adjacent the coin storage tube 502 would have advanced to its intermediate position. If the wiper 126 had been in engagement with any of the contacts 110, 112, 120 and 122, the slides 516 adjacent the coin storage tubes 502 and 500 would have moved to their intermediate positions. If the wiper 126 had been in engagement with any of the contacts 108, 110, 112, 118, 120 and 122, the slides 516 adjacent the coin storage tubes 502, 500 and 498 would have moved to their intermediate positions. If the wiper 126 had been in engagement with any of the contacts 106, 108, 110, 112, 116, 118, 120 and 122, the slides 516 adjacent the coin storage tubes 502, 500, 498 and 496 would have moved to their intermediate positions.

It will be noted that if the wiper 126 had been in engagement with the contact 104 of the switch 48, none of the electromagnets 522, 524, 526 or 528 could have been energized; because, as indicated by FIG. 6, the conductor of cable 478 which is connected to that contact is not connected to any of the contacts of the rotary switch 562. This is desirable because no pennies should be paid out if the last digit of the residual credit is zero.

It will also be noted that contact 114 of the switch 48 is not connected to any of the contacts on the switch 562 but, instead, has been cut off as it extends out of the cable 478. This is desirable because it prevents the payout out of five pennies when the last digit of the residual credit is five. Because it is desirable to make change with the minimum number of money units, a nickel will be paid out in lieu of five pennies.

Whenever the middle digit of the residual credit is zero and the last digit of that residual credit is five, six, seven, eight or nine, a nickel will be required as part of the change. At such time, the wiper 126 of the switch 48 will be in engagement with one of the contacts 114, 116, 118, 120 and 122 of that switch; and this means that the contacts 90 of that switch will be closed. As a result, the coil 131 in FIG. 2 will be energized and the contacts 131E in FIG. 6 will be closed even prior to the energization of the coil 632 of the coin pay relay. Consequently, if the wiper 143 of the switch 133 is in engagement with the contact 144, the electromagnet 534 will be energized as soon as the coil 632 becomes energized and closes the contacts 632B in FIG. 6. The slide 516 associated with the nickel storage tube 504 will not, however, be free to move as soon as the electromagnet 534 is energized, because the high dwell of the cam 548 will be holding the ear 517 on that slide. Not until after the shaft 558 has completed almost one half of a revolution will the intermediate dwell of the cam 548 move into register with the ear 517 on the nickel-rejecting slide 516. At such time the contacts 90 on the switch 48 will still be closed, and thus the contacts 131E will still be closed; and hence the nickel-ejecting slide 516 will be able to advance to its intermediate position.

A nickel can be required as part of the change even if the last digit of the residual credit is not five, six, seven, eight or nine. For example, a nickel would be required if change of from thirty to thirty-four cents were required. The energization of the electromagnet 534, which would then be required in connection with the paying out of a nickel would be controlled by the wiper 564 of the switch 566 in FIG. 6. Also controlled by that wiper will be the energizations of the electromagnets 530, 532 and 536 which will be required in connection with the paying out of dimes and quarters.

In its normal position, as shown by FIG. 16 and by solid lines in FIG. 6, the wiper 564 is wholly out of electrical engagement with all of the electromagnets 530, 532, 534 and 536. Further, at such time, that wiper is wholly out of electrical engagement with all of the contacts on the switch 133. Not until the shaft 558 has rotated the wiper 564 a total of sixty degrees, and thus into the first dotted-line position in FIG. 6, will that wiper engage a contact on switch 566 that is connected to the left-hand terminal of an electromagnet. At such time the wiper 564 will connect the left-hand terminal of the electromagnet 530 to the contacts 146 and 156 of the switch 133. Further, if the coil 658 is deenergized, that wiper will also connect that terminal of electromagnet 530 to contacts 148 and 158 of switch 133. However, if the coil 658 is energized, that wiper will connect that terminal of electromagnet 530 to the contacts 152 and 162 of switch 133. This means that if the coil 658 is energized, as it will be when the value of the last digit of the residual credit is five through nine and thus the wiper 126 of the unit registration switch 48 is in engagement with any of its contacts 114, 116, 118, 120 and 122, and if the wiper 143 is in engagement with any of the contacts 146, 152, 156 and 162, the electromagnet 530 will be energized and will raise its armature. Immediately thereafter the cam 550 will move its intermediate dwell into register with the ear 517 on the coin-ejecting slide 516 associated with the dime storage tube 506. If the coil 568 had not been energized, as it would be if the value of the last digit of the residual value was zero through four and thus the wiper 126 of switch 48 was in engagement with any of its contacts 104, 106, 108, 110 and 112, and if the wiper 143 is in engagement with any of the contacts 146, 148, 156 and 158 the electromagnet 530 will be energized and will raise its armature. Immediately thereafter the cam 550 will move its intermediate dwell into register with the ear 517 on the slide 516 associated with the dime storage tube 506. As a result, if the middle and last digits of the residual credit represent values in the ranges of ten through twenty-four cents, thirty-five through forty-nine cents, sixty through seventy-four cents, or eighty-five through ninety-nine cents, the electromagnet 530 will be energized as the wiper 564 moves into its first-dotted-line position.

As the wiper 564 moves into its second dotted-line position in FIG. 6, its leading edge will engage the contact of switch 566 that is connected to the left-hand terminal of the electromagnet 532. At such time that wiper will connect that terminal of electromagnet 532 with contacts 152 and 162 of the switch 133. Further, if the coil 658 is energized, that wiper will also connect that terminal of electromagnet 532 to the contacts 150 and 160 of the switch 133; whereas if the coil 658 is de-energized, that wiper will connect that terminal of electromagnet 532 to the contacts 148 and 158 of the switch 133. This means that if the coil 658 is energized and if the wiper 143 is in engagement with any of the contacts 150, 152, 160 and 162, the electromagnet 532 will be energized and will raise its armature. If the coil 658 is de-energized and if the wiper 143 is in engagement with any of the contacts 148, 152, 158 and 162, the electromagnet 532 will be energized and will raise its armature. Immediately thereafter the cam 552 will move its intermediate dwell into register with the ear 517 on the slide 516 associated with the dime storage tube 508. As a result, if the middle and last digits of the residual credit represent values in the ranges of twenty through twenty-four cents, forty-five through forty-nine cents, seventy through seventy-four cents and ninety-five through ninety-nine cents, the electromagnet 532 will be energized as the wiper 564 moves into its second dotted-line position.

As the wiper 564 moves into the third dotted-line position in FIG. 6, its leading edge will engage that contact of switch 562 which is connected to the left-hand terminal of the electromagnet 534. At such time, that wiper will connect that terminal of electromagnet 534 to the contacts 146 and 156 of switch 133 if the coil 658 is energized but will connect that terminal of electromagnet 534 to the contacts 150, 152, 160 and 162 if the coil 658 is de-energized. This means that if the coil 658 is energized and if the wiper 143 is in engagement with either of the contacts 146 and 156 of switch 133, the electromagnet 534 will be energized and will raise its armature. If the coil 658 is de-energized and if the wiper is in engagement with any of the contacts 150, 152, 160 and 162 of switch 133, the electromagnet 534 will be energized and will raise its armature. Immediately thereafter the cam 552 will move its intermediate dwell into register with the ear 517 on the slide 516 associated with the nickel storage tube 508. As a result, if the middle and last digits of the residual credit represent values in the ranges of fifteen through nineteen cents, thirty through thirty-four cents, forty through forty-four cents, fifty-five through fifty-nine cents, sixty-five through sixty-nine cents, eighty through eighty-four cents and ninety through ninety-four cents, the electromagnet 534 will be energized as the wiper 564 moves into its third dotted-line position.

As the wiper 564 moves into its fourth dotted-line position in FIG. 6, its leading edge will engage the contact which is connected to the left-hand terminal of the electromagnet 536. At such time, that wiper will connect that terminal of electromagnet 536 to the contacts 150, 152, 160 and 162 of the switch 133. Further, if the coil 658 is energized, that wiper will also connect that terminal of electromagnet 536 to the contacts 148 and 158 of the switch 133. This means that if the coil 658 is energized and if the wiper 143 is in engagement with any of the contacts 148, 150, 152, 158, 160 and 162 of switch 133, the electromagnet 536 will be energized and will raise its armature. If the coil 658 is de-energized and if the wiper 143 is in engagement with any of the contacts 150, 152, 160 and 162, the electromagnet 536 will be energized and will raise its armature. Immediately thereafter the cam 554 will move its high dwell out of engagement with the ear 517 on the slide 516 associated with the quarter storage tube 510. As a result, if the middle and last digits of the residual credit represent values in the ranges of twenty-five through forty-nine cents or seventy-five through ninety-nine cents, the electromagnet 536 will be energized and will raise its armature.

It will be noted that the electromagnet 538 which coacts with the cam 556 to control the paying out of half-dollars is not connected to any of the contacts of the rotary selector switch 566. Instead, that electromagnet has its right-hand terminal directly connected to the conductor 32 and has its left-hand terminal selectively connected to the conductor 30 by the contacts 136 and 632C. Whenever the contacts 136 and 632C close, the electromagnet 538 will be energized and will raise its armature. The contacts 632C will close when the coil 632 of the coin pay out relay is energized; and the contacts 136 will close whenever the middle digit of the residual credit is five through nine and thus the wiper 143 of the switch 133 is in engagement with any of its contacts 154, 156, 158, 160 and 162. This means that as soon as the coil 632 of the coin pay out relay is energized the electromagnet 538 will be energized and will raise its armature. The slide associated with the half-dollar storage tube 512 will not, however, be free to move as soon as the electromagnet 538 is energized because the high dwell on the cam 556 will be holding the ear of that slide. Not until after the shaft 558 has completed almost a quarter of a revolution will the intermediate dwell of the cam 556 move into register with the ear 517 on the half-dollar-ejecting slide 516. At that time both the contacts 136 and 632C will still be closed, and hence the half-dollar-ejecting slide 516 will be able to advance to its intermediate position.

During the time the rotary selector switch 566 controls the paying out of nickels, dimes and quarters, the wiper 143 of the rotary stepping switch 133 will be connected to the conductor 30 solely through the relay contacts 626N; because the coil 439 of the wiper relay will have opened the contacts 439B, the coil 400 of the credit relay will have reopened the contacts 400J and thus broken the holding circuits of the coils 236, 238 and 240 of the selection relays, and the coil 624 of the pay out relay will have opened the contacts 624F, and thus kept the selection switches 230, 228 and 226 from re-energizing the coils 236, 238 and 240. Consequently, whenever the wiper 143 engages a contact which is connected to any one of the electromagnets 530, 532, 534 and 536, current will flow from the conductor 30, through conductor 341 in FIG. 1, contacts 626N, wiper 143, the appropriate contact on the switch 133, cable 480, the appropriate contact on the switch 566, wiper 564, and the appropriate electromagnet.

Similarly, during the time the selector switch 562 controls the paying out of pennies, the wiper 126 of the switch 48 will be connected to the conductor 30 solely through the relay contacts 626M; because the coil 439 of the wiper relay will have opened the contacts 439B, the coil 400 of the credit relay will have re-opened the contacts 400J and broken the holding circuits of the selection relays, and the coil 624 of the money payout relay will have opened the contacts 624F and isolated the selection switches from the selection relays. As a result, whenever the wiper 126 engages a contact connected to any one of the electromagnets 522, 524, 526 and 528, current will flow from the conductor 30, through conductor 341 in FIG. 1, contacts 626M, wiper 126, the appropriate contact on the switch 48, cable 478, the appropriate contact on the selection switch 562, wiper 560, and the appropriate electromagnet.

As the shaft 558 in FIG. 16 moves through the third quarter of its revolution, the smallest-radius dwells of the cams on that shaft will move into register with the ears 517 of the slides 516 adjacent those cams. Also, as the shaft 610 in FIG. 17 moves through the third quarter of its revolution, the cranks 579 on the shafts 581 will cause the connecting rods 585 to move to the right. As a result, the coin-ejecting slides 516 and the currency-ejectors 571 which are adjacent energized electromagnets will eject their coins and their currency substantially simultaneously. This is desirable because it delivers all of the change at substantially the same time and thus avoids the loss of change by a patron which could occur in the event some of that change were permitted to fall to the coin cup during the first part of the money payout cycle and the rest of that change was not permitted to fall to that coin cup until the last part of that cycle.

*Homing circuit*

As the output shaft of the motor 612 approaches the end of its cycle, the cam 559 will shift the movable contact of the switch 616 down into engagement with the lower fixed contact of that switch. At such time, that motor will come to rest because the contacts 624E will be held open by the continued energization of the coil 624. Also at such time, the coil 638 of the coin payout cycle relay will be energized. The energization of that coil will close the normally-open contacts 638A in FIG. 8.

Similarly, as the output shaft of the motor 614 approaches the end of its cycle, the cam 605 will shift the movable contact of the switch 620 down into engagement with the lower fixed contact of that switch. At such time, that motor will come to rest because the contacts 624C will be held open by the continued energization of the coil 624. Also at such time, the coil 630 of the bill payout cycle relay will be energized. The energization of that coil will close the normally-open contacts 630A in FIG. 8.

The closing of the contacts 630A and 638A completes a circuit via conductor 30, contacts 630A and 638A, current-limiting resistor 642, diode 644, normally-closed relay contacts 654A, resistor 646, relay coil 648 and conductor 32. A capacitor 650 is connected in parallel with the series-connected resistor 646 and relay coil 648. That capacitor will not appreciably retard the energization of the coil 648, but it will coact with the resistor 646 to provide a time-delay when the circuit to the relay coil 648 is subsequently opened. The coil 648 operates a pair of normally-open contacts 648A and a pair of normally-open contacts 648B in FIG. 8.

The closing of the contacts 648A completes a circuit via conductor 30, contacts 630A and 638A, resistor 642, diode 644, now-closed contacts 648A, resistor 652, relay coil 654 and conductor 32. A capacitor 655 is connected in parallel with the relay coil 654; and that capacitor will coact with that coil to provide a short time-delay in the energizing of that coil. This means that there will be a finite period of time before the relay coil 654 is energized.

The relay coil 654 operates a pair of normally-closed contacts 654A in FIG. 8; and as soon as the relay coil 654 is energized, it will open the contacts 654A and thereby disconnect the relay coil 648 from the conductor 30. However, the capacitor 650 will coact with the resistor 646 to retard the de-energization of the relay coil 648; and this means that there will be a finite period of time before the contacts 648A re-open. However, when the contacts 648A do open, they will de-energize the relay coil 654 and thus permit the contacts 654A to re-close. The reclosing of the contacts 654A will again energize the coil 648 with consequent reclosing of the contacts 648A. The over-all result is that the relay coils 648 and 654 will be alternately energized and de-energized; and that alternate energization and de-energization will continue until the contacts 630A or the contacts 638A re-open. Those contacts will re-open as the motors 614 and 612, respectively, reach the ends of their cycles and de-energize the relay coils 630 and 638. The components within the dashed-line enclosure in FIG. 8 thus act as a pulse generator that will generate pulses until the motors 612 and 614 become re-energized and cause the de-energization of the relay coils 638 and 630.

The relay coil 648 closed the normally-open contacts 648B at the same time that it closed the normally-open contacts 648A. The closing of the contacts 648B completed a circuit via conductor 30, contacts 648B, the coil 656 of the homing relay, and conductor 32. The resulting energization of the coil 656 closed the normally-open, homing relay contacts 656A, 656B and 656C in FIG. 5 and also opened the normally-closed homing relay contacts 656D and 656E in FIG. 5. The coil 656 will become de-energized each time the relay coil 648 becomes de-energized, and it will become re-energized each time the relay coil 648 becomes re-energized. As a result, the coil 656 will recurrently close and re-open the contacts 656A, 656B and 656C and will simultaneously open and re-close the contacts 656D and 656E.

As long as the wipers 202, 143 and 126 of the rotary stepping switches 137, 133 and 48, respectively, are out of their zero positions, each re-closing and re-opening of the contacts 656A, 656B and 656C will advance those wipers one step. Very quickly, those re-closings and re-openings of the contacts 656A, 656B and 656C will advance the wipers 202, 143 and 126 to their zero positions; and thereupon the contacts 90, 134 and 166 in FIG. 2 will open and de-energize the relay coils 131, 165 and 203—with consequent re-opening of the contacts 131D, 165D and 203D, respectively. Such re-opening of those contacts keeps the further re-closings and re-openings of the contacts 656A, 656B and 656C from advancing the wipers 202, 143 and 126 from their zero positions. As a result, the ratchet wheels, the dials and the wipers of the rotary stepping switches 48, 133 and 137 come to rest in their normal, zero positions.

The re-openings and the re-closings of the relay contacts 656D and 656E isolate the transfer relays 222 and 224 from the effects of the re-closings and re-openings of the contacts 656B and 656C. Specifically, whenever the contacts 656B and 656C are closed, the contacts 656D and 656E will be open and will break the circuits to the transfer relay coils 222 and 224. The resulting isolation of those transfer relay coils is important after the wipers 202 and 143 have been advanced to zero, because energizations and de-energizations of the transfer relay coils 222 and 224 would connect the stepping coils 164 and 132 to the conductor 30 via contacts 224A and 222A, respectively—with undesired advancements of the wipers 202 and 143 out of their zero positions.

As the relay coils 131, 165 and 203 were de-energized when the wipers 126, 143 and 202, respectively, reached their zero positions, those relay coils also re-opened contacts 131A, 165A and 203A in FIG. 3 to disconnect the relay coil 408 from the conductor 30. In addition, the relay coils 131, 165 and 203 also re-opened the contacts 131C, 165C and 203C in FIG. 7 to de-energize the coil 624 of the money payout relay. Further, the relay coil 131 re-opened the contacts 131E in FIG. 6. Furthermore, the relay coils 131, 165 and 203 re-closed the contacts 131B, 165B and 203B in FIG. 4 and thereby energized the coil 446 of the mechanical latching relay.

The disconnecting of the coil 408 from the conductor 30 enabled that coil to become de-energized after a short time-delay; and that coil thus permitted its contacts 408A and 408B to re-close. Such re-closings did not have an immediate effect because the contacts 400F and 400B were open. The de-energization of the coil 624 permitted the contacts 624A and 624B in FIG. 7 to re-open. The re-opening of the contacts 624B has no effect at this time because the contacts 131C, 165C and 203C are already open; but the re-opening of the contacts 624A de-energizes the coil 626 of the bill payout relay and also de-energizes the bill cash box solenoid 628. Similarly, the re-opening of the contacts 624D de-energizes the coil return relay coil 632 and also de-energizes the coil return solenoid 634. The re-closing of the contacts 624F in FIG. 3 will re-energize the coils 232 and 234 and will also render the selection switches 226, 228, and 230 effective.

The energizing of the coil 446 of the mechanical latching relay in FIG. 4 causes the contacts 446A, 446B, 446C, 446D and 446E to shift back to their normal positions. The re-opening of the contacts 446A will break the circuit to the coil 446, but the re-closing of contacts 446C and 446E and the re-opening of the contacts 446B and 446D will have no immediate effect because the contacts 624A and 624D are already open.

The re-closings of the contacts 624C and 624E re-energized the motors 614 and 612, respectively; and as those motors run they will restore the movable contacts of the switches 620 and 616 to their upper positions. Finally, the cams 607 and 561 will permit the movable contacts of the switches 622 and 618 to their normal positions. At such time, the motors 614 and 612 will become de-energized; and the coils 636 and 638 will become de-energized and permit the contacts 630A and 638A to re-open and thereby de-energize the pulse generator.

At this time, the money-actuated device will have restored itself to its normal, at-rest condition. Thereupon patrons can insert further money and make further selections as desired.

*Operation of money registering circuit*

Whenever the conductors 30 and 32 are connected to a suitable source of alternating current and the various circuits, sub-circuits and components of the money-actuated device are at rest, a circuit will be completed via conductor 30, cam-operated switch 430, relay contacts 400H and 624F, selection switches 226, 228 and 230, stepping switch contacts 174 and 176, stepping switch contacts 168 and 170, relay coil 232 and conductor 32. Also, a circuit will be completed via conductor 30, cam-operated switch 430, relay contacts 400H and 624F, selection switches 226, 228 and 230, stepping switch contacts 174 and 176, relay coil 234 and conductor 32. In addition, a circuit will be completed via conductor 30, the movable and fixed upper contacts of the switches 34, 36, 38, 40, 42, 44 and 46, normally-closed contacts 142A, relay coil 140 and conductor 32. The first two of these circuits will energize the relay coils 232 and 234; and the energization of the coil 232 will make it possible for the currency detector for five dollar bills to accept such bills, and the energization of the coil 234 will make it possible for the money-actuated device to accept pennies, nickels, dimes, quarters, half-dollars, and one dollar bills. As a result, as soon as the money-actuated device of the present invention is connected to a source of alternating current, a patron can insert pennies, nickels, dimes, quarters, half dollars, one dollar bills and five dollar bills. The third of those circuits will energize the money registering relay coil 140; and such energization will cause the contacts 140A in FIG. 1 to close and will cause the contacts 140B in FIG. 7 to close. Such closings do not energize any components of the money-actuated device at this time, because the contacts 236C, 238C and 240B in FIG. 1 are open, and because the payout switch in FIG. 7 is open.

For purposes of illustration, it will be assumed that the price-setting pins 328, 322 and 316 establish a sales price of eight dollars and ninety nine cents as shown, that the price-setting pins 330, 326 and 320 establish a sales price of four dollars and sixty one cents as shown, and that the price-setting pins 332, 324 and 318 establish a sales price of ninety seven cents as shown. Further, it will be assumed that a patron will insert nine dollars when he wants to select the product costing eight dollars and ninety nine cents, will insert five dollars when he wants to select the product costing four dollars and sixty one cents, and will insert the exact amount of money when he wants to select the product costing ninety seven cents.

When the patron inserts his first one dollar bill, the movable contact of the switch 44 will move out of engagement with the upper fixed contact of that switch. The coil 140 of the money registering relay will thereupon become de-energized and will permit the contacts 140A and 140B to re-open; but this re-opening is not significant at this time. However, that re-opening would be very significant if a patron tried to hold one of the selection switches 226, 228 and 230 closed while he inserted money; because the "over" and "exact" relays should be substantially isolated from the conductor 30 whenever credits are being added to the rotary stepping switches 48, 133 and 137. That re-opening would also be of interest if a patron attempted to hold the payout switch 494 closed while he inserted money. In the former instance, the contacts 140A would keep the closing of the contacts operated by the various coils 240, 238 and 236 of the selection relays from connecting the price setters 313, 309 and 305 to the conductor 30. In the latter instance, the contacts 140B would keep the closing of the payout switch 494 from energizing the coil 624 of the money payout relay.

The movement of the movable contact of switch 44 down into engagement with the lower fixed contact of that switch will complete a circuit via conductor 30, the movable and upper fixed contacts of the switches 34, 36, 38, 40 and 42, the movable and lower fixed contacts of the switch 44, conductor 203, coil 164 of the rotary stepping switch 137, and conductor 32. That circuit will cock the switch 137; and the subsequent return of the movable contact of the switch 44 to its upper position will permit that switch to advance its dial and its wiper one step. At such time the dial will display the numeral one and the wiper will engage the contact 182. In this way, a credit of one dollar is established on the switch 137 and the establishment of that credit is shown by the display of the numeral one.

At this time, the contacts 166 in FIG. 2 will be closed, because those contacts are open only when the switch 137 is in its zero position. Because the contacts 166 are closed, the coil 203 will be energized; and this means that the contacts 203A in FIG. 3, 203C in FIG. 7, and 203D in FIG. 5 will be closed and that the contacts 203B in FIG. 4 will be open. The opening of the contacts 203B is not significant at this time because the contacts 446A are open, the closing of the contacts 203C is not significant at this time because the contacts 624B are open, and the closing of the contacts 203D is not significant at this time because the contacts 656A are open. However, the closing of the contacts 203A is significant because it energizes the relay coil 408 via conductor 30, cam-operated switch 430, junction 490, normally-closed contacts 400A, contacts 203A, current-limiting resistor 402, doide 404, resistor 406, coil 408, and conductor 32. The capacitor 410 in parallel with the series-connected resistor 406 and coil 408 will also be energized, but that capacitor will not appreciably delay the energization of the coil 408. The energization of the coil 408 will open the contacts 408A and 408B ni FIG. 4; but the opening of those contacts will not be significant at this time because the contacts 400F and 400B are open.

The return of the movable contact of the swtich 44 to its upper position will also restore the circuit through the coil 140 of the money registering relay. That coil will again become energized and will again close the contacts 140A and 140B.

When the patron inserts the second, third and fourth one dollar bills, the money registering relay coil 140 will experience three de-energizations alternated with three re-energizations. The coil 164 of the rotary stepping switch 137 will experience three energizations alternated with three de-energizations; and, as a result, the dial of that switch will be advanced until it displays the numeral 4 and the wiper 202 will be advanced into engagement with the contact 188.

When the patron inserts a five dollar bill, the movable contact of the switch 46 will move down and again de-energize the coil 140. That movable contact will engage the lower fixed contact of that switch and thereby complete a circuit via conductor 30, the movable and upper fixed contacts of the switches 34, 36, 38, 40, 42 and 44, the movable and lower fixed contacts of the switch 46, relay coil 220, and conductor 32. The resulting energization of the coil 220 closes the contacts 220A in FIG. 9 to establish a holding circuit for the coil 220 via conductor 30, cam-operated switch 214, now-closed contacts 220A, coil 220, and conductor 32. The coil 220 also closes contacts 220C to connect the fixed contact of the cam-operated switch 212 to the conductor 208, and thus to the stepping coil 164 of switch 137; and the coil 220 further opens the contacts 220D to isolate the fixed contact of the cam-operated switch 212 from the conductor 204, and thus from the stepping coil 50 of the switch 48. In addition the coil 220 closes the contacts 220B to complete a circuit via conductor 30, cam-operated switch 214, contacts 220B, relay coil 142, and conductor 32. The resulting energization of the coil 142 will open the contacts 142A and 142D in FIG. 9 and will close the contacts 142B and 142C in FIG. 9. The opening of the contacts 142A will keep the coil 140 de-energized even after the movable contact of the switch 46 returns to its upper position, the closing of the contacts 142B will parallel the now-closed contacts 220B, the opening of the contacts 142D will disconnect the motor 210 from the fixed contact of the switch 214, and the closing of the contacts 142C will complete a circuit via the conductor 30, the movable and upper fixed contacts of the switches 34, 36, 38, 40, 42, 44 and 46, now-closed contacts 142C, motor 210, and the conductor 32.

The motor 210 will start rotating its output shaft and the five-lobe and single-lobe cams on that shaft. The five-lobe cam will successively close and re-open the switch 212 five times, and the stepping coil 164 of the switch 137 will experience five consequent energizations and de-energizations. As a result, that coil will advance the dial of that switch until it displays a nine; and that coil will advance the wiper 202 of that switch until it engages the contact 198.

After the fifth re-opening of the switch 212, the single-lobe cam will shift the movable contact of the switch 214 down into engagement with the lower fixed contact of that switch. Thereupon the coils 142 and 220 will become de-energized; and the contacts 220A, 220B and 220C will re-open and the contacts 220D will re-close. Also, the contacts 142B and 142C will re-open, and the contacts 142A and 142D will re-close. The re-closing of the contacts 142A will re-energize the coil 140; and the re-closing of the contacts 142D will hold the motor 210 energized until the single-lobe cam permits the movable contact of the switch 214 to move back up to its upper position.

As the wiper 202 of the switch 137 moved into engagement with the contact 190 of that switch, the normally-closed contacts 168 and 170 in FIG. 3 opened and the normally-open contacts 170 and 172 in FIG. 7 closed. The closing of the contacts 170 and 172 is not significant at this time because the contacts 626B are open; but the opening of the contacts 168 and 170 is significant. As a result of that opening of the contacts 168 and 170, the relay 232 will be de-energized and will cause the rejection of any further five dollar bills. Such rejection is important because the maximum credit that can be established by the embodiment of the money-actuated device shown is nine dollars and ninety-nine cents; and the insertion of an additional five dollars would exceed that maximum credit.

As the wiper 202 of the switch 137 moved into engagement with the contact 198 of that switch, the contacts 174 and 176 of that switch opened to de-energize the coil 234 in FIG. 3. That de-energization will cause the rejection of all further coins and one dollar bills. The opening of the contacts 174 and 176 would also have caused the rejection of five dollar bills if the earlier opening of the contacts 168 and 170 had not already done so. The rejection of all further money is desirable because the maximum credit that can be established by the embodiment of the money-actuated device shown is nine dollars and ninety-nine cents; and the insertion of an additional dollar would exceed that maximum credit.

The fact that the contacts 174 and 176 open whenever the wiper 202 engages the contact 198 of the stepping switch 137 does not prevent the insertion of money aggregating a total of nine dollars and ninety-nine cents. A total of eight dollars and ninety-nine cents can be deposited before the contacts 174 and 176 of switch 137 open; and the insertion of a further dollar would then bring the total to nine dollars and ninety-nine cents.

*Operation of product selection circuit*

The product selection circuit initially determines whether the money-actuated device has a supply of the desired product or is "out" of that product. Then, if that money-actuated device has a supply of the desired product, that circuit will actuate a value sensing circuit which will compare the sales price of the desired product with the credit which has been established by the insertion of money. Further, if the credit equals or exceeds the sales price, the value sensing circuit will initiate an operation of the vend relay circuit.

In operating the product selection circuit, the patron will actuate one of the selection switches 226, 228 and 230; and it will be assumed that the patron actuated the selection switch 230. The movement of the movable contact of the switch 230 down into engagement with the lower fixed contact of that switch will complete a circuit via conductor 30, cam-operated switch 430, normally-closed relay contacts 400H and 624F, the movable and upper fixed contacts of the switches 226 and 228, the movable and lower fixed contacts of the switch 230, the movable and lower fixed contacts of the empty switch 242, selection relay coil 236, and conductor 32. The completion of this circuit shows that there is an adequate supply of the desired product; and hence the product selection circuit will automatically go on and initiate the operation of the value sensing circuit. However, if the supply of the desired product had been exhausted, the movable contact of the empty switch 242 would have been in its upper position; and the actuator of the selection switch 230 would have completed a circuit via conductor 30, switch 430, contacts 400H and 624F, the movable and upper fixed contacts of the switches 226 and 228, the movable and lower fixed contacts of the switch 230, the movable and upper fixed contacts of the empty switch 242, the "Make Other Selection" lamp 248, and the conductor 32. The completion of this latter circuit could not initiate the operation of the value sensing circuit; but it would indicate to the patron the need of selecting a different product. In this way, the product selection circuit initially determines whether the money-actuated device has a supply of the desired product or is "out" of that product. It will be noted that the "Make Other Selection" lamp 248 will remain illuminated only as long as the movable contact of the switch 230 is held down; and this is desirable because a continuously illuminated empty lamp would deter patrons and could also burn out and thus fail to warn patrons that the supply of the desired product is exhausted.

The completion of the circuit through the coil 236 will energize that coil and thereby close the contacts 236A in FIG. 3, open the contacts 236B in FIG. 3, close the contacts 236C, 236D and 236E in FIG. 1, open the contacts 236F in FIG. 1, and close the contacts 236G in FIG. 4. The opening of the contacts 236F in FIG. 1 isolates the middle bus bars 314, 310 and 306 and the right-hand bus bars 314, 310 and 306 from the conductor 30. The closing of the contacts 236A and 236G does not, at this time, energize any components of the money-actuated device because the contacts 400J and 412B are open. The opening of the contacts 236B isolates the contacts 238A and the contacts 238B from the contacts 400J.

The actuation of the selection switch 230 also performed a further function. Specifically, it disconnected the contacts 174 and 176 from the conductor 30; and this means that if the relay coils 232 and 234 had been energized, those relay coils would have been de-energized during the actuation of the switch 230 and thereby caused the money-actuated device to reject all money inserted while the movable contact of that switch was out of its normal, upper position.

*Operation of value sensing circuit*

The closing of the contacts 236C, 236D and 236E co-acts with the closed contacts 140A to connect the left-hand bus bars 314, 310 and 306 to the conductor 30. At such time current will flow through the "exact" relay coil 396 via conductor 30, contacts 140A, 236C, 236D and 236E, left-hand bus bar 314, price-setting pin 328, the second uppermost bus bar 312, resistor 286, contact 198, wiper 202, contacts 439C, conductor 388, diode 398, "exact" relay coil 396 and the conductor 32; but the ohmic value of the resistor 286 will be great enough to keep the "exact" relay coil 396 from becoming energized. Similarly, current will flow through the "exact" relay coil 376 but the ohmic values of the serially-connected resistors 268, 270, 272, 274, 276, 278, 280, 282 and 284 will be great enough to keep the "exact" relay coil 376 from becoming energized. Also, current will flow through the "exact" relay coil 354 but the ohmic value of the serially-connected resistors, 250, 252, 254, 256, 258, 260, 262, 264 and 266 will be great enough to keep the "exact" relay coil 354 from becoming energized.

The tube 342 will not be able to fire because the voltage drop across the serially-connected resistors 250, 252, 254, 256, 258, 260, 262, 264 and 266 will be in such a direction as to make the bias on the grid of that tube even more negative. Similarly, the tube 372 will not be able to fire because the voltage drop across the serially-connected resistors 268, 270, 272, 274, 276, 278, 280, 282 and 284 will be in such a direction as to make the bias on the grid of that tube even more negative. However, the tube 392 will fire because the voltage drop across the resistor 286 will be in such a direction as to make the grid of that tube positive.

In this way, the value sensing circuit quickly, and without any movement of wipers or motor shafts or the like, compare the credit established on the switches 137, 133 and 48 with the sales price established by the price-setting pins 328, 322 and 316 and determined that none of the digits of the credit exactly met any of the digits of the credit, determined that the middle and last digits of the credit were not greater than the middle and last digits of the sales price, and determined that the first digit of the credit was greater than the first digit of the sales price. Further, the value sensing circuit also initiated an operation of the vending relay circuit, because the firing of the tube 392 energized the "over" relay coil 394.

*Operation of vend relay circuit*

The firing of the tube 392 will complete a circuit via conductor 30, conductor 341, tube 392, conductor 386, "over" relay coil 394 and conductor 32. The resultant energization of the coil 394 will close the contacts 394A in FIG. 4, thereby completing a circuit via conductor 30, contacts 394A, junction 399, the coil 400 of the credit relay, and conductor 32. The resulting energization of the coil 400 will open the contacts 400A in FIG. 3, close the contacts 400B and 400F in FIG. 4, open the contacts 400C and 400D in FIG. 5, open the contacts 400E in FIG. 7, open the contacts 400G and 400H in FIG. 3, and close the contacts 400J in FIG. 3. The opening of the contacts 400A will break the circuit of the relay coil 408; and thereupon the relay contacts 408A and 408B in FIG. 4 will re-close. The re-closing of the contacts 408A will connect the left-hand terminal of the vend relay coil 412 to the contacts 400F, and the re-closing of the contacts 408B will connect the contacts 400B to the conductor 30. The closing of the contacts 400B in FIG. 4 will complete a holding circuit for the coil 400 via conductor 30, the movable and upper fixed contacts of the cam-operated switch 430 in FIG. 3, junction 490, conductor 488, re-closed contact 408B, now-closed contacts 400B, credit relay coil 400, and conductor 32.

The opening of the contacts 400C and 400D in FIG. 5 will isolate the transfer relay coils 224 and 222, respectively, from the conductors 206 and 204. The opening of the contacts 400E in FIG. 7 keeps actuation of the payout switch 494 from energizing the money payout relay coil 624. The opening of the contacts 400G in FIG. 3 disconnects the lower fixed contact of the switch 430 from the conductor 30. The opening of the contacts 400H in FIG. 3 disconnects the selection switches 226, 228 and 230 from the conductor 30; and this is desirable because the patron must be kept from energizing further selection relays during the vending operation and during the credit-deducting operation. The opening of the contacts 400H also makes certain that the relays 232 and 234 are isolated from the conductor 30; and this is desirable because all bills and coins that are inserted during the vending operation and during the credit-deducting operation must be rejected. The closing of the contacts 400J in FIG. 3 will complete a holding circuit for the coil 236 of the selection relay via conductor 30, cam-operated switch 430, contacts 400J, contacts 236A, selection relay coil 236 and conductor 32.

In this description, the coil 400 has been considered to be the operator of all of the contacts 400A, 400B, 400C, 400D, 400E, 400F, 400G, 400H and 400J; but in actual practice several parallel-connected coils have been used. In theory, all of the contacts of all of those coils could shift their positions simultaneously; but in actual practice some of those contacts occasionally lagged the others by a fraction of a second. Further, while it is theoretically possible for the contacts of the selection relays to have the same opening and closing times, some of those contacts occasionally took a fraction of a second longer to re-open than did the contacts of the other selection relays. The overall result is that if the coil 48 were to be permitted to re-close its contacts 408A and 408B as soon as the contacts 400A opened the circuit of that coil, it would be possible for a patron to occasionally actuate a low-priced selection switch and then immediately actuate a high-priced selection switch —the low-priced selection switch initiating the vend circuit and the high-priced selection switch determining the product that is vended. The present invention obviates this objectionable result by connecting the capacitor 410 in parallel with the series-connected resistor 406 and coil 408. That capacitor will coact with that resistor to provide a time-delay which will hold the contacts 408A and 408B closed for approximately one quarter of a second after the contacts 400A have been opened; and this means that if a patron does not hold a selection switch in actuated position for about a quarter of a second, the contacts 408A will not re-close and complete the circuit for the vend relay coil 412. The requirement that the patron hold a selection switch in actuated position for about a quarter of a second adequately obviates the objectionable result mentioned above.

The re-closing of the contacts 408A will follow the closing of the contacts 400F and will complete a circuit via conductor 30, the cam-operated switch 432 in FIG. 4, now-closed contacts 400F, re-closed contacts 408A, the vend relay coil 412, and conductor 32. The resulting energization of the coil 412 will close the contacts 412A in FIG. 4 and establish a holding circuit for the coil 412 via conductor 30, the movable and upper fixed contacts of the delivery switches 414, 416 and 418, contacts 412A, coil 412, and conductor 32. That holding circuit is dependent solely upon the delivery switches 414, 416 and 418 and will thus keep the coil 412 energized until the desired product engages the actuator of one of those delivery switches.

The coil 412 will close the contacts 412B in FIG. 4 and preset a circuit to the source of motive power 434. However, that circuit will not be completed until the cam 428 permits the movable contact of the switch 432 to move up into engagement with the upper fixed contact of that switch.

*Operation of product vending circuit*

The coil 412 opens the contacts 412D in FIG. 3, and it closes the contacts 412C in FIG. 3. The closing of the latter contacts completes a circuit via conductor 30, contacts 412C, the movable and upper fixed contacts of the switch 420, deductor motor 422, and conductor 32; and thereupon that motor will start rotating its output shaft. Such rotation will rotate cams 424, 426, 428, 440, 442, 444, and will rotate the wipers 470, 468 and 466, respectively, of the rotary selector switches 464, 462 and 460.

The cam 424 will promptly cause the movable contact of the switch 420 to move downwardly into engagement with the lower fixed contact of that switch, and such movement will establish a running circuit for the motor 422 via conductor 30, the movable and upper fixed contacts of switches 430 in FIG. 3, junction 490, the movable and lower fixed contacts of switch 420, motor 422, and conductor 32. That running circuit will keep the motor 422 energized until the output shaft thereof has almost reached the end of a revolution.

The rotation of the cam 440 will move the armature 448 of the mechanical latching relay into a position where it will be latched and held by the latch 450. At such time, the contacts 446A in FIG. 4 will close; but that closing will be unable to energize the coil 446 because the contacts 203B are held open by the energization of the coil 203. The contacts 446B in FIG. 7 will close, but such closing will not have an immediate effect because the contacts 624A are open. The contacts 446C in FIG. 7 will open and prevent the subsequent energization of the coil 640. The contacts 446D in FIG. 8 will close, but such closing will not have an immediate effect because the contacts 624D are open. The contacts 446E in FIG. 8 will open and prevent the subsequent energization of the coil 636. The shifting of the contacts 446B, 446C, 446D and 446E will provide a "memory" for the money-actuated device, of the fact that a selection was made; and hence during the operation of the change payout circuit, the coils 626 and 632, rather than the coils 640 and 636, will be energized.

The rotation of the cam 442 will close the switch 454, but the closing of that switch will not energize the stepping coil 164 of the rotary stepping switch 137 because the contacts 374A are open and because the contacts 376A, 352A and 354 also are open. Similarly, the rotation of the cam 442 will close the switch 456, but the closing of that switch will not energize the stepping coil 132 of the rotary stepping switch 133 because the contacts 374A are open and because the contacts 376A, 352A and 354A also are open. This is necessary because the eight dollars and ninety-nine cents sales price requires "borrowings" from each of the first and middle digits of the credit of nine dollars; and hence nines-complements advancements rather than tens-complements advancements must be provided for the wipers 202 and 143 of the switch 137 and 133.

The cam 428 will, shortly after the re-closing of the switches 454 and 456, permit the movable contact of switch 432 to move up into engagement with the upper fixed contact of that switch. Such movement will complete a circuit via conductor 30, the movable and upper fixed contacts of switch 432, contacts 412B, contacts 236G, source of motive power 434, and conductor 32. That source of motive power will be energzed and will start dispensing the desired product. That source of motive power will have its own cycle-controlling mechanism; and hence that source of motive power will operate until it completes its cycle of operation.

It will be noted that the relay contacts 412B will open, and thereby break the circuit to the source of motive power 434, as soon as the desired product engages the actuator of the delivery switch 414 and thus causes that switch to de-energize the vend relay coil 412. However, the source of motive power 434 will not become de-energized because a holding circuit will immediately be established for that source of motive power via conductor 30, the movable and lower fixed contacts of the switch 414, source of motive power 434, and conductor 32. That holding circuit will keep that source of motive power energized until it has moved the desired product wholly beyond the actuator of the delivery switch 414. This is desirable because it makes certain that a temporary sticking of the desired product will not lead to a failure to deliver that product to the patron.

The movement of the movable contact of the switch 432 up into engagement with the upper fixed contact of that switch also completed a circuit via conductor 30, the movable and upper fixed contacts of the switch 432, coil 439 of the wiper relay, and conductor 32. The resulting energization of the coil 439 enabled that coil to open the contacts 439A, 439B and 439C in FIG. 1. The opening of those contacts is desirable because it isolates the "exact" relay coils 354, 376 and 396 from the wipers 126, 143 and 202, respectively, during the vending and credit-deducting operations. Also, the opening of those contacts is desirable because it isolates the grids of the tubes 342, 372 and 392 from the wipers 126, 143 and 202, respectively, during the vending and credit-deducting operations. The isolation of the grids of the tubes 342, 372 and 392 from the wipers 126, 143 and 202, respectively, will render those tubes non-conductive because the filament windings of the transformers will bias those tubes beyond cutoff. At this time, therefore, the coil 394 will become de-energized and will re-open the contacts 394A.

Operation of credit deduction circuit

The rotation of the output shaft of the motor 422 will move the wipers 470, 468 and 466 past the second lowermost contacts of the switches 464, 462 and 460, respectively, and into engagement with the third lowermost contacts of those switches. Such movement will not energize any of the coils 476, 474 and 472 because the price-setting pins 328 and 322 are not in engagement with the lowermost bus bars 312 and 308, respectively, and the price-setting pin 316 is not in engagement with the second lowermost bus bar 304. The first lobe of the cam 444 will thus close and reopen the switch 458 without energizing any of the stepping coils 164, 132 and 50.

The motor 422 will successively advance the wipers 470, 468 and 466 into and out of engagement with the fourth-lowermost, fifth-lowermost, sixth-lowermost, seventh-lowermost, eighth-lowermost, ninth-lowermost and tenth-lowermost contacts on the switches 464, 462 and 460, respectively; but the coils 476, 474 and 472 will remain de-energized. Hence, the second, third, fourth, fifth, sixth, seventh and eighth closings and re-openings of switch 458 will not cause energizations and de-energizations of any of the coils 164, 132 and 50. However, when the output shaft of motor 422 moves the wipers 470, 468 and 466 into engagement with the second uppermost contacts of the switches 464, 462 and 460 respectively, one circuit will be completed via contacts 140A in FIG. 1, contacts 236C, 236D and 236E, the left-hand bus bar 314, the price-setting pin 328, the second uppermost bus bar 312, contact 196, cable 482, the second-uppermost contact of switch 464, wiper 470, coil 476, and conductor 32; and a second circuit will be completed via conductor 30, contacts 140A, contacts 236C, left-hand bus bar 306, price-setting pin 316, the uppermost bus bar 304, contact 122, cable 478, the second-uppermost contact of switch 460, wiper 466, coil 472, and conductor 32. The energization of the coil 476 will close the contacts 476A to establish a holding circuit for that coil via conductor 30, the movable and upper fixed contacts of the switch 430 in FIG. 3, junction 490, conductor 488, contacts 408B, contacts 400B, junction 399, conductor 492, now-closed contacts 476A, coil 476, and conductor 32; and the energization of the coil 472 will close the contacts 472A to establish a holding circuit for that coil via conductor 30, the movable and upper fixed contacts of the switch 430 in FIG. 3, junction 490, conductor 488, contacts 408B, contacts 400B, junction 399, conductor 492, now-closed contacts 472A, coil 472, and conductor 32.

The energization of coil 476 opens the contacts 476B in FIG. 5 and thereby isolates the stepping coil 164 from the junction 485. In doing so, that coil protects against the very rare, but nevertheless existent, possibility that the switch 454 might be delayed in re-opening at a time when one or more of the contacts 352A, 354A, 376A, 374A, 396A and 394A still connected the junction 485 to the conductor 30. Without the protection afforded by the opening of contacts 476B, the stepping coil 164 could remain energized and could thus fail to respond to the closing and re-opening of the contacts 454.

The coil 476 also closes the contacts 476C in FIG. 5 adjacent the left-hand terminal of the stepping coil 164, and the coil 472 also closes the contacts 472B adjacent the left-hand terminal of the stepping coil 50. As a result, when the output shaft of the motor 422 rotates the last lobe of the nine-lobe cam 444 into engagement with the actuator of switch 458, and thereby closes that switch, the stepping coil 164 will be energized via conductor 30, switch 458, contacts 476C, coil 164, and conductor 32 and the stepping coil 50 will be energized via conductor 30, switch 458, contact 472B, coil 50, and conductor 32. Such energizations will cock the switches 137 and 48, and the subsequent re-opening of the switch 458 will cause the wipers 202 and 126 to advance one step into engagement with the contacts 180 and 106, respectively. At this time, the wipers 202, 143 and 126 establish a residual credit of one cent; and that, of course, is the exact difference between the credit of nine dollars and the sales price of eight dollars and ninety-nine cents.

The advance of the wiper 126 into engagement with the contact 106 will close the contacts 90 in FIG. 2 and will thereby energize the coil 131 via conductor 30, contacts 90, coil 131, and conductor 32. The resulting energization of that coil will close the contacts 131A in FIG. 3, but such closing will not have an immediate effect because the contacts 400A are open. The contacts 131B ni FIG. 4 will open and prevent energization of the coil 446 of the mechanical latching relay. The contacts 131C in FIG. 7 will close, but such closing will not have an immediate effect because the contacts 624B are open. The contacts 131D in FIG. 5 will close, but such closing will not have an immediate effect because the contacts 656C are open. The contacts 131E in FIG. 6 will close but such closing will not have an immediate effect because the contacts 632B are open.

The advance of the wiper 202 into its zero position will cause the contacts 166 in FIG. 2 to re-open, will cause the contacts 168 and 170 in FIG. 3 to re-close, will cause the contacts 170 and 172 in FIG. 7 to re-open, and will cause the contacts 174 and 176 in FIG. 3 to re-close. The re-opening of the contacts 166 will de-energize the coil 203; and thereupon the contacts 203A in FIG. 3 will re-open, but such re-opening will have no immediate effect because the coil 408 was previously de-energized and because the contacts 131A are closed. The contacts 203B in FIG. 4 will reclose; but such closing will not have an immediate effect because the contacts 131B are open. The contacts 203C in FIG. 7 will re-open, but such re-opening will have no immediate effect because the contacts 131C are closed and the contacts 624B are open. The contacts 203D in FIG. 5 will re-open, but such re-opening will have no immediate effect because the contacts 656A are open.

The re-closing of the contacts 168 and 170 will have no immediate effect because the contacts 400H are still open. The re-opening of the contacts 170 and 172 will have no immediate effect because the contacts 626B are open. The re-closing of the contacts 174 and 176 will have no immediate effect because the contacts 400H are still open.

The wipers 470, 468 and 466 will then move into and out of engagement with the uppermost contacts of the switches 464, 462 and 460, respectively; but no change will occur in the condition of any of the components of the money-actuated device because those contacts are not connected to anything.

As the output shaft of the motor 422 approaches the end of its cycle, the cam 426 will shift the movable contact of the switch 430 down out of engagement with the upper fixed contact of that switch and into engagement with the lower fixed contact of that switch. As that movable contact moves out of engagement with the upper fixed contact of that switch, the holding circuit for the credit relay coil 400, the running circuit for the motor 422, the holding circuit for the coil 472, and the holding circuit for the coil 476 will be broken. The coil 400 will permit the contacts 400A to re-close, but such re-closing will have no immediate effect because of the broken circuit at the switch 430. The coil 400 will permit the contacts 400B to re-open, but such re-opening will have no immediate effect because of the broken circuit at the switch 430. The coil 400 will permit the contacts 400B and 400C to re-close, but such re-closing will have no immediate effect because the contacts 138 and 100 and 102 are open. The coil 400 will permit the contacts 400E to re-close, but such re-closing will have no immediate effect because the switch 494 is open. The coil 400 will permit the contacts 400F to re-open, but such re-opening will have no immediate effect because the movable contact of switch 432 is out of engagement with the lower contact of that switch. The coil 400 will re-open the contacts 400J and thereby de-energize the coil 236. The coil 400 will re-close the contacts 400H, but such re-closing will have no immediate effect because of the broken circuit at the switch 432. The coil 400 will also re-close the contacts 400G; and if a desired product has not yet been dispensed, the motor 422 will come to rest, the coil 408 will remain de-energized, the relays 232 and 234 will remain de-energized, and the selection switches 226, 228 and 230 will remain ineffective.

As the coil 236 of the selection relay became de-energized, the contacts 236A re-opened, but such re-opening had no immediate effect because the contacts 400J were open. The contacts 236B re-closed, but such re-closing had no immediate effect because the contacts 400J were open. Contacts 236C, 236D and 236E re-opened, but the "over" and "exact" relay coils were de-energized and the coils 276, 274 and 272 were de-energized. Similarly, the contacts 236F re-closed, but such re-closing had no immediate effect because the "over" and "exact" relay coils were de-energized and the coils 276, 274 and 272 were de-energized. The contacts 236G re-opened, but such re-closing had no immediate effect because the source of motive power 434 has its own cycle-controlling mechanism.

If, however, the desired product had been dispensed prior to the time the contacts 400G re-closed, the source of motive power 434 would have become de-energized and the delivery switch 414 would have opened and would thereby have de-energized the vend relay coil 412. This means that the contacts 412A would have re-opened, but such re-opening had no immediate effect because the delivery switch 414 had previously opened. The contacts 412B would have re-opened, but such re-opening had no immediate effect because the contacts 236G had previously opened. The contacts 412C re-opened, but such re-opening had no immediate effect because the movable contact of the switch 420 is out of engagement with the upper fixed contact of that switch. The contacts 412D would have re-closed; and this means that when the contacts 400G re-closed, the motor 422, the relay coils 232 and 234 and the coil 408 became re-energized. Also, the selection switches 226, 228 and 230 again became effective.

As the motor 422 started rotating its shaft again the cam 428 shifted the movable contact of the switch 432 into engagement with the lower fixed contact of that switch. Such shifting de-energized the wiper relay coil 439 but did not re-energize the vend relay coil 412 because the contacts 400F were open. The cam 426 then permitted the movable contact of the switch 430 to shift back up into engagement with the upper contact of that switch, but that shifting had no immediate effect. The wipers 470, 468 and 466 of the rotary selector switches 464, 462 and 460, respectively, then moved into engagement with the lowermost contacts of those switches; and as they did so, the cam 424 permitted the movable contact of switch 420 to move upwardly away from the lower fixed contact of that switch and deenergized the motor 422.

The de-energization of the wiper relay coil 439 permitted the contacts 439A, 439B and 439C in FIG. 1 to re-close. However, such reclosings have no immediate effect because the contacts 236C, 238C and 240B are open and the contacts 626M, 626N and 626P are open.

*Operation of change payout circuits*

The patron need only actuate the payout switch 494 in FIG. 7 to collect his change. Upon the actuation of that switch, a circuit will be completed via conductor 30, contacts 140B, contacts 400E, switch 494, money payout relay coil 624, and conductor 32. The resultant energization of that coil will close the contacts 624B, and those contacts will coact with the contacts 131C to establish a holding circuit for the coil 624. The contacts 624A will close and thereby energize the bill payout relay coil 626 and the bill cash box solenoid 628. The contacts 624C will open, but such opening will not have an immediate effect because the movable contact of the switch 620 does not engage the lower fixed contact of that switch. The contacts 624D will close and thereby energize the coin payout relay coil 632 and the coin cash box solenoid 634. The contacts 624E will open, but such opening will not have an immediate effect because the movable contact of the switch 616 is not in engagement with the lower fixed contact of that switch. The contacts 624F in FIG. 3 will open and de-energize the relays 232 and 234 and also render the selection switches 226, 228 and 230 ineffective.

The energization of the bill cash box solenoid 628 will energize the motor and solenoid of the device which is temporarily holding the four one dollar bills and the one five dollar bill. As a result, those bills will be directed into the bill cash box. The energization of the coin cash box solenoid 634 will move the floor of the coin receptacle downwardly in such a way that if any coins had been inserted by the patron, those coins would pass to the coin cash box.

The energization of the coil 626 of the bill payout relay will close contacts 626A and complete a circuit via conductor 30, the movable and upper fixed contacts of switch 620, the movable and upper fixed contacts of the switch 622, contacts 626A, motor 614, and conductor 32. That motor will start rotating its shaft 610 and the cams 605 and 607 thereon. Also, that shaft will start rotating the shafts 581 in FIG. 16 and the cranks 579 on those shafts.

The cam 607 will promptly cause the movable contact of the switch 622 to move down into engagement with the lower fixed contact of that switch. Such movement will establish a running circuit for the motor 614 which is independent of the contacts 626A.

The energization of the coil 632 of the coin payout relay will close contacts 632A and complete a circuit via conductor 30, the movable and upper fixed contacts of the switch 616, the movable and upper fixed contacts of the switch 618, motor 612, and conductor 32. That motor will start rotating its shaft 558 and the cams 540, 542, 544, 546, 548, 550, 552, 554, 556, 59 and 561 thereon and the wipers 560 and 564 thereon.

The cam 561 will promptly cause the movable contact of the switch 614 to move down into engagement with the lower fixed contact of that switch. Such movement will establish a running circuit for the motor 612 which is independent of the contacts 632A.

Although the coil 632 will close the contacts 632B, 632C, 632D, 632E, 632F, 632G, 632H, 632J, 632K and 632L, none of those contacts will effect the energization of any of the electromagnets 522, 524, 526, 528, 530, 532, 534, 536 or 538. Similarly, although the coil 626 will close the contacts 626C, 626D, 626E, 626F and 626G, none of those contacts will effect the energization of any of the electromagnets 662, 664, 666 or 668. However, as the shaft 558 rotates the wiper 560 into its first dotted-line position in FIG. 6, the electromagnet 522 will be energized via conductor 30, conductor 341, contacts 626M, wiper 126, contact 106, cable 478, the 0.01 conductor adjacent switch 562, the appropriate contact of that switch, the wiper 560, the electromagnet 522, and conductor 32. As a result, that electromagnet will raise its armature; and immediately thereafter the cam 540 will present its intermediate dwell to the ear 517 on the coin-ejecting slide 516 adjacent the penny-storage tube 496. That slide will then respond to the spring 520 to move to its intermediate position.

After the shaft 558 has rotated about a half of a revolution, the coin-ejecting dwell 572 of the cam 540 will move into register with the ear on the slide 516 adjacent the penny-storage tube 496. Thereupon, that slide will move to the right and eject a penny; and that penny will fall downwardly to the coin cup where it can be collected by the patron. In this way, the money-actuated device gives the patron his exact change.

As the intermediate dwells of the other cams 542, 544, 546, 548, 550, 552 and 556 moved into register with the ears 517 of the adjacent slides 516, the armatures of the electromagnets associated with those slides intercepted and held the abutments at the left-hand ends of those slides. Those armatures continued to hold those abutments, and the armature of the electromagnets 536 intercepted and held the abutment at the left-hand end of the quarter-ejecting slide 516, as the coin-ejecting dwells of the cams 542, 544, 546, 548, 550, 552, 554 and 556 moved into register with the ears 517 on the adjacent slides. Similarly, when the cranks 579 rotated the connecting rods 585 to the right in FIG. 17, the armatures of the electromagnets 660, 662, 664, 666 and 668 held the bill-ejector 571 against movement to bill-ejecting position.

It will be noted that during the operation of the change payout circuit, the contacts 626L kept the coil 439 of the wiper relay energized. As a result, the contacts 439A, 439B and 439C in FIG. 1 were kept open, and thus substantially isolated the "exact" relay coils from the conductor 30. Further, the contacts 439A, 439B and 439C isolated the price setters 305, 309 and 313 from the grids of the tubes 342, 372 and 392 and thus made certain that the filament windings of the transformers would keep those tubes non-conductive. The resultant substantial isolation of the "exact" and "over" relays is desirable because it keeps that relay from starting a further vend or deduct cycle.

During the last portions of the revolutions of the shafts 558 and 610, the slides 516 and the currency-ejectors 571 will be moved back out of engagement with the armatures of the adjacent electromagnets. The cams in FIG. 16 have long and gentle rises to return all of the slides 516 to the positions shown by FIG. 16; and as the abutment on the left-hand end of the slide 516 adjacent the penny-storage tube 496 moves to the left it will successively raise the armature of the electromagnet 522 and then let the armature fall down into blocking position behind that abutment. At the end of the cycles of the shafts 558 and 610, the abutments on all of the slides 516 will be adjacent but out of engagement with the armatures of the electromagnets, and the ears 583 on the currency-ejectors 571 will be adjacent but out of engagement with the armatures of the electromagnets.

If, instead of making a selection as described above, the patron had decided to get her money back, she need only actuate the payout switch 494. Thereupon a circuit will be completed via conductor 30, contacts 140B, in FIG. 7, 499E, switch 494, coil 624, and conductor 32. The resulting closing of contacts 624B and opening of contacts 624C, 624E and 624F will produce the same results that the corresponding closing and opening of those contacts produce when the switch 494 is actuated after a selection has been made. However, the closing of the contacts 624A and 624D produces a result which is totally different than the result which is produced when those contacts are closed after a selection has been made. Specifically, instead of energizing the bill payout relay coil 626 and the bill cash box solenoid 628, the contacts 624A energize the bill return solenoid 640; and instead of energizing the coin payout relay coil 632 and the coin cash box solenoid 634, the contacts 624D energize the coin return solenoid 636.

This significantly different result is due to the fact that where a selection is made the armature 448 of the mechanical latching relay in FIG. 4 is moved and latched, whereas that armature is not moved and is not latched where a selection is not made. After the armature 448 has been moved and latched, the contacts 446B and 446D will be closed and the contacts 446C and 446E will be open; and hence the closing of the contacts 624A and 624D directly energized the coils 626, 628, 632 and 634. However, where the armature 448B remains in its normal position, the contacts 446B and 446D will be open and the contacts 446C and 446E will be closed; and hence the closing of the contacts 624A and 624D directly energized the coils 640 and 636.

The coil 640 will cause the motor of the bill-holding device of the said Ellis et al. application to start running, and that device will return the patron's four one dollar bills and one five dollar bill to her. The coil 636 will cause the floor of the coin receptacle of the said Erickson application to move downwardly in such a way that if any coins had been inserted they too would have been returned to the patron. In this way, the patron will have returned to her the exact money she inserted.

The energization of the coil 640 causes that coil to close the contacts 640A in FIG. 8. Similarly, the energization of the coil 636 causes that coil to close the contacts 636A in FIG. 8. The closing of the contacts 640A and 636A will actuate the pulse generator indicated by the dashed-lines in FIG. 8; and that pulse generator will recurrently energize and de-energize the homing relay coil 656. That coil will recurrently close and open its contacts 656A, 656B and 656C and thereby step the switches 137, 133 and 48 to zero. In this way, the patron can get her money back, and the switches 48, 133 and 137 will return to their normal positions. Where the residual credit is one cent, only the wiper 126 needed to be stepped to its zero position; because the wiper 143 always remained in its zero position and the wiper 202 was advanced to its zero position during the operation of the credit deduction circuit.

*Operation of homing circuit*

As the output shaft 558 of the motor 612 approaches the end of its cycle, the cam 559 will shift the movable contact of the switch 616 downwardly, thereby de-energizing that motor and energizing the coil 638. Similarly, as the output shaft 610 of the motor 614 approaches the end of its cycle, the cam 605 will shift the movable contact of the switch 620 downwardly, thereby de-energizing that motor and energizing the coil 630. The energization of the coils 630 and 638 will close the contacts 630A and 638A in FIG. 8 and thereby energize the pulse generator. The resulting energizations and de-energizations of the homing relay coil 656 will recurrently energize and de-energize the contacts 656C, along with the contacts 656A and 656B; and hence the stepping coil 50 will recurrently cock and release the switch 48. As a result, the wiper 126 will quickly step back to zero.

As the wiper 126 moves into engagement with the contact 114, the contacts 94 and 96 in FIG. 6 will close and energize the coil 658 that controls the contacts adjacent the rotary selector switch 566; but the shifting of those contacts is not significant because the wiper 564 has moved past its four dotted-line positions. The contacts 94 and 96 will remain closed as the wiper 126 engages the contacts 116, 118, 120 and 122; but the shifted positions of the contacts adjacent the rotary selector switch 566 are not significant at this time because the wiper 560 has moved past its four dotted-line positions.

As the wiper 126 moves into engagement with the contact 122, the contacts 100 and 102 in FIG. 5 will close. However, the closing of those contacts is not significant at this time because the transfer relay coil 222 will be isolated from the conductor 30 by the opening of the contacts 656E as the contacts 656C close. Hence, while the contacts 656C will recurrently close and open, they will be unable to energize the transfer relay coil 222.

As the wiper 126 moves into engagement with the contact 104, the contacts 90, 94 and 96, and 100 and 102 will re-open and remain open. Thereupon the relay coil 131 will become de-energized, the coil 658 will become de-energized, and the transfer relay coil 222 will remain de-energized. The contacts controlled by the coil 658 will return to their normal positions, but such returning will not be significant at this time. The de-energization of the coil 131 will re-open contacts 131A in FIG. 3 and de-energize the coil 408; but such de-energization is not significant at this time. The re-opening of the contacts 131D in FIG. 5 isolates the stepping coil 50 from the conductor 30 and thereby keeps the wiper 126 in engagement with the contact 104. The re-opening of the contacts 131E in FIG. 6 is not significant at this time. However, the re-closing of the contacts 131B in FIG. 4 will energize the coil 446 of the mechanical latching relay; and the re-opening of the contacts 131C in FIG. 7 will de-energize the coil 624. The contacts operated by the armature 448 will return to their normal positions, and the contacts controlled by the coil 624 will return to their normal positions.

As a result, the motors 614 and 612 will be re-energized and will rotate the shafts 610 and 558 to their normal positions. At such time the cams 607 and 561 will cause the switches 622 and 618 to de-energize those motors and the coils 630 and 638. The money-actuated device will thus be in its normal, at-rest position; and patrons can insert further money and make further selections.

*Actuation of selection switch 228*

The selection switch 228 can be actuated to select a product having a sales price of four dollars and sixty-one cents; and in the operation of that selection switch it will be assumed that the patron will insert three one dollar bills, two half dollars, and three quarters. The insertion of the one dollar bills will necessarily cause the movable contact of the switch 44 to move down into engagement with the lower fixed contact of that switch and then return to its normal upper position; and as that movable contact does so it will de-energize and re-energize the coil 140 and will energize and de-energize the stepping coil 164 of the switch 137. As a result, the wiper 202 of that switch will advance into engagement with the contact 186. As the wiper 202 moved out of engagement with the contact 180, the contacts 166 in FIG. 2 closed; and thereupon the relay coil 203 became energized. That coil will remain energized as the wiper 202 successively moves into and out of engagement with the contacts 182 and 184 and comes to rest in engagement with the contact 186. The energization of coil 203 will close contacts 203A and energize the coil 408. The closing of contacts 203B will isolate the relay coil 446 from the conductor 30; the closing of the contacts 203C will have no immediate effect at this time, and the closing of the contacts 203D will have no effect at this time.

The insertion of the first half-dollar will cause the movable contact of the switch 42 to move down and thereby de-energize coil 140 while energizing coil 218. The resulting energization of contacts 218A will establish a holding circuit for the coil 218, the closing of the contacts 218B will energize the coil 142, the closing of the contacts 218C will connect the stepping coil 132 to the fixed contact of the switch 212, and the opening of the contacts 218D will isolate the stepping coil 50 from the fixed contact of the switch 212. The energization of the coil 142 will open the contacts 142A and hold the coil 140 open as the movable contact of switch 42 is returned to its normal open position. The closing of contacts 142B will parallel the contacts 218B, the opening of the contacts 142D will have no immediate effect, but the closing of the contacts 142C will energize the motor 210 as the movable contact of switch 42 returns to its upper position.

The motor 210 will rotate its output shaft through one complete revolution, all as explained heretofore in connection with the insertion of a five dollar bill; and as that shaft so rotates it will enable the five-lobe cam to close and re-open the switch 212 five times. As a result, the stepping coil 132 will be energized and de-energized five times; and the wiper 143 will move into engagement with the contact 154. As the wiper 143 moved out of its zero position, the contacts 134 in FIG. 2 closed and thereby energized the coil 165; and as that wiper moved into engagement with the contact 154, the contacts 136 closed. The closing of the contacts 136 had no immediate effect because the contacts 632C are open, and the closing of the contacts 165A had no immediate effect because the coil 408 is already energized. The opening of the contacts 165B also had no immediate effect because the contacts 203B are open; and the closing of the contacts 165C had no immediate effect because the contacts 203C are closed. The closing of the contacts 165D also had no immediate effect because the contacts 656B are open. As the shaft of the motor 210 reaches the end of a revolution, the coils 142 and 218 will become de-energized, the coil 140 will become re-energized, and the motor 210 will finally become de-energized.

The insertion of the second half-dollar will again energize and de-energize the coils 218 and 142, will again energize and de-energize the motor 210, will again de-energize and re-energize the coil 140, and will again energize and de-energize the stepping coil 132 five times. The wiper 143 will advance into engagement with the contact 144 and then come to rest. As that wiper moved into engagement with the contact 162, the contacts 138 in FIG. 5 closed, thereby connecting the transfer relay coil 224 in parallel with the stepping coil 132. Consequently, the last closing of the switch 212 will energize both of the coils 132 and 224; the energization of the coil 132 cocking the switch 133 and the energization of the coil 224 closing the contacts 224A and thereby connecting the stepping coil 164 to the conductor 30. As the switch 212 re-opens, the wiper 143 will move into engagement with the contact 144 and come to rest, the coil 224 will become de-energized and the wiper 202 of switch 137 will be advanced into engagement with the contact 188. At this time, the contacts 138 will be open, the contacts 136 will be open, and the contacts 134 will be open. As a result, the coil 165 will be de-energized, and the contacts 165A, 165B, and 165D will be in their normal, at-rest positions.

It will be noted that as the wiper 143 moved to and past the nine position, it transferred a credit of one dollar from the switch 133 to the switch 137. This transfer is important; and it occurs automatically and positively in the money-actuated device of the present invention.

At this time, the switch 137 will have a credit of four dollars established on it; and the patron will then insert a quarter. That quarter will move the movable contact of the dime-actuated switch 38 down into engagement with the lower fixed contact of that switch, thereby energizing the stepping coil 132; and then that quarter will free that movable contact for returning movement to its normal position. That downward and upward movement de-energized and re-energized the coil 140; but it also advanced the wiper 143 into engagement with the contact 146. At this time, the contacts 134 will close and energize the relay coil 165. The closing of contacts 165A has no immediate effect because the contacts 203A are closed, the opening of the contacts 165B has no immediate effect because the contacts 203B are open. The closing of the contacts 165C has no immediate effect because the contacts 203C are closed; and the closing of the contacts 165D has no immediate effect because the contacts 656B are open.

The quarter will then move the movable contact of quarter-actuated switch 40 down into engagement with the lower fixed contact of that switch, thereby energizing the coil 216. The resulting closing of contacts 216A will complete a circuit via conductor 30, the movable and upper fixed contacts of the switches 34, 36 and 38, the movable and lower fixed contacts of the switch 40, now-closed contacts 216A, conductor 206, stepping coil 132, and conductor 32. The subsequent returning movement of the movable contact of the switch 40 will break that circuit and cause the de-energization of the stepping coil 132. Thereupon the wiper 143 will move into engagement with the contact 148.

The energization of the coil 216 also closed the contacts 216B, thereby energizing the coil 142. The latter coil opened the contacts 140A and de-energized the coil 140, closed the contacts 142B to establish a holding circuit for itself, opened the contacts 142D, and closed the contacts 142C to energize the motor 210. However, the circuit to the motor 210 was not completed until the movable contact of the switch returned to its upper position. The subsequent rotation of the shaft of that motor will cause the switch 212 to close and open five times, thereby energizing and de-energizing the stepping coil 50 five times. As the shaft of the motor 210 approaches the end of its cycle, the movable contact of the switch 214 will be moved down into engagement with the lower fixed contact of that switch. The coil 142 will then be de-energized; and thereupon the contacts 142A will re-close to energize the coil 140, the contacts 142B will re-open, the contacts 142C will re-open to de-energize the motor 210, and the contacts 142D will re-close to re-energize that motor. Thereafter, the motor 210 will cause the movable contact of the switch 214 to move back up to its normal position and de-energize the motor.

It will be noted that the quarter provided a first stepping of the wiper 143 by actuating the dime-actuated switch 38. That quarter provided a second stepping of the wiper 143 by actuating the quarter-actuated switch 40. Further it will be noted that the stepping switch 133 was cocked as the movable contact of the switch 40 moved down, and that the said stepping switch advanced its wiper 143 as the movable contact moved back up; and that the circuit to the motor 210 was not completed until the movable contact of the switch 40 returned to its upper position. This is important because it makes certain that the second advancement of the wiper 143 is completed before the motor 210 can cause the switch 212 to start advancing the wiper 126 of the switch 48. Without this important time sequence of the stepping of the wiper 143 and the stepping of the wiper 126, a stepping of the wiper 126 could move that wiper to and through its nine position, and thereby provide a tens transfer to the stepping coil 132. Without the time sequence provided by the present invention, the energization of the coil 132 that was directly due to the downward and returning movement of the movable contact of the switch 40 could coincide with the energization of the coil 132 that is due to a tens transfer from the switch 48, and one of those energizations would then not provide the required advancement of the wiper 143. However, with the time sequence provided by the present invention, any tens transfer will come after the coil 132 has been de-energized; and hence that tens transfer will provide the required advancement of the wiper 143.

As the wiper 126 moved into engagement with the contact 106, the contacts 90 closed and energized the coil 131. The closing of the contacts 131A has no immediate effect because the contacts 165A and 203A are closed. The opening of the contacts 131B has no immediate effect because the contacts 165B and 203B are open. The closing of the contacts 131D has no immediate effect because the contacts 656C are open. Also, the closing of the contacts 131E has no immediate effect because the contacts 632B are open.

The movement of the wiper 126 into engagement with the contact 114 closed the contacts 94 and 96; and thereupon the coil 658 became energized. The closing of the contacts 658A, 658B, 658C, 658D, 658E, 658F and 658G has no immediate effect because the wiper 564 is not in one of its dotted-line positions in FIG. 6.

The patron will then insert a second quarter; and the dime-actuated switch 38 will advance the wiper 143 into engagement with the contact 150; and the quarter-actuated switch 40 will advance the wiper 143 into engagement with the contact 152. As the movable contact of the switch 40 returns to its upper position, it will again energize the motor 210 and thereby cause five pulses to be applied to the stepping coil 50.

As the wiper 126 moves into engagement with the contact 122, the contacts 100 and 102 will close; and will thereby connect the transfer relay coil 222 to the conductor 204. Consequently, as the switch 212 provides its fifth pulse, the transfer relay coil 222, as well as the stepping coil 50, will be energized. The energization of the coil 222 will close the contacts 222A and thereby connect the conductor 206 to the conductor 30; and thereupon the stepping coil 132 will be energized. It is important to note that this energization is well subsequent to the energization which the coil 222 experienced when the movable contact of the switch 40 was moved down by the quarter.

The subsequent re-opening of the switch 212 will de-energize the stepping coil 50 and the transfer relay coil 222; and thereupon, the wiper 126 will move into engagement with the contact 104, and the wiper 143 will move into engagement with the contact 154. At this time, the contacts 90 will re-open and de-energize the coil 131, the contacts 94 and 96 will re-open and de-energize the coil 658, and the contacts 100 and 102 will re-open. Also, the contacts 136 will be closed; but those contacts will not energize the electromagnet 538, because the contacts 538 are open.

The patron will then insert a third quarter; and the dime-actuated switch 38 will advance the wiper 143 into engagement with the contact 156; and the quarter-actuated switch 40 will advance the wiper 143 into engagement with the contact 158. As the movable contact of the switch 40 returns to its upper position, it will again energize the motor 210 and thereby cause five pulses to be applied to the stepping coil 50.

As the wiper 126 moved into engagement with the contact 106, the contacts 90 closed and energized the coil 131. However the resultant shifting of the contacts 131A, 131B, 131C, 131D and 131E has no immediate effect. The movement of the wiper 126 into engagement with the contact 114 closed the contacts 94 and 96; and thereupon the coil 658 became energized. The closing of the contacts 658A, 658B, 658C, 658D, 658E, 658F and 658G has no immediate effect because the wiper 564 is not in one of its dotted-line positions in FIG. 6.

At this time the wiper 202 will engage the contact 188, the wiper 143 will engage the contact 158, and the wiper 126 will engage the contact 114. As a result, those wipers will establish a credit of four dollars and sixty-five cents. If the patron then actuates the selection switch 228, the selection relay 238 will close the contacts 238A, 238C, 238D, 238E and 238G and will open the contacts 238B and 238F. The "exact" relay coil 396 will be energized via conductor 30, contacts 140A, 236F, 238C, 238D and 238E, middle bus bar 314, price-setting pin 330, fifth-lowermost bus bar 312, contact 188, wiper 202, contacts 439C, conductor 388, diode 398, coil 396, and conductor 32. The negative bias on the grid of the tube 372 will be reduced by the voltage drop across the resistor 272; and hence that tube will become conductive and will energize the "over" relay coil 374. The negative bias on the grid of the tube 342 will be reduced by the voltage drop across the resistors 258, 260, 262 and 264; and hence that tube will become conductive and will energize the "over" relay coil 352.

The resulting energization of the contacts 396A, 374A, 352A will energize the credit relay coil 400; and, as a result, the credit deduction circuit and the vending circuit will be energized. The shaft of the motor 422 will start rotating and will enable the cam-operated switch 432 to energize the vend relay 412 and then subsequently to energize the source of motive power 436. Further, that rotation will enable the cam 440 to latch up the armature 448 of the mechanical latching relay; and rotation will cause the cam 442 to close and re-open the switches 454 and 456. Such closing will enable the contacts 352A to energize and then de-energize the stepping coil 132 and will enable the contacts 374A to energize and then deenergize the stepping coil 164. As a result, the wipers 143 and 202 were advanced into engagement with the contacts 160 and 190, respectively.

The rotation of the shaft of motor 422 also advanced the wipers 470, 468 and 466; and as the wiper 470 reached the seventh-lowermost contact the coil 476 became energized. As the wiper 468 reached the ninth-lowermost contact the coil 474 became energized; and as the wiper 466 reached the third-lowermost contact the coil 472 became energized. The closings and re-openings of the switch 458 will pulse the coil 164 five times, will pulse the coil 132 three times, and will pulse the coil 50 nine times. The additional pulse supplied by contacts 374A and switch 454 bring the total number of pulses for the coil 164 to six; and this is the tens-complements of the first digit of the sales price. The additional pulse supplied by contacts 352A and switch 456 bring the total number of pulses for the coil 132 to four; and this is the tens-complements of the middle digit of the sales price. The nine pulses given the coil 50 are the tens-complements of the last digit of the sales price. The tens-complements rather than the nines-complements were used because there are no "borrowings" in the subtraction of four dollars and sixty-one cents from four dollars and seventy-five cents. At the conclusion of the credit deduction operation, the wiper 202 is in engagement with the contact 180, the wiper 143 is in engagement with the contact 146, and the wiper 126 is in engagement with the contact 112.

The patron can collect the change by actuating the payout switch 494. The money payout relay coil 624 will become energized, and the mechanical latching relay will make certain that the coils 626, 628, 632 and 634 are energized and that the coils 640 and 636 are left de-energized.

During the rotation of the shaft 558, the wiper 560 will energize all of the electromagnets 522, 524, 526 and 528, because the wiper 126 is in engagement with the contact 112, and the wiper 560 will connect that contact to each of those electromagnets. As a result, the slides 516 adjacent the penny storage tubes 496, 498, 500 and 502 will advance to their intermediate positions.

During the rotation of the shaft 558, the wiper 564 will energize the electromagnet 530; because the wiper 143 is in engagement with the contact 146, and the wiper 564 will connect that contact to that electromagnet when that wiper is in its first dotted-line position. As a result, the slide 516 adjacent the dime storage tube 506 will advance to its intermediate position. During the third quarter of the revolution of the shaft 558, the five slides, which were in their intermediate positions, will advance to coin-ejecting position and release the fourteen cents.

Subsequently the motors 614 and 612 and the homing relay coil 656 will restore the various components of the money-actuated device to their normal, at-rest positions. At such time, that device can receive further money and can vend further products.

*Actuation of selection switch 226*

The selection switch 226 and the selection relay call for a sales price of ninety-seven cents; and it will be assumed that a patron will insert a half-dollar, a quarter, a dime, two nickels, and two pennies. The half-dollar will advance the wiper 143 into engagement with the contact 154, all as described hereinbefore. The quarter will advance the wiper 143 into engagement with the contact 158 and will advance the wiper into engagement with the contact 114, all as described hereinbefore. The dime causes the switch 38 to directly energize and deenergize the stepping coil 132. The first nickel causes the movable contact of the switch 36 to move down into engagement with the lower fixed contact of that switch; and thereupon the coil 142 will be energized. As that movable contact moves back up to its normal position, it will start the motor 210. That motor will cause the switch 212 to provide five pulses, all as explained in connection with the insertion of a half-dollar and a quarter. Those five pulses will be applied to the stepping coil 50; and the wiper 126 will move into engagement with the contact 104. As that wiper moved into engagement with, and then past, the contact 122, the contacts 100 and 102 closed; and, consequently, the fifth pulse from the switch 212 energized both the coils 50 and 222. The latter coil thereupon closed its contacts 222A to connect the conductor 30 to the stepping coil 132. The re-opening of the switch 212 will permit the wiper 126 to advance into engagement with the contact 104 and to permit the wiper 143 to advance into engagement with the contact 162.

The second nickel causes the movable contact of the switch 36 to move down into engagement with the lower fixed contact of that switch; and thereupon the coil 142 will be energized once again. As that movable contact moves back up to its normal position, it will start the motor 210. That motor will cause the switch 212 to provide five pulses, all as explained hereinabove. Those five pulses will be applied to the stepping coil 50; and the wiper 126 will move into engagement with the contact 114. Thereupon, the contacts 94 and 96 closed, and again energized the coil 658.

The first penny will cause the switch 34 to directly energize and de-energize the stepping coil 50; and, as a result, the wiper 126 will move into engagement with the contact 116. The second penny also will cause the switch 34 to directly energize and de-energize the stepping coil 50; and, as a result, the wiper 126 will move into engagement with the contact 118. At this time, the wiper 202 will be in engagement with the contact 180, the wiper 143 will be in engagement with the contact 162, and the wiper 126 will be in engagement with the contact 118.

If the patron actuates the selection switch 226, selection relay coil 240 will close contacts 240A, 240B, 240C, 240D and 240E. The "exact" relays 396, 376 and 354 will then be energized and will close the contacts 396A, 376A and 354A. As a result, the credit relay coil 400 will be energized; and the credit deduction circuit and the vending circuit will be energized. The shaft of the motor 422 will start rotating and will enable the cam-operated switch 432 to energize the vend relay 412 and then subsequently to energize the source of motive power 436. Further, that rotation will enable the cam 440 to latch up the armature 448 of the mechanical latching relay; and rotation will cause the cam 442 to close and re-open the switches 454 and 456. Such closing will enable the contacts 354A to energize and then de-energize the stepping coil 132 and will enable the contacts 376A to energize and then de-energize the stepping coil 164. As a result, the wipers 143 and 202 were advanced into engagement with contacts 144 and 182, respectively.

The rotation of the shaft of motor 422 also advanced the wipers 470, 468 and 466; and as the wiper 470 reached the third-lowermost contact the coil 476 became energized. The coil 474 will not become energized because the 0.90 conductor of the cable is not connected to any of the contacts of the selector switch 462. As the wiper 466 reached the ninth-lowermost contact the coil 472 became energized. The closings and re-openings of the switch 458 will pulse the coil 164 nine times, will not pulse the coil 132 at all, and will pulse the coil 50 three times. The additional pulse supplied by contacts 354A and 376A and switch 454 bring the total number of pulses for the coil 164 to ten; and this is the tens-complements of the first digit of the sales price. The additional pulse supplied by contacts 354A and switch 456 bring the total number of pulses for the coil 132 to one; and this is the tens-complements of the middle digit of the sales price. The three pulses given by the coil 50 are the tens-complements of the last digit of the sales price. The tens-complements rather than the nines-complements were used because there are no "borrowings" in the subtraction of ninety-seven cents from an equal amount.

At the conclusion of the credit deduction operation, all of the wipers 202, 143 and 126 will be in their zero positions. Further, the rest of the components of the money-actuated device will be in their normal, at-rest positions.

Conclusion

The transfer relays are important during the registering of credits on the switches 48, 133 and 137. However, those relays should not be energized during the credit deduction operation; and the present invention prevents such energization by having the credit relay coil 400 open the contacts 400C and 400D. Also, those relays should not be energized during the homing operation; and the present invention prevents such energization by having the contacts 656D and 656E open whenever the contacts 656A, 656B and 656C close.

It will be noted that the "over" relay contacts 394A are connected in parallel with the series-connected contacts 396A, 376A and 354A. This means that if the first digit of the credit a larger than the first digit of the sales price, the credit relay coil 400 can be energized.

If a patron actuates a selection button at a time when he has not inserted sufficient money to match the sales price at the desired product, one or more of the "exact" or "over" relays may still be energized. However, if those relays do not complete a circuit between the conductor 30 and the junction 399, the credit relay coil 400 can not be energized. For example, if just the relay coils 354 and 376 became energized, the credit relay coil 400 could not become energized.

The money-actuated device provided by the present invention is protected against the dispensing of products or money where such dispensing is not warranted. For example, the switch 430 in FIG. 3 keeps the vend circuit or the credit deduction circuit from completing its own cycle and then causing the other to start a further cycle. Specifically, the movable contact of that switch is moved to its lower position as the shaft of the motor 422 approaches the end of its cycle; and that switch will force the motor 422 to wait until the vend relay coil 412 has become de-energized and until the credit relay coil 400 has become de-energized. As a result, further operations of the money-actuated device cannot be performed until both of those circuits have been de-energized; if one of them remains energized no further money can be accepted.

In the drawing and in this description, gas-filled tubes have been described in connection with the "over" relays. However, solid-state devices such as transistors or controlled rectifiers could be used instead of those tubes. Consequently it will be understood that whenever the word tubes is used it refers to such solid-state devices as well as to electronic tubes.

Whereas the drawing and accompanying description have shown and described a preferred embodiment of the present invention, it should be apparent to those skilled in the art that various changes may be made in the form of the invention without affecting the scope thereof.

What I claim is:
1. In a money-actuated device, a rotary stepping switch that provides unit registration of credits, a second rotary stepping switch that provides tens registration of credits, a third rotary stepping switch that provides hundreds registration of credits, the wipers of said rotary stepping switches being movable only uni-directionally, a plurality of switches that respond to the insertion of money, some of said switches directly energizing the stepping coils of said rotary stepping switches, a five-pulse generator that can supply five pulses to the stepping coils of any of said rotary stepping switches, other of said switches energizing said five-pulse generator to provide five energizations of said stepping coils of said rotary stepping switches, contacts operated by the unit registration rotary stepping switch as the wiper of said switch is adjacent the nine position and a transfer relay that coact to provide an advancement for the wiper of said tens registration rotary stepping switch, contacts operated by the tens registration rotary stepping switch as the wiper of said switch is adjacent the nine position and a transfer relay that coact to provide an advancement for the wiper of said hundreds registration rotary stepping switch, resistances connected between the fixed contacts of said rotary stepping switches to constitute voltage dividers, price setters connected to said contacts of said rotary stepping switches, "exact" relays connected to various of said fixed contacts of said rotary stepping switches by the wipers of said rotary stepping switches, tubes that have the grids thereof connectable to various of said fixed contacts of said rotary stepping switches by the wipers of said rotary stepping switches, "over" relays connected to and energized by said tubes, selection relays with contacts that coact with said price setters to variously connect various of said fixed contacts of said rotary stepping switches to a source of current and thereby make said contacts "hot," said "exact" relays becoming energized whenever they are connected directly to contacts that are "hot," said tubes normally being biased beyond cut-off but becoming conductive and thereby energizing said "over" relays whenever the grids thereof are connected to contacts having values in excess of the values of said "hot" contacts, a credit deduction circuit that is energized by said "exact" and "over" relays and that includes rotary selector switches with contacts connected to the fixed contacts of said rotary stepping switches, nine of the contacts of one of said rotary selector switches being connected to the nine highest-value fixed contacts of said unit registration rotary stepping switch, nine of the contacts of a second of said rotary selector switches being connected to the nine lowest-value fixed contacts of said tens registration rotary stepping switch, nine of the contacts of a third of said rotary selector switches being connected to the nine lowest-value fixed contacts of said hundreds registration rotary stepping switch, the wipers of said rotary selector switches being rotated during the operation of said credit deduction circuit, relays that are normally de-energized but that become energized when the wipers of said rotary selector switches engage the contacts of said rotary selector switches which are connected to the contacts of said rotary stepping switches with which the wipers of said rotary stepping switches are in engagement, said relays variously connecting a cam-operated switch to said stepping coils of said rotary stepping switches, a nine-lobe cam that closes and opens said cam-operated switch and thereby provides nine possible advancements for the wipers of said rotary stepping switches, cam-operated switches that can connect the contacts of said "over" and "exact" relays to said hundreds registration rotary stepping switch, and to said tens registration rotary stepping switch, and that can respond to energizations of different combinations of said "over" and "exact" relays to enable said cam-operated switches to provide an additional advancement for said hundreds registration rotary stepping switch, and for said tens registration rotary stepping switch, said one of said rotary selector switches being adapted to provide tens-complement advancements of the wiper of said unit registration rotary stepping switch, said second of said rotary selector switches being adapted to provide nines-complement advancements of the wiper of said tens registration rotary stepping switch, said third of said rotary selector switches being adapted to provide nines-complement advancements of the wiper of said hundreds registration rotary stepping switch, said different combinations of said "over" and "exact" relays and said cam-operated switches coacting to provide the additional advancements needed to convert said nines-complement advances into tens-complement advances where no "borrowings" were made from the first and middle digits of the credit established by said rotary stepping switches, said credit deduction circuit initiating the operation of a vend circuit and the operations of said vend circuit and of said credit deduction circuit being coextensive in part, a change payout circuit that has contacts controlling the paying out of money in the form of dollars, pennies and coins of intervening value, said contacts being connected to said various contacts of said rotary stepping switches and responding to the engagement of said wipers of said rotary stepping switches with said various contacts of said rotary stepping switches to energize electrically-responsive elements that determine the amount of money to be paid out, and a pulse generator to advance the wipers of said rotary stepping switches to their zero positions adjacent the end of the cycle of said money-actuated device.

2. In a money-actuated device, a rotary stepping switch that provides unit registration of credits, a second rotary stepping switch that provides tens registration of credits, a third rotary stepping switch that provides hundreds registration of credits, the wipers of said rotary stepping switches being movable only uni-directionally, a plurality of switches that respond to the insertion of money and that can supply pulses to the stepping coils of said rotary stepping switches, contacts operated by the unit registration rotary stepping switch as the wiper of said switch is adjacent the nine position and a transfer relay that coact to provide an advancement for the wiper of said tens registration rotary stepping switch, contacts operated by the tens registration rotary stepping switch as the wiper of said switch is adjacent the nine position and a transfer relay that coact to provide an advancement for the wiper of said hundreds registration rotary stepping switch, resistances connected between the fixed contacts of said rotary stepping switches to constitute voltage dividers, price setters connected to said contacts of said rotary stepping switches, "exact" relays connected to various of said fixed contacts of said rotary stepping switches by the wipers of said rotary stepping switches, tubes that have the grids thereof connectable to various of said fixed contacts of said rotary stepping switches by the wipers of said rotary stepping switches, "over" relays connected to and energized by said tubes, selection circuits with contacts that coact with said price setters to variously connect various of said fixed contacts of said rotary stepping switches to a source of current and thereby make said contacts "hot," said "exact" relays becoming energized whenever they are connected directly to contacts that are "hot," said tubes normally being biased beyond cutoff but becoming conductive and thereby energizing said "over" relays whenever the grids thereof are connected to contacts having values in excess of the values of said "hot" contacts, a credit deduction circuit that is energized by said "exact" and "over" relays and that includes rotary selector switches with contacts connected to the fixed contacts of said rotary stepping switches, nine of the contacts of one of said rotary selector switches being connected to the nine highest-value fixed contacts of said unit registration rotary stepping switch, nine of the contacts of a second of said rotary selector switches being connected to the nine lowest-value fixed contacts of said tens registration rotary stepping switch, nine of the contacts of a third of said rotary selector switches being connected to the nine lowest-value fixed contacts of said hundreds registration rotary stepping switch, the wipers of said rotary selector switches being rotated during the operation of said credit deduction circuit, relays that are normally de-energized but that become energized when the wipers of said rotary selector switches engage the contacts of said rotary selector switches which are connected to the contacts of said rotary stepping switches with which the wipers of said rotary stepping switches are in engagement, said relays variously connecting a cam operated switch to said stepping coils of said rotary stepping switches, a nine-lobe cam that closes and opens said cam-operated switch and thereby provides nine possible advancements for the wipers of said rotary stepping switches, cam-operated switches that can connect the contacts of said "over" and "exact" relays to said hundreds registration rotary stepping switch, and to said tens registration rotary stepping switch, and that can respond to energizations of different combinations of said "over" and "exact" relays to enable said cam-operated switches to provide an additional advancement for said hundreds registration rotary stepping switch, and for said tens registration rotary stepping switch, said one of said rotary selector switches being adapted to provide tens-complement advancements of the wiper of said unit registration rotary stepping switch, said second of said rotary selector switches being adapted to provide nines-complement advancements of the wiper of said tens registration rotary stepping switch, said third of said rotary selector switches being adapted to provide nines-complement advancements of the wiper of said hundreds registration rotary stepping switch, said different combinations of said "over" and "exact" relays and said cam-operated switches coacting to provide the additional advancements needed to convert said nines-complement advances into tens-complement advances where no "borrowings" were made from the first and middle digits of the credit established by said rotary stepping switches.

3. In a money-actuated device, a rotary stepping switch that provides unit registration of credits, a second rotary stepping switch that provides tens registration of credits, a third rotary stepping switch that provides hundreds registration of credits, the wipers of said rotary stepping switches being movable only uni-directionally, a plurality of switches that respond to the insertion of money and that can supply pulses to the stepping coils of said rotary stepping switches, resistances connected between the fixed contacts of said rotary stepping switches to constitute voltage dividers, price setters connected to said contacts of said rotary stepping switches, "exact" relays connected to various of said fixed contacts of said rotary stepping switches by the wipers of said rotary stepping switches, tubes that have the grids thereof connectable to various of said fixed contacts of said rotary stepping switches by the wipers of said rotary stepping switches, "over" relays connected to and energized by said tubes, selection circuits with contacts that coact with said price setters to variously connect various of said fixed contacts of said rotary stepping switches to a source of current and thereby make said contacts "hot," said "exact" relays becoming energized whenever they are connected directly to contacts that are "hot," said tubes normally being biased beyond cut-off but becoming conductive and thereby energizing said "over" relays whenever the grids thereof are connected to contacts having values in excess of the values of said "hot" contacts, a credit deduction circuit that is energized by said "exact" and "over" relays and that includes rotary selector switches with contacts connected to the fixed contacts of said rotary stepping switches, nine of the contacts of one of said rotary selector switches being connected to the nine highest-value fixed contacts of said unit registration rotary stepping switch, nine of the contacts of a second of said rotary selector switches being connected to the nine lowest-value fixed contacts of said tens registration rotary stepping switch, nine of the contacts of a third of said rotary selector switches being connected to the nine lowest-value fixed contacts of said hundreds registration rotary stepping switch, the wipers of said rotary selector switches being rotated during the operation of said credit deduction circuit, relays that are normally de-energized but that become energized when the wipers of said rotary selector switches engage the contacts of said rotary selector switches which are connected to the contacts of said rotary stepping switches with which the wipers of said rotary stepping switches are in engagement, said relays variously connecting a cam-operated switch to said stepping coils of said rotary stepping switches, a nine-lobe cam that closes and opens said cam-operated switch and thereby provides nine possible advancements for the wipers of said rotary stepping switches, said one of said rotary selector switches being adapted to provide tens-complement advancements of the wiper of said unit registration rotary stepping switch, said second of said rotary selector switches being adapted to provide nines-complement advancements of the wiper of said tens registration rotary stepping switch, said third of said rotary selector switches being adapted to provide nines-complement advancements of the wiper of said hundred registration rotary stepping switch.

4. In a money-actuated device, a rotary stepping switch that provides unit registration of credits, a second rotary stepping switch that provides tens registration of credits, a third rotary stepping switch that provides hundreds registration of credits, the wipers of said rotary stepping switches being movable only uni-directionally, a plurality of switches that respond to the insertion of money and that can supply pulses to the stepping coils of said rotary stepping switches, a credit deduction circuit that includes rotary selector switches with contacts connected to the fixed contacts of said rotary stepping switches, nine of the contacts of one of said rotary selector switches being connected to the nine highest-value fixed contacts of said unit registration rotary stepping switch, nine of the contacts of a second of said rotary selector switches being connected to the nine lowest-value fixed contacts of said tens registration rotary stepping switch,, nine of the contacts of a third of said rotary selector switches being connected to the nine lowest-value fixed contacts of said hundreds registration rotary stepping switch, the wipers of said rotary selector switches being rotated during the operation of said credit deduction circuit, relays that are normally de-energized but that become energized when the wipers of said rotary selector switches engage the contacts of said rotary selector switches which are connected to the contacts of said rotary stepping switches with which the wipers of said rotary stepping switches are in engagement, said relays variously connecting a cam-operated switch to said stepping coils of said rotary stepping switches, a nine-lobe cam that closes and opens said cam-operated switch and thereby provides nine possible advancements for the wipers of said rotary stepping switches, said one of said rotary selector switches being adapted to provide tens-complement advancements of the wiper of said unit registration rotary stepping switch, said second of said rotary selector switches being adapted to provide nines-complement advancements of the wiper of said tens registration rotary stepping switch, said third of said rotary selector switches being adapted to provide nines-complement advancements of the wiper of said hundreds registration rotary stepping switch.

5. In a money-actuated device, a rotary stepping switch that provides unit registration of credits, a second rotary stepping switch that provides tens registration of credits, a third rotary stepping switch that provides hundreds registration of credits, the wipers of said rotary stepping switches being movable only uni-directionally, a plurality of switches that respond to the insertion of money and that can supply pulses to the stepping coils of said rotary stepping switches, a credit deduction circuit that includes rotary selector switches with contacts connected to the fixed contacts of said rotary stepping switches, nine of the contacts of one of said rotary selector switches being connected to the nine highest-value fixed contacts of said unit registration rotary stepping switch, nine of the contacts of a second of said rotary selector switches being connected to the nine lowest-value fixed contacts of said tens registration rotary stepping switch, nine of the contacts of a third of said rotary selector switches being connected to the nine lowest-value fixed contacts of said hundreds registration rotary stepping switch, the wipers of said rotary selector switches being rotated during the operation of said credit deduction circuit, relays that are normally de-energized but that become energized when the wipers of said rotary selector switches engage the contacts of said rotary selector switches which are connected to the contacts of said rotary stepping switches with which the wipers of said rotary stepping switches are in engagement, said relays variously connecting a cam-operated switch to said stepping coils of said rotary stepping switches, a nine-lobe cam that closes and opens said cam-operated switch and thereby provides nine possible advancements for the wipers of said rotary stepping switches.

6. In a money-actuated device, a rotary stepping switch that provides unit registration of credits, a second rotary stepping switch that provides tens registration of credits, a third rotary stepping switch that provides hundreds registration of credits, a plurality of switches that respond to the insertion of money and that can supply pulses to the stepping coils of said rotary stepping switches, resistances connected between the fixed contacts of said rotary stepping switches to constitute voltage dividers, price setters connected to said contacts of said rotary stepping switches, "exact" relays connected to various of said fixed contacts of said rotary stepping switches by the wipers of said rotary stepping switches, tubes that have the grids thereof connectable to various of said fixed contacts of said rotary stepping switches by the wipers of said rotary stepping switches, "over" relays connected to and energized by said tubes, selection circuits that coact with said price setters to variously connect various of said fixed contacts of said rotary stepping switches to a source of current and thereby make said contacts "hot," said "exact" relays becoming energized whenever they are connected directly to contacts that are "hot", said tubes normally being biased beyond cut-off but becoming conductive and thereby energizing said "over" relays whenever the grids thereof are connected to contacts having values in excess of the values of said "hot" contacts.

7. In a money-actuated device, a rotary stepping switch that provides unit registration of credits, a second rotary stepping switch that provides tens registration of credits, a third rotary stepping switch that provides hundreds registration of credits, a plurality of switches that respond to the insertion of money and that can supply pulses to the stepping coils of said rotary stepping switches, resistances connected between the fixed contacts of said rotary stepping switches to constitute voltage dividers, "exact" relays connected to various of said fixed contacts of said rotary stepping switches by the wipers of said rotary stepping switches, tubes that have the grids thereof connectable to various of said fixed contacts of said rotary stepping switches by the wipers of said rotary stepping switches, "over" relays connected to and energized by said tubes, selection circuits that variously connect various of said fixed contacts of said rotary stepping switches to a source of current and thereby make said contacts "hot," said "exact" relays becoming energized whenever they are connected directly to contacts that are "hot," said tubes normally being biased beyond cut-off but becoming conductive and thereby energizing said "over" relays whenever the grids thereof are connected to contacts having values in excess of the values of said "hot" contacts; said voltage dividers performing the dual function of controlling the energizations of said "exact" relays and of controlling the energizations of said "over" relays.

8. In a money-actuated device, a rotary stepping switch that provides unit registration of credits, a second rotary stepping switch that provides tens registration of credits, a third rotary stepping switch that provides hundreds registration of credits, a plurality of switches that respond to the insertion of money and that can supply pulses to the stepping coils of said rotary stepping switches, resistances connected between the fixed contacts of said rotary stepping switches to constitute voltage dividers, tubes that have the grids thereof connectable to various of said fixed contacts of said rotary stepping switches by the wipers of said rotary stepping switches, "over" relays connected to and energized by said tubes, selection circuits that variously connect various of said fixed contacts of said rotary stepping switches to a source of current and thereby make said contacts "hot," said tubes normally being biased beyond cut-off but becoming conductive and thereby energizing said "over" relays whenever the grids thereof are connected to contacts having values in excess of the values of said "hot" contacts.

9. In a money-actuated device, a rotary stepping switch that provides unit registration of credits, a second rotary stepping switch that provides tens registration of credits, a third rotary stepping switch that provides hundreds registration of credits, a plurality of switches that respond to the insertion of money and that can supply pulses to the stepping coils of said rotary stepping switches, resistances connected between the fixed contacts of said rotary stepping switches to constitute voltage dividers, "exact" relays connected to various of said fixed contacts of said rotary stepping switches by the wipers of said rotary stepping switches, selection circuits that variously connect various of said fixed contacts of said rotary stepping switches to a source of current and thereby make said contacts "hot," said "exact" relays becoming energized whenever they are connected directly to contacts that are "hot."

10. In a money-actuated device, a plurality of rotary stepping switches wherein the wipers move uni-directionally, said wipers being adapted to advance relative to the contacts of said rotary stepping switches and thereby establish credits on said rotary stepping switches, a value sensing circuit including "over" and "exact" relays, a credit deduction circuit which deducts credits from the credit established by said wipers by advancing said wipers, and a vend circuit, said credit deduction circuit including at least one pulsing device that provides nines-complements of a digit of the sales price whereby the absence of a "borrowing" from the corresponding digit of the credit will require an additional advancement, said "over" and "exact" relays being adapted to energize said vend circuit whenever the value of the credit equals or exceeds the value of the sales price, said "over" and "exact" relays also being adapted to provide the additional advancement where a "borrowing" has not occurred.

11. In a money-actuated device, a plurality of rotary stepping switches wherein the wipers move uni-directionally, said wipers being adapted to advance relative to the contacts of said rotary stepping switches and thereby establish credits on said rotary stepping switches, a value sensing circuit including "exact" relays, a credit deduction circuit which deducts credits from the credit established by said wipers by advancing said wipers, and a vend circuit, said credit deduction circuit including at least one pulsing device that provides nines-complements of a digit of the sales price whereby the absence of a "borrowing" from the corresponding digit of the credit will require an additional advancement, said "exact" relays being adapted to energize said vend circuit whenever the value of the credit equals the value of the sales price, said "exact" relays also being adapted to provide the additional advancement where a "borrowing" has not occurred.

12. In a money-actuated device, a plurality of rotary stepping switches, the wipers of said rotary stepping switches being adapted to advance relative to the contacts of said rotary stepping switches and thereby establish credits on said rotary stepping switches, a value sensing circuit including "over" and "exact" relays, and a vend circuit, said "over" and "exact" relays being adapted to energize said vend circuit whenever the value of the credit established by said wipers equals or exceeds the value of the sales price, said "over" and "exact" relays having contacts, the contacts of said "exact" relays being connected in series with each other, the contacts of one of said "over" relays being connected in parallel with the series-connected contacts of at least two of said "exact" relays.

13. In a money-actuated device, a plurality of rotary stepping switches, the wipers of said rotary stepping switches being adapted to advance relative to the contacts of said rotary stepping switches and thereby establish credits on said rotary stepping switches, a value sensing circuit including "over" and "exact" relays, a credit deduction circuit which deducts credits from the credit established by said wipers by advancing said wipers, and a vend circuit, said credit deduction circuit including at least one pulsing device that provides nines-complements of a digit of the sales price whereby the absence of a "borrowing" from the corresponding digit of the credit will require an additional advancement, said "over" and "exact" relays being adapted to provide the additional advancement where a "borrowing" has not occurred.

14. In a money-actuated device, a plurality of rotary stepping switches, the wipers of said rotary stepping switches being adapted to advance relative to the contacts of said rotary stepping switches and thereby establish credits on said rotary stepping switches, a value sensing circuit including "exact" relays, a credit deduction circuit which deducts credits from the credit established by said wipers by advancing said wipers, and a vend circuit, said credit deduction circuit including at least one pulsing device that provides nines-complements of a digit of the sales price whereby the absence of a "borrowing" from the corresponding digit of the credit will require an additional advancement, said "exact" relays being adapted to provide the additional advancement where a "borrowing" has not occurred and to avoid an additional advancement where said "borrowing" has occurred.

15. In a money-actuated device, a value sensing circuit including "over" and "exact" relays, a money registering circuit, a selection circuit, and a relay that can reject inserted money, said "over" and "exact" relays being adapted to become energized and thereby initiate the vending of the selected product, said selection circuit causing said relay to reject money whenever a product selection is being made, said relay also being adapted to reject money whenever said "over" and "exact" relays are initiating the vending of said desired product.

16. In a money-actuated device, a value sensing circuit including "exact" relays, a money registering circuit, a selection circuit, a credit deduction circuit, and a member that can reject inserted money, said "exact" relays being adapted to become energized and thereby actuate said credit deduction circuit, said selection circuit causing said member to reject money whenever a product selection is being made, said member being adapted to reject money whenever said credit deduction circuit has been energized by said "exact" relays.

17. In a money-actuated device, a money-registering circuit which includes a plurality of series-connected money-actuated switches, a product selection circuit, a money payout circuit, and a relay that is controlled by said series-connected money-actuated switches of said money-registering circuit and that disables said product selection circuit and said money payout circuit whenever any one of said series-connected money-actuated switches is opened as money is being registered.

18. In a money-actuated device, a money-registering circuit which includes a plurality of series-connected money-actuated switches, a value sensing circuit, a product selection circuit, and a relay controlled by said series-connected money-actuated switches of said money-registering circuit, said product selection circuit normally being adapted to energize said value sensing circuit and thereby determine whether the credit equals the sales price, said relay being adapted to isolate said value sensing circuit from said product selection circuit whenever any one of said series-connected money-actuated switches is opened as money is being registered.

19. In a money-actuated device, a money-registering circuit which includes a plurality of series-connected money-actuated switches, a product selection circuit that has a plurality of selection switches therein and has a plurality of product selection relays therein, a money payout circuit that has a payout switch therein, and a relay controlled by said series-connected money-actuated switches of said money-registering circuit that disables said product selection circuit by keeping said selection relays from completing a selection and that disables said money payout circuit by isolating said payout switch from a source of current whenever any one of said series-connected money-actuated switches is opened as money is being registered.

20. In a money-actuated device, a rotary stepping switch that provides registration of credits, the wiper of said rotary stepping switch being movable only uni-directionally, a switch that responds to the insertion of money to supply pulses to the stepping coil of said rotary stepping switch, resistances connected between the fixed contacts of said rotary stepping switch to constitute a voltage divider, a price setter connected to said contacts of said rotary stepping switch, an "exact" relay connected to various of said fixed contacts of said rotary stepping switch by the wiper of said rotary stepping switch, a tube that has the grid thereof connectable to various of said fixed contacts of said rotary stepping switch by the wiper of said rotary stepping switch, an "over" relay connected to and energized by said tube, selection circuits that coact with said price setter to variously connect various of said fixed contacts of said rotary stepping switch to a source of current and thereby make said contacts "hot," said "exact" relay becoming energized whenever it is connected directly to contacts that are "hot," said tube normally being biased beyond cut-off but becoming conductive and thereby energizing said "over" relay whenever the grid thereof is connected to a contact having a value in excess of the value of said "hot" contact.

21. In a money-actuated device, a rotary stepping switch that provides registration of credits, the wiper of said rotary stepping switch being movable only uni-directionally, a switch that responds to the insertion of money to supply pulses to the stepping coil of said rotary stepping switch, resistances connected between the fixed contacts of said rotary stepping switch to constitute a voltage divider, an "exact" relay connected to various of said fixed contacts of said rotary stepping switch by the wiper of said rotary stepping switch, a tube that has the grid thereof connectable to various of said fixed contacts of said rotary stepping switch by the wiper of said rotary stepping switch, an "over" relay connected to and energized by said tube, said "exact" relay becoming energized whenever it is connected directly to contacts that are "hot," said tube normally being biased beyond cut-off but becoming conductive and thereby energizing said "over" relay whenever the grid thereof is connected to a contact having a value in excess of the value of said "hot" contact.

22. In a money-actuated device, a rotary stepping switch that provides registration of credits, the wiper of said rotary stepping switch being movable only uni-directionally, a switch that responds to the insertion of money to supply pulses to the stepping coil of said rotary stepping switch, resistances connected between the fixed contacts of said rotary stepping switch to constitute a voltage divider, a price setter connected to said contacts of said rotary stepping switch, an "exact" relay connected to various of said fixed contacts of said rotary stepping switch by the wiper of said rotary stepping switch, selection circuits that coact with said price setter to variously connect various of said fixed contacts of said rotary stepping switch to a source of current and thereby make said contacts "hot," said "exact" relay becoming energized whenever it is connected directly to contacts that are "hot."

23. In a money-actuated device, a rotary stepping switch that provides registration of credits, the wiper of said rotary stepping switch being movable only uni-directionally, a switch that responds to the insertion of money to supply pulses to the stepping coil of said rotary stepping switch, resistances connected between the fixed contacts of said rotary stepping switch to constitute a voltage divider, a tube that has the grid thereof connectable to various of said fixed contacts of said rotary stepping switch by the wiper of said rotary stepping switch, an "over" relay connected to and energized by said tube, said tube normally being biased beyond cut-off but becoming conductive and thereby energizing said "over" relay whenever the grid thereof is connected to a contact having a value in excess of the value of said "hot" contact.

24. In a money-actuated device, a credit deduction circuit, a vend circuit which includes a vend relay, a motor that is energized during the operation of said credit deduction circuit, a second relay that is energizable to start the operation of said credit deduction circuit and said vend circuit, a cam that is operated by said motor, a switch that is operated by said cam, said switch having a movable contact that is normally in position to complete a starting circuit for said motor, said switch having a normally-open contact which is connected to a source of current by serially-connected, normally-closed contacts on said vend relay and on said second relay, said motor actuating said cam near the end of the cycle of operation of said credit deduction circuit to shift said movable contact into engagement with said normally-open contact, thereby breaking said starting circuit of said motor and sensing for the closing of said normally-closed contacts of said vend relay and of said second relay, said motor coming to rest if either said vend relay or said second relay is still energized, said motor thereafter responding to the de-energization of said relays to complete its cycle and to restore said movable contact to its original position.

25. In a money-actuated device, a credit deduction circuit, a vend circuit which includes a vend relay, a motor that operates during the operation of said credit deduction circuit, a second relay that starts said circuits, a switch that is operated by said motor and that has the movable contact thereof normally in position to complete a starting circuit for said motor, said switch having a normally-open contact which is connected to a source of current by serially-connected, normally-closed contacts on said vend relay and on said second relay, said motor actuating said switch to shift said movable contact into engagement with said normally-open contact, thereby breaking said starting circuit of said motor and sensing for the closing of said normally-closed contacts of said vend relay and of said second relay, said motor being unable to complete a revolution of the output shaft thereof until both said vend relay and said second relay have become de-energized.

26. In a money-actuated device, a plurality of selection switches, a plurality of selection relays, and a time-delay circuit that requires a selection switch to be held for a finite period of time to energize the corresponding selection relay and thereby prevents the initiation of a vend by actuation of a low-price selection switch and the vending of a high-priced product by the immediately subsequent actuation of a high-priced selection switch.

27. In a money-actuated device, a change payout circuit that is initiated by the actuation of a switch, a money-returning circuit that is initiated by the actuation of said same switch, and a mechanical "memory" relay that is actuated whenever a selection has been made but that is not actuated until a selection has been made, said relay connecting said switch to said change payout circuit whenever a selection has been made, said relay connecting said switch to said money-returning circuit until a selection has been made.

28. In a money-actuated device, a change payout circuit that is initiated by the actuation of a switch, a money-returning circuit that is initiated by the actuation of said same switch, a mechanical latching relay, and a cam that actuates and latches said mechanical latching relay in actuated position whenever a selection has been made but that does not actuate or latch said mechanical latching relay until a selection has been made, said relay connecting said switch to said change payout circuit whenever a selection has been made, said relay connecting said switch to said money-returning circuit until a selection has been made, said mechanical latching relay responding to an electrical pulse to return to released condition.

29. In a money-actuated device, a value sensing circuit, a plurality of selection switches, a plurality of price setters, a plurality of credit-establishing members, said price setters being connected to said credit-establishing members, said selection switches being connectable to said price setters, an "exact" relay corresponding to one of said credit-establishing members, an "over" relay corresponding to said one credit-establishing member, a second "exact" relay corresponding to a second of said credit-establishing members, a second "over" relay corresponding to said second credit-establishing member, contacts operable by said "exact" and "over" relays, an actuatable member, the contacts of said "exact" relays being connected in series with each other and with said actuatable member so said actuatable member will be energized whenever both of said "exact" relays are energized, the contacts of one of said "over" relays being connected in series with said actuatable member and in parallel with said series-connected contacts of said "exact" relays, whereby said actuatable member will be energized whenever said one "over" relay is energized, said value sensing circuit responding to actuation of said selection switches to sense whether the credit on said credit-establishing members equal or exceed the sales price of the selected product and to actuate the appropriate ones of said "exact" and "over" relays, and a change payout circuit that can be energized to pay out the difference between the credit and the sales price of the selected product.

30. In a money-actuated device, a voltage divider, a selection mechanism that can select one of a plurality of spaced points on said voltage divider, a movable contact that can engage said spaced points on said voltage divider, and an "exact" relay that is connectable to said spaced points by said movable contact, the ohmic value of the portions of the voltage divider between said spaced points being greater than the ohmic resistance of said "exact" relay coil, whereby the voltage drop across said portions of said voltage divider is great enough to provide insufficient voltage for said "exact" relay coil whenever said movable contact is out of register with said one selected point but will permit said "exact" relay to become energized whenever said movable contact is in engagement with said one selected point in said voltage divider.

31. In a money-actuated device, a voltage divider, a rotary stepping switch that has the fixed contacts thereof connected to a plurality of spaced points on said voltage divider, and an "exact" relay that is connectable to said spaced points by the wiper of said rotary stepping switch, the value of the voltage divider between said spaced points being greater than the ohmic resistance of said "exact" coil, whereby the voltage drop across said spaced portions of said voltage divider is great enough to provide insufficient voltage for said "exact" coil whenever said wiper is out of register with a predetermined one of said spaced points but will permit said "exact" relay to become energized whenever said wiper is in engagement with said one point on said voltage divider.

32. In a money-actuated device, a voltage divider, a movable contact that can be placed in engagement with various spaced points on said voltage divider, a selection mechanism that can connect a predetermined one of said points on said voltage divider with a source of current, an "exact" relay connected to said movable contact and that is adapted to be placed in engagement with said source of current via said movable contact said one predetermined point and said selection mechanism, a tube that has the grid thereof connected to said voltage divider by said movable contact, and an "over" relay actuated by said tube, the ohmic resistance of said "exact" relay being very much smaller than the ohmic resistance of the portion of said voltage divider intermediate said spaced points, whereby the resistance of said voltage divider will drop substantially all of the available voltage across the portion thereof between said spaced points whenever said movable contact is not in engagement with said one point and will thereby render the voltage across said "exact" relay insufficient to energize said relay, said "exact" relay being adapted to become energized whenever said movable contact is in engagement with said one point, said tube normally being biased beyond cut off, said movable contact being adapted to reduce the cut-off bias of said tube to the point where said tube will become conductive whenever said movable contact engages a point on said voltage divider above said one point, said voltage divider being adapted to leave the bias on said tube substantially unchanged whenever said movable contact engages said one point and being adapted to render said bias more negative whenever said movable contact engages a point on said voltage divider which is below said one point.

33. In a money-actuated device, a voltage divider, a rotary switch having the fixed contacts thereof connected to spaced points on said voltage divider, a selection mechanism that can connect one of said spaced points with a source of current, an "exact" relay connected to the wiper of said switch and that is adapted to be placed in engagement with said source of current via said wiper and said selection mechanism, a tube that has the grid thereof connected to said voltage divider by said wiper, and an "over" relay actuated by said tube, said "exact" relay being energized only when said wiper directly connects said "exact" coil to said one point, said tube normally being biased beyond cut-off, said wiper being adapted to reduce the bias of said tube to the point where said tube will become conductive whenever said wiper engages a point on said voltage divider above said one point, said voltage divider being adapted to leave the bias on said tube substantially unchanged whenever said wiper engages said one point and being adapted to render said bias more negative whenever said wiper engages a point on said voltage divider which is below said one point.

34. In a money-actuated device, a plurality of rotary stepping switches that have wipers which are movable to establish the individual digital credits for a plural-digit credit, an "over" relay and an "exact" relay for one of said stepping switches, an "over" relay and an "exact" relay for another of said stepping switches, an element that is adapted to be actuated by the contacts of said "over" relays and "exact" relays, the contacts of said "exact" relays being connected in series to energize said element, the contacts of one of said "over" relays being connected in parallel with said series-connected contacts of said "exact" relays.

35. In a money-actuated device, a plurality of rotary stepping switches that have wipers which are movable to establish credits, one of said rotary stepping switches registering unit credits, another of said rotary stepping switches registering tens credits, an "over" relay and an "exact" relay for said one stepping switch, an "over" relay and an "exact" relay for said other stepping switch, an element that is adapted to be actuated by the contacts of said "over" relays and "exact" relays, the contacts of said "exact" relays being connected in series to energize said element, the contacts of said "over" relay of said other stepping switch being connected in parallel to said series-connected contacts of said "exact" relays.

36. In a money actuated device which has a plurality of elements that can respond to the insertion of differing amounts of money to establish differing amounts of credit, a value sensing circuit that can sense the amounts of credit established by said plurality of elements, and a change payout circuit, "over" relays and "exact" relays in said value sensing circuit which are energized, respectively, when the amounts of credit established by said plurality of elements equal and exceed the price of a selected product, contacts intermediate said "over" relays and said "exact" relays and the source of current for said relays, and a relay operated by said change payout circuit to open said contacts and thereby de-energize said "over" relays and "exact" relays at the beginning of and throughout the operation of said change payout circuit.

37. In a money-actuated device which has a plurality of elements that can respond to the insertion of differing amounts of money to establish differing amounts of credit, a value sensing circuit that can sense the amounts of credit established by said plurality of elements, and a credit deduction circuit, "over" relays and "exact" relays in said value sensing circuit which are energized, respectively, when the amounts of credit established by said plurality of elements equal and exceed the price of a selected product, contacts intermediate said "over" relays and said "exact" relays and the source of current for said relays, and a relay operated by said credit deduction circuit to open said contacts and thereby de-energize said "over" relays and "exact" relays at the beginning of and throughout the operation of said credit deduction circuit.

38. In a money-actuated device, a rotary stepping switch that establishes credits, a plurality of resistors that are connected to the fixed contacts of said switch to constitute a voltage divider, a price setter connected to said fixed contacts of said switch, an "exact" relay that is connected to said switch and that will be energized whenever the wiper of said switch engages a predetermined contact corresponding to a predetermined price, a tube that is normally biased beyond cut-off and that can have its grid-cathode circuit selectively connected to various of said contacts of said switch and thus across various resistors of said voltage divider, said voltage divider rendering the bias of said tube more negative whenever said wiper engages a contact of said switch below said predetermined contact, said voltage divider leaving said bias substantially unchanged when said wiper engages said predetermined contact, said voltage divider reducing said bias of said tube and thereby rendering said tube conductive when said wiper engages a contact above said predetermined contact, and an "over" relay energized by said tube whenever said tube becomes conductive, and a money-responsive element that responds to the insertion of money to advance said wiper and thereby establish credits on said switch.

39. In a money-actuated device, a rotary stepping switch that establishes credits, a plurality of resistors that are connected to the fixed contacts of said switch to constitute a voltage divider, a price setter connected to said contacts of said switch, an "exact" relay that is connected to said switch and that will be energized whenever the wiper of said switch engages a predetermined contact corresponding to a predetermined price, and a money-responsive element that responds to the insertion of money to advance said wiper and thereby establish credits on said switch.

40. In a money-actuated device, a rotary stepping switch that establishes credits, a plurality of resistors that are connected to the fixed contacts of said switch to constitute a voltage divider, a price setter connected to said contacts of said switch, a tube that is normally biased beyond cutoff and that can have its grid-cathode circuit selectively connected to various of said contacts of said switch and thus across various resistors of said voltage divider, said voltage divider rendering the bias of said tube more negative whenever said wiper engages a contact of said switch below said predetermined contact, said voltage divider leaving said bias substantially unchanged when said wiper engages said predetermined contact, said voltage divider reducing said bias of said tube and thereby rendering said tube conductive when said wiper engages a contact above said predetermined contact, and an "over" relay energized by said tube whenever said tube becomes conductive, and a money-responsive element that responds to the insertion of money to advance said wiper and thereby establish credits on said switch.

41. In a money-actuated device, a switch that is adapted to be actuated by a dime, a second switch that is adapted to be actuated by a quarter, a pulse generator, a credit-establishing element that is energized whenever the movable contact of said dime switch or said movable contact of said quarter switch is actuated, and a member that is actuated whenever said movable contact of said quarter switch is actuated and that pre-sets said pulse generator whenever it is actuated, whereby said pulse generator will start as said movable contact of said quarter switch returns to its normal position after having been actuated, whereby said credit-establishing element is actuated before said pulse generator is started, said dime switch and said quarter switch both being actuated by quarters.

42. In a money-actuated device, a switch that is adapted to be actuated by a coin of predetermined value, a second switch that is adapted to be actuated by a coin of different value, a pulse generator, a credit-establishing element that is energized whenever the movable contact of said second switch is actuated, and a member that is actuated whenever said movable contact of said quarter switch is actuated and that pre-sets said pulse generator whenever it is actuated, whereby said pulse generator will start as said movable contact of said second switch returns to its normal position after having been actuated, whereby said credit-establishing element is actuated before said pulse generator is started, said first and said second switches both being actuated by coins of said different value.

43. In a money-actuated device, a switch that is adapted to be actuated by a coin of predetermined value, a pulse generator, a credit-establishing element that is energized whenever the movable contact of said switch is actuated, and a member that is actuated whenever said movable contact of said quarter switch is actuated and that pre-sets said pulse generator whenever it is actuated, whereby said pulse generator will start as said movable contact of said switch returns to its normal position after having been actuated, whereby said credit-establishing element is actuated before said pulse generator is started.

44. In a money-actuated device which has a credit deduction circuit, a vend circuit, and "over" relays and "exact" relays, said "over" relays and "exact" relays being adapted to initiate said vend circuit, said credit deduction circuit providing nines-complements for some digits of the sales price and said "over" relays and said "exact" relays helping provide an additional pulse where needed to convert said nines-complement to a tens-complement.

45. In a money-actuated device, a money-registering circuit, "over" and "exact" relays, a credit deduction circuit, a change payout circuit, and stepping switches, said stepping switches responding to pulses from said money-registering circuit, said stepping switches having contacts controlling the energization of said "over" and "exact" relays, said contacts of said stepping switches controlling the amount deducted by said credit deduction circuit, and said contacts of said stepping switches controlling the amount paid out by said change payout circuit.

46. In a money-actuated device, a money-registering circuit, a credit deduction circuit, relays that initiate the operation of said credit deduction circuit, a change payout circuit, and stepping switches, said stepping switches being advanced by said money-registering circuit, said stepping switches having contacts controlling the energization of said relays, said contacts of said stepping switches controlling said credit deduction circuit and said change payout circuit.

47. In a money-actuated device that accepts paper currency, a credit accumulator that has a maximum accumulatable credit, an electromagnetic rejector for five dollar bills, an electromagnetic rejector for one dollar bills, contacts on said credit accumulator which cause said rejector for five dollar bills to reject such bills whenever the credit accumulated is closer to said maximum accumulatable credit than five dollars, and further contacts on said credit accumulator which cause said rejector for one dollar bills to reject such bills whenever the credit accumulated is closer to said maximum accumulatable credit than one dollar.

48. In a money-actuated device, a stepping switch that provides registration of credits, resistors that are connected to the fixed contacts of said stepping switch to establish predetermined voltages at said contacts, a tube that has the grid thereof connectable to various of said fixed contacts by the wiper of said stepping switch, a control element connected to and energized by said tube whenever said tube is conductive, a selection circuit that can connect a predetermined one of said contacts to a source of current and thereby make said one contact "hot," said tube normally being biased beyond cut-off but becoming conductive and thereby energizing said control element whenever the grid thereof is connected to contacts of said stepping switch having values in excess of the value of said one contact.

49. In a money-actuated device, a plurality of rotary stepping switches that each has a plurality of fixed contacts, a plurality of rotary selector switches that each has a plurality of fixed contacts, sets of conductors that interconnect some of said fixed contacts of said plurality of rotary stepping switches with some of said fixed contacts of the corresponding rotary selector switches, and a plurality of price setters that are connected to some of said fixed contacts of said rotary stepping switches and that connect at least one of said fixed contacts of each of said rotary stepping switches to a source of current, the wipers of said rotary selector switches being rotatable relative to the fixed contacts of said rotary selector switches and responding to the engagements thereof with the contacts connected to said ones of said fixed contacts of said rotary stepping switches to energize one of a plurality of control elements, each said control element establishing a holding circuit for itself and coacting with a recurrently closed and opened switch to advance the wipers of all of said rotary stepping switches.

50. In a money-actuated device, a deduction circuit, a vend circuit, a motor that operates only during the operation of said deduction circuit, a starting circuit for said motor, a running circuit for said motor, a cam that is driven by said motor, a switch that is operated by said cam, contacts in said starting circuit of said motor, further contacts in said vend circuit, a relay, an initiating circuit for said relay, a holding circuit for said relay, the movable contact and normally engaged fixed contact of said switch being part of said initiating circuit for said relay, said movable contact and the normally free contact of said switch being in said vend circuit, said relay responding to energization to complete its holding circuit and to close said starting circuit of said motor and thereby start said motor and also closing said contacts in said vend circuit to pre-set said vent circuit, said motor rotating said cam to shift said movable contact of said switch and thereby complete said vend circuit, shifting of said movable contact also opening said initiating circuit for said relay and thereby enabling said vend circuit to function independently of said motor, a second running circuit for said motor, sensing contacts in said second running circuit that are held open by said vend circuit throughout each cycle of operation of said vend circuit, and a transfer switch that transfers the current for said motor from the first said to said second running circuits shortly before said deduction circuit completes its cycle of operation, said sensing contacts thereupon de-energizing said motor if said vend circuit has not yet completed its cycle of operation and thereafter keeping said motor de-energized until said vend circuit completes its cycle of operation, whereby said deduction circuit can not complete its cycle of operation until said vend circuit completes its cycle of operation.

References Cited by the Examiner
UNITED STATES PATENTS

| | | | |
|---|---|---|---|
| 1,831,545 | 11/31 | Puff | 200—105 |
| 1,897,955 | 2/33 | Hoke | 200—105 |
| 2,058,637 | 10/36 | Scott | 221—13 |
| 2,433,689 | 12/47 | Fry | 194—.02 |
| 2,677,450 | 5/54 | Gabrielsen | 194—7 |
| 2,691,484 | 10/54 | Hoyt | 232—57.5 |
| 2,698,699 | 1/55 | Skillman | 221—6 |
| 2,698,713 | 1/55 | Timms | 232—57.5 |
| 2,708,996 | 5/55 | Skillman | 194—10 |
| 2,805,675 | 9/57 | Noyes | 133—4 |
| 2,876,883 | 3/59 | Baker | 194—10 |
| 2,905,360 | 9/59 | Mihalek | 194—10 |
| 2,910,991 | 11/59 | Quinn | 133—2 |
| 2,941,644 | 6/60 | Zeigle | 194—10 |

SAMUEL F. COLEMAN, *Primary Examiner.*
LOUIS J. DEMBO, *Examiner.*